(12) United States Patent
Kagawa

(10) Patent No.: US 8,918,210 B2
(45) Date of Patent: Dec. 23, 2014

(54) METHOD OF DETECTING AN INTER-AXIS OFFSET OF 6-AXIS ROBOT

(75) Inventor: Naoya Kagawa, Kariya (JP)

(73) Assignee: Denso Wave Incorporated, Aichi-Pref. (JP)

( * ) Notice: Subject to any disclaimer, the term of this patent is extended or adjusted under 35 U.S.C. 154(b) by 122 days.

(21) Appl. No.: 13/423,715

(22) Filed: Mar. 19, 2012

(65) Prior Publication Data

US 2012/0239194 A1    Sep. 20, 2012

(30) Foreign Application Priority Data

Mar. 18, 2011  (JP) ................................. 2011-060619
Jun. 28, 2011  (JP) ................................. 2011-142825
Aug. 18, 2011  (JP) ................................. 2011-178962

(51) Int. Cl.
*G05B 19/04* (2006.01)
*B25J 9/16* (2006.01)

(52) U.S. Cl.
CPC ..... *B25J 9/1692* (2013.01); *G05B 2219/40588* (2013.01)
USPC ........... 700/254; 700/245; 700/251; 700/260; 700/263; 318/568.11; 318/568.16; 318/568.24

(58) Field of Classification Search
CPC .................................................... B25J 9/1692
USPC ................. 700/245, 251, 253, 254, 260, 263; 318/568.11, 568.16, 568.24
See application file for complete search history.

(56) References Cited

U.S. PATENT DOCUMENTS

| | | | | |
|---|---|---|---|---|
| 5,737,500 A * | 4/1998 | Seraji et al. | .................. | 700/251 |
| 6,304,050 B1 * | 10/2001 | Skaar et al. | .............. | 318/568.11 |
| 6,845,295 B2 * | 1/2005 | Cheng et al. | .................. | 700/245 |
| 7,558,647 B2 * | 7/2009 | Okazaki | ........................ | 700/260 |
| 7,623,944 B2 * | 11/2009 | Dariush | ........................ | 700/245 |
| 7,751,938 B2 * | 7/2010 | Tsusaka et al. | ............... | 700/250 |
| 8,369,993 B2 * | 2/2013 | Kagawa et al. | ............... | 700/263 |
| 8,396,594 B2 * | 3/2013 | Okazaki | ........................ | 700/253 |
| 2007/0288124 A1 * | 12/2007 | Nagata et al. | ................. | 700/258 |

(Continued)

FOREIGN PATENT DOCUMENTS

| | | |
|---|---|---|
| JP | A-2003-220587 | 8/2003 |
| JP | A-2009-274186 | 11/2009 |
| JP | A-2009-274187 | 11/2009 |
| JP | A-2009-274188 | 11/2009 |

OTHER PUBLICATIONS

Report on *Investigation research on standardization of intelligent robots for plants*; (pp. 52 and 53); Committed to National Institute of Industrial Science and Technology, Ministry of Trade and Industry in 1997; issued in Mar. 1998 by Japan Robot Association (with English translation).

*Primary Examiner* — Thomas G Black
*Assistant Examiner* — Wae Louie
(74) *Attorney, Agent, or Firm* — Oliff PLC

(57) ABSTRACT

In a 6-axis robot, as an example, an inter-axis offset can be measured and calibrated. A light emitting diode is installed on an end effector, and the end effector is located on a plurality of target positions of movement on the axis X (Xb) of a robot coordinate. Then, the position of the light emitting diode is measured by a three-dimensional gauge, and an inter-axis offset F is detected based on an error between the target positions of movement and actually moved positions. For the inter-axis offset F, DH parameters are calibrated.

16 Claims, 32 Drawing Sheets

(56) References Cited

U.S. PATENT DOCUMENTS

| | | | |
|---|---|---|---|
| 2008/0188986 A1* | 8/2008 | Hoppe | 700/263 |
| 2011/0218676 A1* | 9/2011 | Okazaki | 700/260 |
| 2012/0010747 A1* | 1/2012 | Okazaki | 700/253 |
| 2012/0239194 A1* | 9/2012 | Kagawa | 700/254 |

* cited by examiner

FIG.5

|  | MOTOR ORIGIN | ARM LENGTH | | | TORSION ANGLE |
|---|---|---|---|---|---|
|  | $\theta$ (red) | a (mm) | b (mm) | d (mm) | $\alpha$ (red) |
| J1 | 0 | a1 | 0 | d1 | $-\pi/2$ |
| J2 | 0 | 0 | b2 | 0 | 0 |
| J3 | 0 | a3 | 0 | 0 | $\pi/2$ |
| J4 | 0 | 0 | 0 | d4 | $-\pi/2$ |
| J5 | 0 | 0 | 0 | 0 | $\pi/2$ |
| J6 | 0 | 0 | 0 | d6 | 0 |

FIG.6

|  | a (mm) | b (mm) | d (mm) |
|---|---|---|---|
| J1 | 75 | 0 | 335 |
| J2 | 0 | −365 | 0 |
| J3 | −90 | 0 | 0 |
| J4 | 0 | 0 | 405 |
| J5 | 0 | 0 | 0 |
| J6 | 0 | 0 | 80 |

FIG.15

$$P_{\text{REFERENCE COORDINATE}} = {}^{\text{REFERENCE COORDINATE SYSTEM}}T_{\text{CAMERA COORDINATE SYSTEM}} \, P_{\text{CAMERA COORDINATE}}$$

${}^{\text{REFERENCE COORDINATE SYSTEM}}T_{\text{CAMERA COORDINATE SYSTEM}}$ : HOMOGENEOUS CONVERSION MATRIX FROM REFERENCE COORDINATE SYSTEM TO CAMERA COORDINATE SYSTEM $P_{\text{CAMERA COORDINATE}}$ : MEASUREMENT POSITION IN CAMERA COORDINATE SYSTEM $P_{\text{REFERENCE COORDINATE}}$ : MEASUREMENT POSITION IN REFERENCE COORDINATE SYSTEM

FIG.16

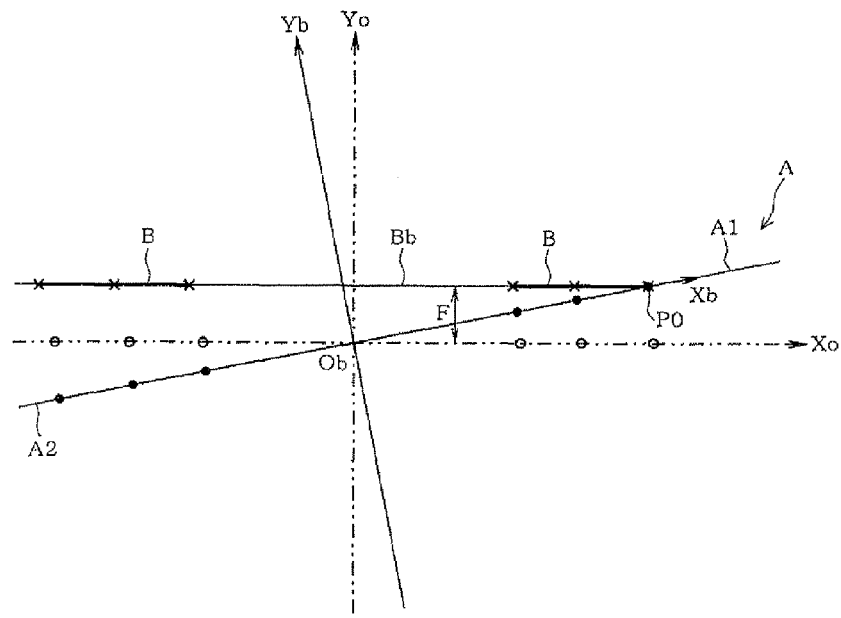

US 8,918,210 B2

METHOD OF DETECTING AN INTER-AXIS OFFSET OF 6-AXIS ROBOT

CROSS-REFERENCE TO RELATED APPLICATION

This application is based on and claims the benefit of priority from earlier Japanese Patent Applications No. 2011-060619 filed Mar. 18, 2011; No. 2011-142825 filed Jun. 28, 2011; and 2011-178962 filed Aug. 18, 2011, the descriptions of which are incorporated herein by reference.

BACKGROUND

1. Field

The present invention relates to a method for detecting an inter-axis offset of a 6-axis robot, which detects and compensates for an offset between a first rotation joint and a second, third, or fifth rotation joint, which have rotation axes perpendicular to each other.

2. Description of Related Art

A 6-axis robot is configured to convert given position data, which is expressed by fixed three-dimensional orthogonal coordinates, to angle data for a rotation joint of the robot and move an end effector (i.e., hand) of the robot to a position indicated by the position data. In this event, if an error occurs in a link (arm) length, an angle (hereinafter, referred to as a "twist angle") between rotation axes of a rotation joint and a next rotation joint, or a relation between an origin position of a link and an origin position (hereinafter, referred to as a "motor origin position") of a motor due to a working error or assembling error of components of the robot, or if a deflection is caused in a driving system of each rotation joint by an extra torque applied to the drive system, a deviation may occur in the position or posture of the end effector, so as to degrade the absolute position accuracy.

In order to improve the absolute position accuracy, various methods for compensating a rotation angle of a rotation joint in consideration of the error and deflection described above have been studied up to now. For example, "3-pair Joint Axis Estimating Method", 4.3.2, page 52, a report on "Investigation research on standardization of intelligent robots for plants" (1997), JARA (Japan Robot Association) discloses a method of detecting and compensating for an error in relation to a link length and a twist angle. Further, patent documents of JPA 2003-220587, No. 2009-274186, No. 2009-274187, and No. 2009-274188 disclose methods for detecting and compensating for an error of a motor origin position. In regard to the deflection of a driving system, there is a known method, which compensates for the deflection of a driving system by calculating a load torque applied to a motor of each rotation joint from the mass and posture of each link, obtaining a twist deformation angle of a driving system from the load torque and a spring constant of the driving system, obtaining a deflection angle of each link from the twist deformation angle, and obtaining a motor rotation angle to reduce the deflection angle of each link.

SUMMARY

The inventor has performed an experiment for a 6-axis robot, by using the method described above, to obtain a link length error, a twist angle error, a motor origin position error, and a deflection of a driving system, correct a rotation angle of each rotation joint based on the obtained values, and then determine whether the end effector moves to the position indicated by the position data. However, results of the experiment have showed nothing that satisfies the absolute position accuracy originally expected by the inventor. The inventor considered that the lack of the absolute position accuracy is not caused by the link length error, the twist angle error, the motor origin position error, and the deflection of a driving system but is caused by another error, which the inventor predicted is an error in the inter-axis offset.

When the position of each of the second, third, and fifth rotation joints after the assembling has been deviated in a direction of the rotation center line from a normal position thereof, the amount of the deviation is expressed by an amount of deviation in the direction of the rotation center line of each of the second, third, and fifth rotation joints with respect to the rotation center line of the first rotation joint, and such a deviation is called the inter-axis offset.

If the position of each of the second, third, and fifth rotation joints is deviated from a normal position thereof due to working errors, assembling errors, etc. of the components of the robot, a deviation may occur in the relation between a designed origin position in coordinates of each of the second, third, and fifth link and the rotation axis of each of the second, third, and fifth rotation joints. As a result, the end effector of the robot is deviated, by a distance corresponding to the inter-axis offset, from the position indicated by the position data. Further, the deviation from the normal position of each of the second, third, and fifth rotation joints is compensated for as a link length error.

However, up to the present, there has been no proposal for a method of measuring and compensating for the inter-axis offset. Hence it is desired to provide a method of measuring and compensating for an inter-axis offset in a 6-axis robot, so as to improve the absolute position accuracy of the robot.

In accordance with one aspect of an exemplary embodiment, first, a measurement point is arranged on an end effector of a robot arm, the robot arm is rotated around a rotation shaft of a first rotation joint, and three or more positions on a rotation trajectory of the measurement point are measured by a three-dimensional measuring means. Then, from a result of the measurement, a normal line of a plane including a position of a rotation center of the measurement point and a plurality of positions of the measurement point on the rotation trajectory is obtained, and a reference coordinate wherein the rotation center of the measurement point serves as an origin of the reference coordinate, a linear lines extending through the origin in parallel to the normal line serves as a Z-axis thereof, a linear lines extending through the origin and perpendicular to the Z-axis serves as an X-axis thereof, and a linear lines extending through the origin and perpendicular to both the Z-axis and the X-axis serves as a Y-axis thereof is determined.

Thereafter, a plurality of positions on one plane including the Z-axis of the reference coordinate and extending from the Z-axis are optionally selected, the selected positions are determined as target positions of movement, and the end effector is moved to the target positions of movement. In this event, a correction is performed in order to prevent occurrence of an error in the position of the end effector due to a motor origin error of a motor operating the first to sixth links through a first to sixth driving systems including the rotation shafts of the first to sixth rotation joints, a deflection of the first to sixth rotation driving systems, the position errors by the length errors of the first to sixth links, and angle errors between rotations shafts of a rotation joint and a next rotation joint. Then, by rotating at least one rotation joint among the second, third, and fifth rotation joints, the end effector is moved to the plurality of target positions of movement, the position of the measurement point is measured by the three-dimensional gauge at the respective target positions of movement, and the measured positions of the measurement point are subjected to a coordinate transformation into a position on the reference coordinate.

Thereafter, X-Y coordinate values of the measurement point at the plurality of positions on the reference coordinate are obtained, the obtained X-Y coordinate values of the measurement point are plotted on the X-Y plane of the reference coordinate, segments interconnecting the plotted points are put as measurement dependence segments, and a length of a perpendicular line from the origin of the reference coordinate onto a linear lines obtained by extending the measurement dependence segments is then obtained as an amount of deviation. Then, the obtained amount of deviation corresponds to a sum of inter-axis offsets of the second, third, and fifth rotation joints. By the inter-axis offsets obtained in the way described above, for example, by correcting DH (Denavit-Hartenberg) parameters, it is possible to improve the absolute position accuracy.

Further, for example, an operation of determining a plurality of positions on a plane including the Z-axis of the reference coordinate and extending from the Z-axis as target positions of movement and moving the end effector to the target positions of movement on the in plane may be performed with respect to two planes extending in opposite directions from the Z-axis of the reference coordinate. Further, a movement of the end effector from a plane extending in one direction from the Z-axis to a plane extending in the opposite direction is performed by inverting the robot arm by rotating a rotation shaft of at least one rotation joint among the second, third, and fifth rotation joints in a state in which the rotation shaft of the first rotation joint is fixed.

A measurement dependence segment capable of interconnecting positions of measurement points when the end effector is moved to a plurality of positions on one plane in one direction may be in line with a measurement dependence segment capable of interconnecting positions of measurement points when the end effector is moved to a plurality of positions on one plane in the opposite direction in a state in which the robot arm is inverted. When they are not in line with each other, it is considered that there has been an error in the process of correction in order to prevent occurrence of error in the position of the end effector due to a motor origin error of a motor, a deflection of the first to sixth rotation driving systems, position errors by the length errors of the first to sixth links, etc. Therefore, by this example, it is possible to identify whether the obtained inter-axis offset is exact.

Other various aspects of the present disclosure are described with the following explanations made using the appended drawings.

BRIEF DESCRIPTION OF THE DRAWINGS

The above and other objects, features and advantages of the present invention will be more apparent from the following detailed description taken in conjunction with the accompanying drawings, in which:

FIG. 5 is a table showing DH parameters;
FIG. 6 is a table showing specific numerical data of the DH parameters;
FIG. 15 is a view illustrating a homogeneous transformation matrix for transforming a camera coordinate to a reference coordinate;
FIG. 16 is a graph for explaining obtaining of an inter-axis offset.

DETAILED DESCRIPTION OF THE PREFERRED EMBODIMENTS

Referring to the accompanying drawings, various embodiments of a method of detecting an inter-axis offset of a 6-axis robot will now be described.

First Embodiment

Figure 1:
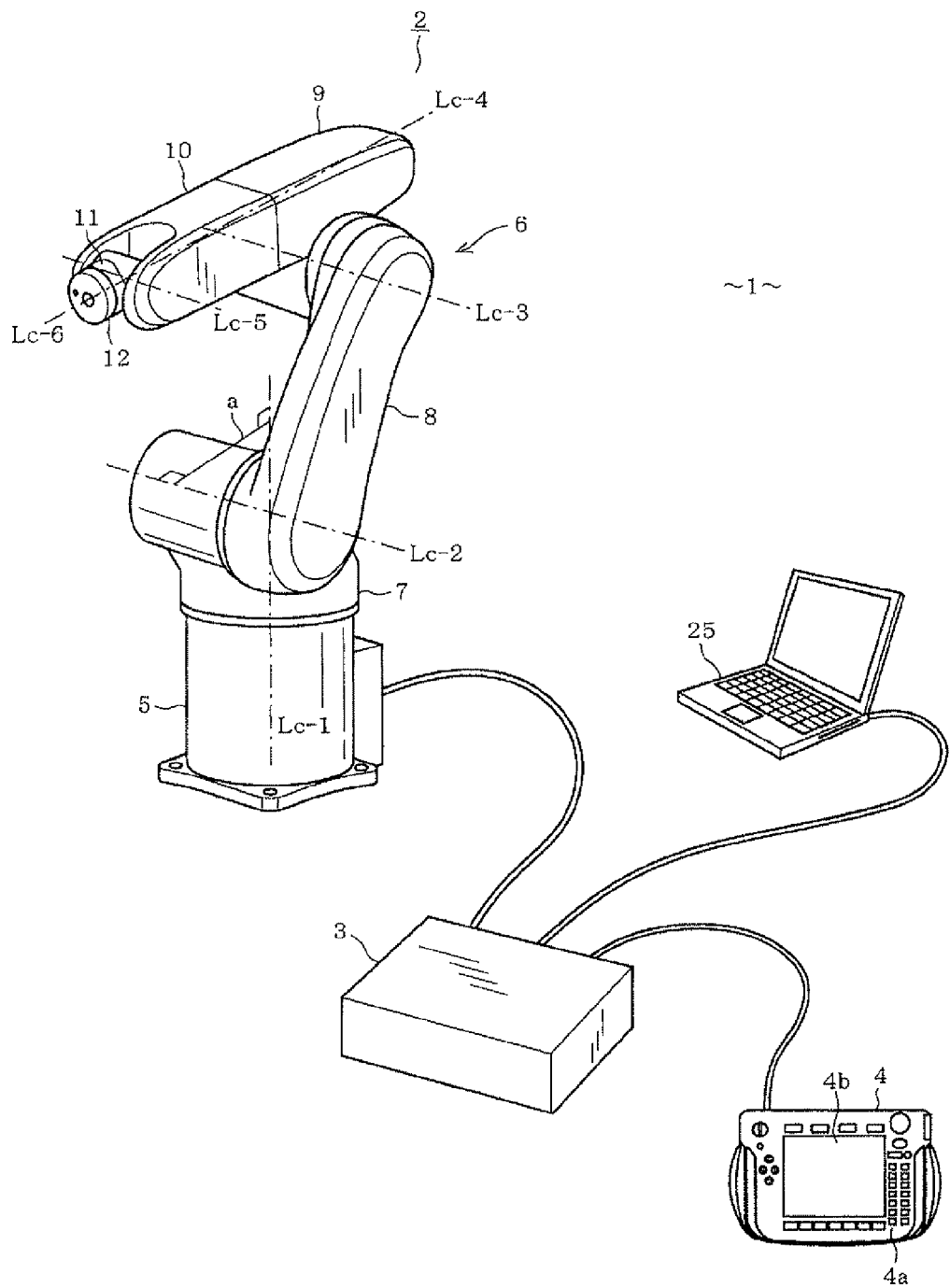
FIG. 1 is a perspective view of a robot apparatus according to an aspect of the present invention.

Hereinafter, a first embodiment of the present invention will be described with reference to FIGS. 1 to 16. FIG. 1 shows a 6-axis multiple vertical rotation joint type robot apparatus 1. The robot apparatus 1 includes a 6-axis multiple vertical joint type robot (hereinafter, simply referred to as "robot") 2, a control unit (robot control means) 3 for controlling the operation of the robot 2, and a teaching pendent (manual operating means) 4 connected to the control unit 3 to operate the robot 2 through a manual handling.

The robot 2 includes a base (base link) 5 fixed to an installation surface, such as a floor of a factory, and a robot arm 6 connected in contact with the base 5. The robot arm 6 includes a shoulder (first link) 7, a lower arm (second link) 8, a first upper arm (third link) 9, a second upper arm (fourth link) 10, a wrist (fifth link) 11, and a flange (sixth link) 12, which are sequentially connected to one another through their respective rotation joints, i.e. first to sixth rotation joints J1 to J6 (not shown in FIG. 1).

In other words, the shoulder 7 is connected to an upper portion of the base 5 through the first rotation joint J1 in such a manner that the shoulder 7 is horizontally pivotable around the first axis Lc-1, the lower arm 8 is supported by a distal end part of the shoulder 7 through the second rotation joint J2 in such a manner that the lower arm 8 is vertically pivotable around the second axis Lc-2, the first upper arm 9 is supported by a distal end part of the lower arm 8 through the third rotation joint J3 in such a manner that the first upper arm 9 is vertically pivotable around the third axis Lc-3, the second upper arm 10 is supported by a distal end part of the first upper arm 9 through the fourth rotation joint J4 in such a manner that the second upper arm 10 is twist-rotatable around the fourth axis Lc-4, the wrist arm 11 is supported by a distal end part of the second upper arm 10 through the fifth rotation joint J5 in such a manner that the wrist arm 11 is vertically pivotable around the fifth axis Lc-5, and the flange 12 is supported by a distal end part of the wrist arm 11 through the sixth rotation joint J6 in such a manner that the flange 12 is twist-rotatable around the sixth axis Lc-6.

Figure 2:
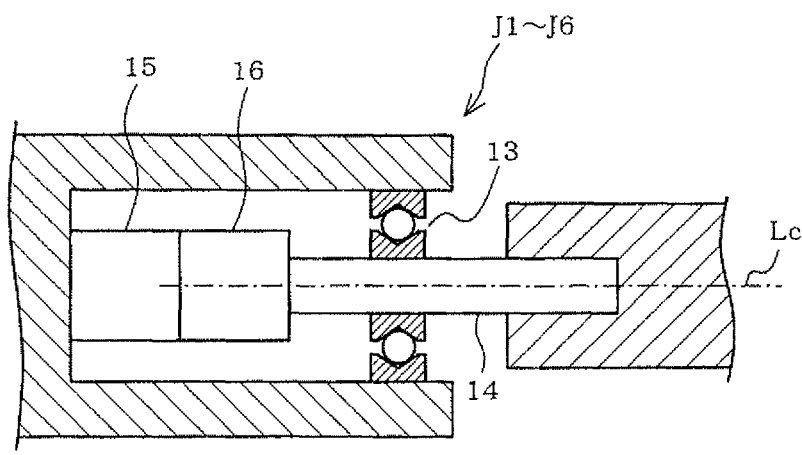
FIG. 2 is a schematic sectional view of a rotation joint.

FIG. 2 schematically shows each of the first to sixth rotation to joints J1 to J6. As shown in FIG. 2, each of the rotation joints J1 to J6 of the links 7 to 12 includes a rotation shaft 14 rotatably supported by bearings 13 inserted in a link of a previous stage, and the rotation shaft 14 is connected to a link of a next stage either directly or by a coupling member inserted between them. The rotation shaft 14 is rotated through a speed reducing device, for example, a gear reducing device 16, by a servo motor 15 as a driving source fixed to the previous link, and a rotation of the rotation shaft 14 enables a pivoting operation or a twist-rotating operation of the next link.

Herein, the first axis Lc-1 to the sixth axis Lc-6 correspond to rotation center lines of the rotation shafts 14 of the rotation joints J1 to J6, respectively. Orientations of the first axis Lc-1 to the sixth axis Lc-6 are as follows. That is to say, the first axis Lc-1, which serves as a rotation center of the shoulder 7, extends in a direction intersecting the installation surface at a right angle, and the second axis Lc-2, which serves as a rotation center of the lower arm 8, extends in a direction parallel to the direction intersecting the first axis Lc-1. That is, since the base 5 is installed on, for example, a floor of a factory, the first axis Lc-1 extends in a vertical direction with respect to the installation floor surface and the second axis Lc-2 extends in a horizontal direction. Further, the third axis Lc-3, which serves as a rotation center of the first upper arm 9, extends in parallel to the second axis Lc-2, that is, in a horizontal direction, the fourth axis Lc-4, which serves as a rotation center of the second upper arm 10, extends in a direction parallel to the direction intersecting the third axis Lc-3, the fifth axis Lc-5, which serves as a rotation center of the wrist arm 11, intersects the fourth axis Lc-4, and the sixth axis Lc-6, which serves as a rotation center of the flange 12, extends in a direction intersecting the fifth axis Lc-5.

Figure 3:
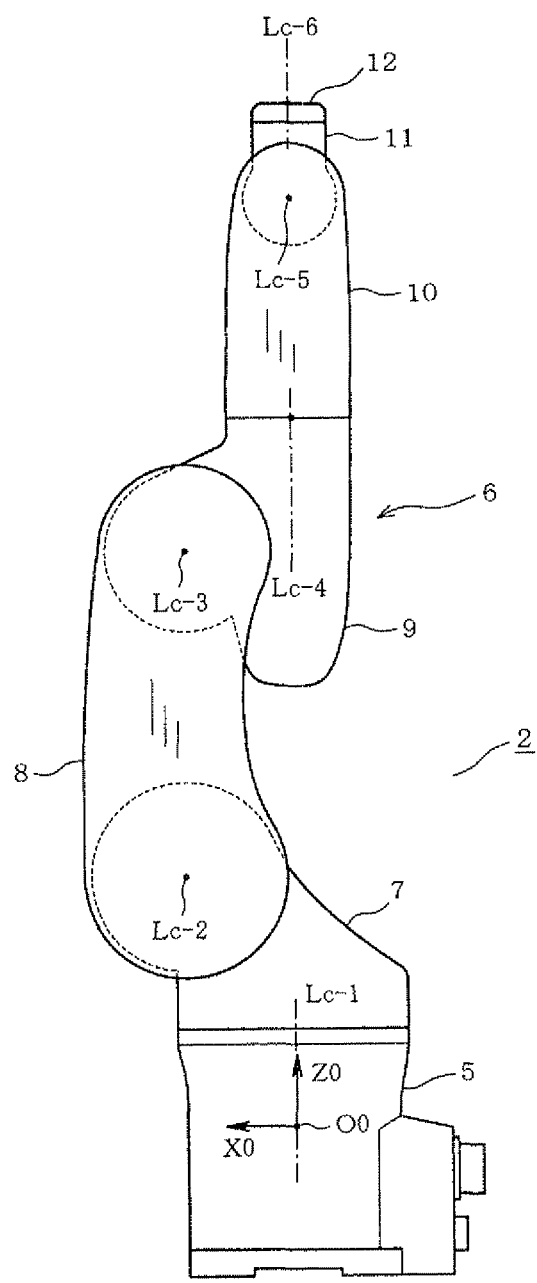
FIG. 3 is a side view of the robot in which the rotation axes of the respective rotation joints are set to their origins.

When the servo motor 15 driving the rotation shafts 14 of the shoulder 7, the lower arm 8, the first upper arm 9, the second upper arm 10, the wrist arm 11, and the flange 12 is located at an origin position, the shoulder 7, the lower arm 8, the first upper arm 9, the second upper arm 10, the wrist arm 11, and the flange 12 are also located at their origin positions. In this event, when all of the shoulder 7, the lower arm 8, the first upper arm 9, the second upper arm 10, the wrist arm 11, and the flange 12 are located at their origin positions, the robot arm 6 is in a vertical upward posture (the lower arm 8, the first upper arm 9, the second upper arm 10, and the wrist arm 11 are vertical) as shown in FIG. 3. Further, when the servo motor 15 rotates in a normal (plus) direction or an opposite (minus) direction from the origin position, the shoulder 7, the lower arm 8, the first upper arm 9, the second upper arm 10, the wrist arm 11, and the flange 12 are adapted to also rotate in a normal (plus) direction or an opposite (minus) direction from their origin positions.

Figure 4:
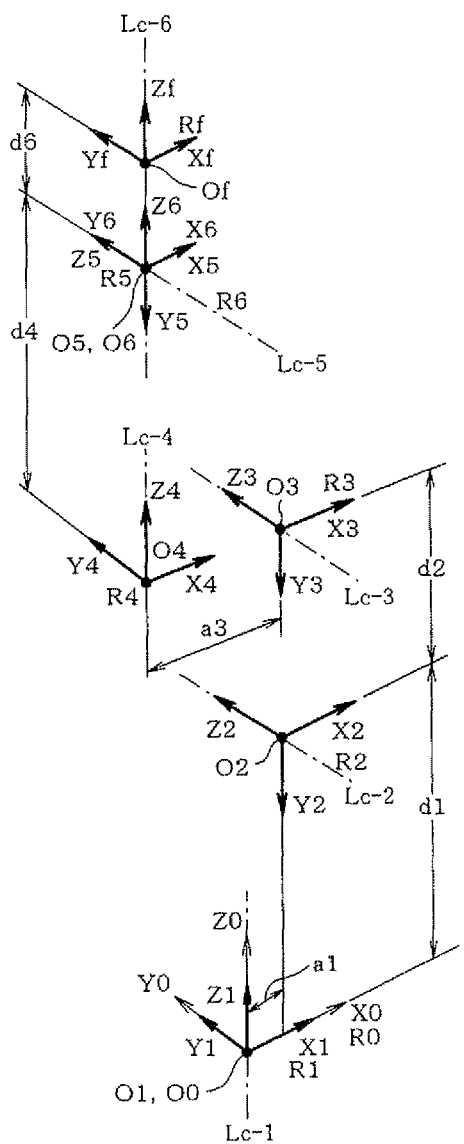
FIG. 4 is a perspective view illustrating coordinates set in each link.

In the shoulder 7, the lower arm 8, the first upper arm 9, the second upper arm 10, the wrist arm 11, and the flange 12, three-dimensional coordinates R1 to R6 are defined as shown in FIG. 4. The origins O1 to O6 of these coordinates R1 to R6 are determined to be disposed at predetermined positions on the first axis Lc-1 to the sixth axis Lc-6, which are the rotation center lines of the shoulder 7, the lower arm 8, the first upper arm 9, the second upper arm 10, the wrist arm 11, and the flange 12, and axes Z1 to Z6, which are z axes of the coordinates R1 to R6, coincide with the first axis Lc-1 to the sixth axis Lc-6, respectively.

Further, in regard to the coordinate R1 among the coordinates R1 to R6, the axis X1, which is the X-axis of the coordinate R1 of the shoulder 7, is determined to horizontally extend in a direction parallel to a common perpendicular line (corresponding to line a in FIG. 1) of the first axis Lc-1 and the second axis Lc-2, and the axis Y1, which is the Y-axis of the coordinate R1 of the shoulder 7, is determined to horizontally extend in a direction obtained by an outer product between vectors of the axis Y1 and the axis Z1 (that is, a direction perpendicular to both the axis Y1 and the axis Z1). In regard to the other coordinates R2 to R6, each of the axes X2 to X6, which are the X-axes of the coordinates R2 to R6, is determined to extend in a direction parallel to the axis X1 of the coordinate R1 in a state in which the lower arm 8, the first upper arm 9, the second upper arm 10, the wrist arm 11, and the flange 12 are located in their origin positions, and the axes Y2 to Y6, which are the Y-axes of the coordinates R2 to R6, are determined to extend in a direction obtained by outer products between vectors of the axes Y2 to Y6 and the axes Z1 to Z6, respectively (see FIG. 4). Further, plus directions of the axes X1 to X6, the axes Y2 to Y6, and the axes Z1 to Z6 correspond to the directions indicated by arrows in FIG. 4.

In the front surface of the flange 12 also, coordinates R0 and Rf are defined, which correspond to distal ends of the base 5 and the robot arm 6. While the positions and directions of the coordinates R1 to R6 change according to the rotations of the shoulder 7, the lower arm 8, the first upper arm 9, the second upper arm 10, the wrist arm 11, and the flange 12, the coordinate R0 of the base 5 is fixed and serves as a robot coordinate. In the present embodiment, the origin O0 of the robot coordinate R0 is determined to be disposed at a position coinciding with the origin O1 of the coordinate R1 in the first axis Lc-1, which is the rotation center line of the shoulder 7. Further, the axis Z0, which is a Z-axis, coincides with the first axis Lc-1, and the axis X0, which is an X-axis, and the axis Y0, which is a Y-axis, coincide with the axis X1 and the axis Y1 of the coordinate R1 of the shoulder 7 when the shoulder 7 is located at the origin position.

Figure 8:
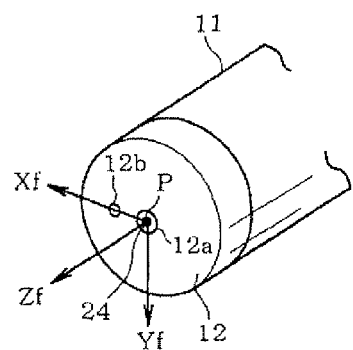
FIG. 8 is a perspective view of a flange.

The coordinate Rf of the distal end surface of the flange 12 serves as a coordinate of the end effector (i.e., hand), its origin Of is determined to coincide with an intersection point between the sixth axis Lc-6 and the distal end surface of the flange 12, that is, to coincide with a center P of the circular distal end surface of the flange 12 as shown in FIG. 8, the axis Zf, which is a Z-axis, is determined to coincide with the sixth axis Lc-6, and the axis Xf, which is an X-axis, and the axis Yf, which is a Y-axis, are determined to extend in parallel to the axis X6 and the axis Y6 of the coordinate R6 of the flange 12. Further, the center P of the distal end surface of the flange 12 is determined to be disposed on the end effector, which is the distal end of the robot arm 6.

In the present embodiment, among the coordinates R0 to R6 and Rf, the coordinates R1 to R6 and Rf, excluding the coordinate R0, have origins O1 to O6 and Of, which are disposed on the same virtual plane (vertical plane) including the axis X1 and the axis Z1 of the coordinate R1.

The relation between the coordinates R0 to R6 and Rf defined as described above may be expressed by DH (Denavit-Hartenberg) parameters well known in the art. FIG. 5 illustrates a table in which the DH parameters are arranged. For example, in relation to the row J1, it is noted from the table that, if the coordinate R1 is moved in parallel by a1 in the direction of the axis X1 and moved in parallel by d1 in the direction of the axis Z1 without being moved in parallel in the direction of the axis Y1, and is then rotated by a twist angle of −π/2 around the axis X1, the coordinate R2 is obtained. Further, for example, in relation to the row J6, it is noted that, if the coordinate R6 is moved in parallel by d6 in the direction of the axis Z6 without being moved in parallel in any of the directions of the axis X6 and the axis Y6, an end effector coordinate Rf is obtained. In addition, when the shoulder 7 is located at the origin position, the coordinate R1 coincides with the robot coordinate R0, so the relation between the robot coordinate R0 and the coordinate R1 of the shoulder 7 is not expressed in FIG. 5. FIG. 6 shows detailed numerical examples of a, b, and d.

Figure 7:
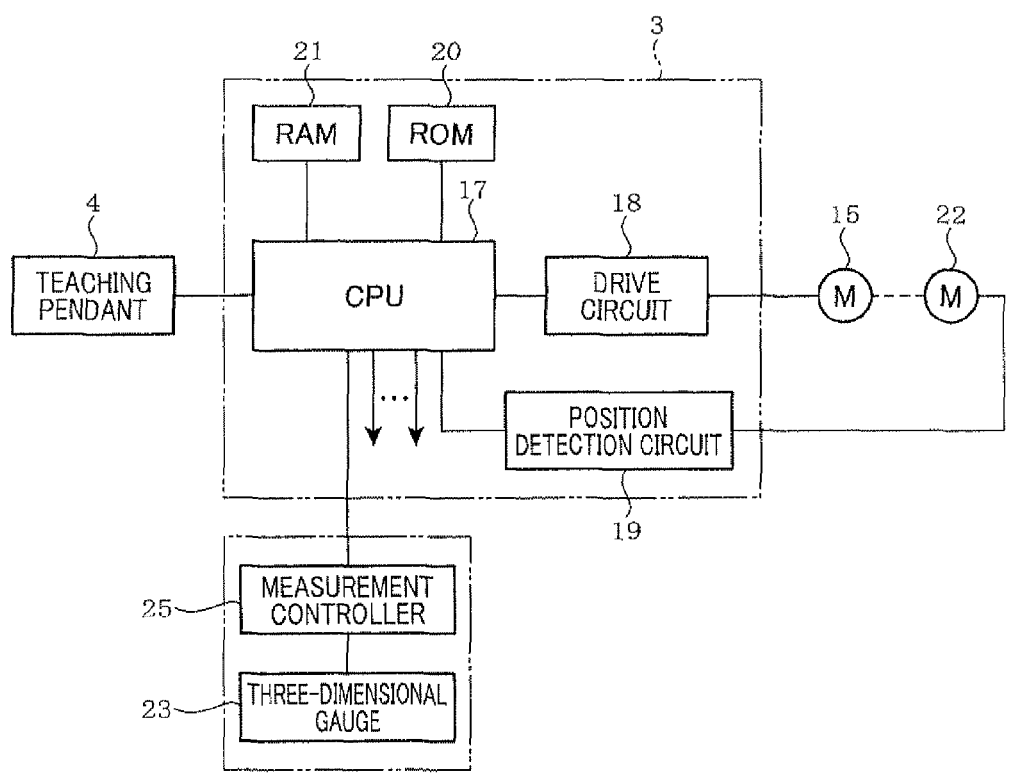
FIG. 7 is a block diagram illustrating a control unit.

As shown in FIG. 7, the control unit 3 includes a CPU (control means) 17, a driving circuit (driving means) 18, and a position detection circuit (position detection means) 19. The CPU 17 is connected to a ROM 20 storing a robot language for making an operation program and a system program of the entire robot 2 and various data, such as DH parameters and a RAM 21 storing the operation program of the robot 2, and is also connected to the teaching pendent 4 used for a teaching work, etc. The teaching pendent 4 includes, as shown in FIG. 1, various operating units 4a and a display 4b formed of a liquid crystal.

The position detection circuit 19 is connected to a rotary encoder 22, which serves as a rotation sensor, connected to a rotation shaft (not shown) of each servo motor 15. The position detection circuit 19 detects rotation angles of the shoulder 7, the lower arm 8, the first upper arm 9, the second upper arm 10, the wrist arm 11, and the flange 12 based on the detected rotation angle information of each rotary encoder 22, and provides the detected rotation angle information to the CPU 17.

If the position (position of the origin Of the end effector coordinate Rf) and the posture (directions of the axes Xf and Yf of the end effector coordinate Rf) of the end effector on the robot coordinate R0 are given, the rotation angles of the shoulder 7, the lower arm 8, the first upper arm 9, the second upper arm 10, the wrist arm 11, and the flange 12, which made the position and the posture of the end effector, are obtained by a well-known computation method of inverse dynamics using Jacobian matrix. Further, on the contrary, if the rotation angles of the shoulder 7, the lower arm 8, the first upper arm 9, the second upper arm 10, the wrist arm 11, and the flange 12 are given, the position and the posture of the end effector on the robot coordinate R0 can be calculated from the rotation by a well-known computation method of dynamics using coordinate transformation. Such computation methods of dynamics and inverse dynamics use the DH parameters indicating the relation between respective coordinates R0 to R6 and Rf as well known in the art.

Further, if the CPU 17 acquires a target position of the end effector from the operation program, the CPU 17 calculates target operation angles of the shoulder 7, the lower arm 8, the first upper arm 9, the second upper arm 10, the wrist arm 11, and the flange 12 from the target position of the end effector, and then provides an operation command to the driving circuit 18 according to the target operation angles. The driving circuit 18 drives each servo motor 15 according to the given operation command. In this event, the CPU 17 performs a feedback control of each servo motor 15 by using the detected rotation angle information of the shoulder 7, the lower arm 8, the first upper arm 9, the second upper arm 10, the wrist arm 11, and the flange 12 fed back from the position detection circuit 19 as feedback information.

In the meantime, as described above, all of the origins O1 to O6 and Of the coordinates R1 to R6 of the shoulder 7, the lower arm 8, the first upper arm 9, the second upper arm 10, the wrist arm 11, and the flange 12 and the end effector coordinate Rf are located on the same vertical plane including the axis X1 and the axis Z1 of the coordinate R1 of the shoulder 7. Therefore, if the robot 2 has been assembled with a high precision, the center P of the distal end surface of the flange 12 corresponding to the end effector coincides with the origin Of the end effector coordinate Rf. Further, the end effector exactly moves to the target position if the shoulder 7, the lower arm 8, the first upper arm 9, the second upper arm 10, the wrist arm 11, and the flange 12 are rotated by only the target operation angles.

However, due to working errors, assembling errors, etc. of the components of the robot 2, if the positions of respective rotation shaft 14 of the rotation joints J2, J3, and J5 of the lower arm 8, the first upper arm 9, and the wrist arm 11 are deviated in the directions of the second axis Lc-2, the third axis Lc-3, and the fifth axis Lc-5 and thus generate an error (inter-axis offset) between the deviated positions and the normal positions thereof, the actual position of the end effector (center P of the distal end surface of the flange 12) is deviated from the origin Of the originally designed end effector coordinate Rf.

Then, with, rotations of the shoulder 7, the lower arm 8, the first upper arm 9, the second upper arm 10, the wrist arm 11, and the flange 12 by only target operation angles, the actually moved position of the end effector is deviated in a horizontal direction from the target position by the sum of inter-axis offsets of the rotation shafts 14 of the rotation joints J2 and J3 (when the fifth axis Lc-5 is vertical) or by the sum of inter-axis offsets of the rotation shafts 14 of the rotation joints J2, J3, and J5 (when the fifth axis Lc-5 is horizontal).

Further, it is considered that, since the distance from the rotation center line Lc-5 to the end effector is short, the inter-axis offset of only the rotation joint J5 is small and there is nearly no difference between the sum of the inter-axis offsets of the rotation shafts 14 of the rotation joints J2 and J3 and the sum of the inter-axis offsets of the rotation shafts 14 of the rotation joints J2, J3, and J5.

A method according to the present invention is intended to make the actually moved position of an end effector approach a target position as much as possible by predicting a sum of the inter-axis offsets of the rotation shafts 14 of the rotation joints J2, J3, and J5, and then correcting DH parameters by only the predicted sum of the inter-axis offsets.

In the method according to the present invention, when the end effector is moved to a plurality of target positions by operating the teaching pendent 4, the actually moved position of an end effector is measured by a three-dimensional gauge (three-dimensional measuring means) 23 shown in FIG. 7, an amount of deviation of the actually moved position from a target position is calculated, and an inter-axis offset is predicted from the calculated deviation amount. In this event, the deviation between the actually moved position and the target position may be generated by not only the inter-axis offset but also other factors, such as deflection of rotation driving systems of the rotation joints J1 to J6, an origin position error of each servo motor 15, a length error of each of the links 7 to 12, and a twist angle error between the rotation shafts 14 of the rotation joints J1 to J6. Therefore, it is necessary to previously perform a correction in order to prevent occurrence of a position error due to such factors.

The three-dimensional gauge 23 may be a three-dimensional gauge (for example, TOYOU TECHNICA Inc.; ROBOT CALIBRATION ROCAL SYSTEM) equipped with three CCD cameras. Further, the three-dimensional gauge 23 may be a laser tracker, etc. In order to detect the position of the end effector of the robot arm 6 by this three-dimensional gauge 23, a light emitting diode 24 is provided at the center P of the distal end surface of the flange 12 as a measurement point as shown in FIG. 8. In this event, since a central hole 12a is formed at the flange 12 and the center P of the distal end surface of the flange 12 is located on the center line of the central hole 12a, the light emitting diode 24 is disposed at the center within the central hole 12a and simultaneously is aligned with the distal end surface of the flange 12, so as to make the light emitting diode 24 be exactly located on the center (end effector) P of the distal end surface of the flange 12. Further, the flange 12 has a small hole 12b formed thereon, which is formed at a position spaced apart from the central hole 12a such that a linear lines interconnecting the central hole 12a and the small hole 12b can serve as the axis Xf of the end effector coordinate Rf.

The measurement position of the light emitting diode 24 by the three-dimensional gauge 23 is indicated at a position on a three-dimensional coordinate (hereinafter, referred to as camera coordinate) Rc set in advance in the three-dimensional gauge 23 by a measurement control device 25 including a personal computer. A distance corresponding to one gradation of this camera coordinate Rc is determined to be the same as a distance when the end effector has moved by one gradation of the robot coordinate R0. Therefore, the length of one gradation of the robot coordinate R0 and the length of one gradation of the camera coordinate Rc indicate the same distance.

Figure 9:
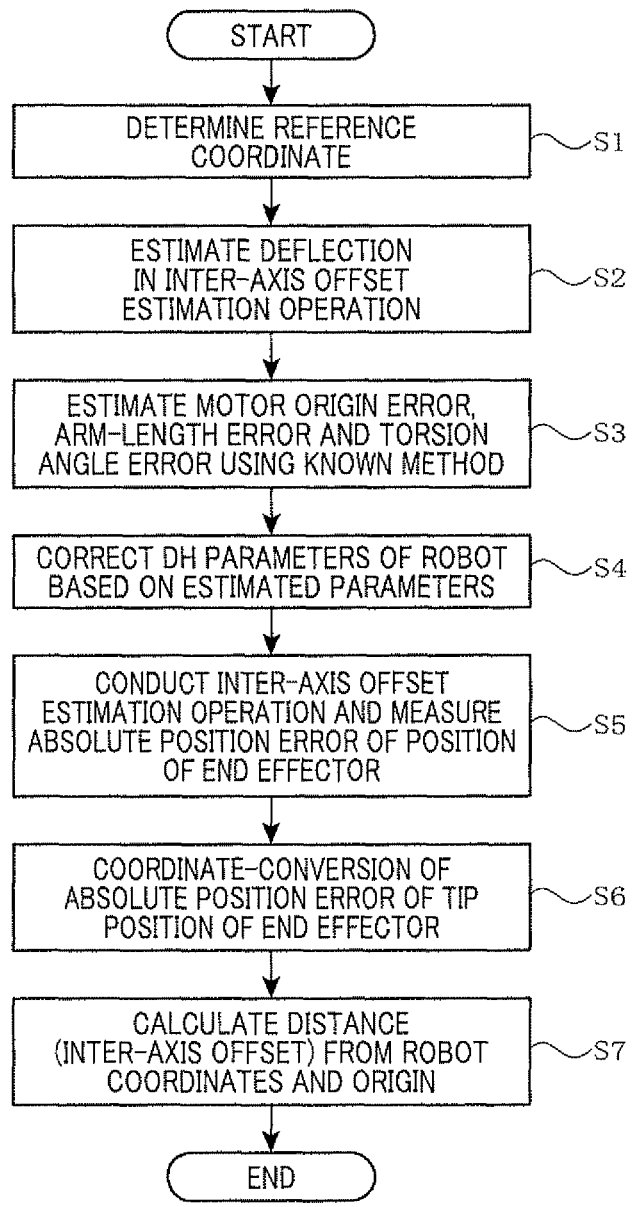
FIG. 9 is a flowchart illustrating a process according to the present invention.

The method of the present invention is performed by a process as shown in FIG. 9. First, the position of the robot coordinate R0 on the camera coordinate Rc and the directions of the axis X0, the axis Y0, and the axis Z0 of the robot coordinate R0 are unknown. Therefore, in the present embodiment, a reference coordinate Rb is set as a coordinate replacing the robot coordinate R0 on the camera coordinate Rc (step S1 of FIG. 9). The setting of the reference coordinate Rb is performed using the teaching pendent 4.

Hereinafter, the teaching pendent 4 will be described. The teaching pendent 4 is configured to be capable of rotating the shoulder 7, the lower arm 8, the first upper arm 9, the second upper arm 10, the wrist arm 11, and the flange 12 by only desired angles in normal and reverse directions from their individual origin positions by individually rotating the servo motors 15 of the shoulder 7, the lower arm 8, the first upper arm 9, the second upper arm 10, the wrist arm 11, and the flange 12 by only desired angles.

Further, the teaching pendent 4 is adapted to be capable of appointing the position and posture of the end effector in the robot coordinate R0. When the position and posture of the end effector in the robot coordinate R0 is appointed by the teaching pendent 4, the CPU 17 of the robot apparatus 1 calculates rotation angles of the shoulder 7, the lower arm 8, the first upper arm 9, the second upper arm 10, the wrist arm 11, and the flange 12 and operates the respective servo motors 15 so as to make them have the calculated rotation angles. As a result, the end effector is operated to have the appointed position and posture.

Further, if a user wants to know the current position and posture of the end effector of the end effector of the robot arm 6 and thus performs an operation for that purpose, the CPU 17 computes the position and posture of the end effector from the rotation angles of the shoulder 7, the lower arm 8, the first upper arm 9, the second upper arm 10, the wrist arm 11, and the flange 12, and the display 4b of the teaching pendent 4 displays the position and posture of the end effector on the robot coordinate R0.

In order to set the reference coordinate Rb on the camera coordinate Rc, first, the operating units 4a of the teaching pendent 4 are operated, so as to make the robot arm 6 have a predetermined posture while maintaining a state in which the fifth axis Lc-5, which is the rotation center line of the rotation shaft 14 of the fifth rotation joint J5, is parallel to the second axis Lc-2 and the third axis Lc-3, which are rotation center lines of the rotation shafts 14 of the second and third rotation joints J2 and J3, that is, the fifth axis Lc-5 is horizontal. The predetermined posture of the robot arm 6 in this event is maintained to be a posture in which, when the robot arm 6 is rotated around the first axis Lc-1, the light emitting diode 24 moves along one rotation trajectory, that is, a posture in which the light emitting diode 24 is spaced apart in the horizontal direction from the first axis Lc-1, which corresponds to, in the present embodiment, a posture in which the lower arm 8 and the first upper arm 9 have rotated from the vertical upright state of FIG. 3 so that the flange 12 is oriented slantly downward (a forward-bending posture in which the robot arm 6 has been fallen down forward (plus side of the axis X0) of the shoulder 7). Further, while the robot arm 6 is maintained in this posture, the shoulder 7 is rotated about the first axis Lc-1 by a desired angle, preferably at least a total of 180 degrees including the position of plus 90 degrees, the position of 0 degrees (origin position), and the position of minus 90 degrees.

Figure 10:
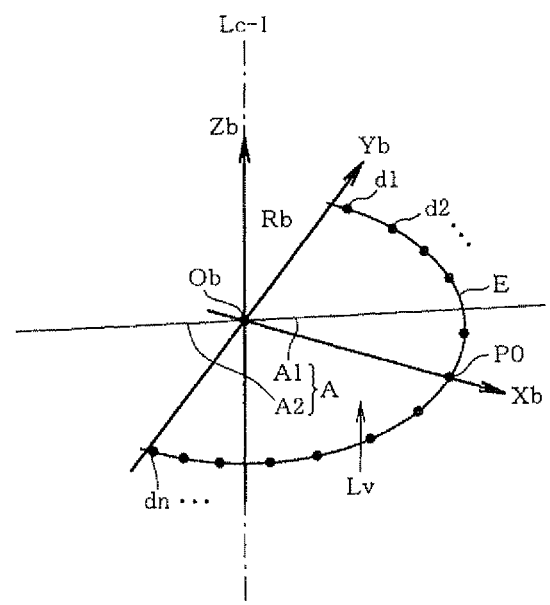
FIG. 10 is a perspective view for describing setting of a reference coordinate.

Then, since the light emitting diode 24 as a measurement point for setting a robot coordinate follows a circular rotation trajectory E around the first axis Lc-1 as shown in FIG. 10, the position of the light emitting diode 24 on the rotation trajectory E is measured by the three-dimensional gauge 23 at a plurality of positions d1, d2, . . . , dn including three or more different points. From the plurality of positions d1, d2, . . . , dn of the light emitting diode 24 on the rotation trajectory E measured by the three-dimensional gauge 23, the measurement control device 25 calculates the position of the rotation center Ob of the light emitting diode 24 by the least square method and simultaneously obtains a normal line Lv of one plane including the rotation trajectory E of the light emitting diode 24. Further, the measurement control device 25 determines the position Ob of the rotation center as the origin of the reference coordinate Rb and determines a line, which extends through the origin Ob in parallel to (in the same direction as) the normal line Lv, as the axis Zb (Z-axis) of the reference coordinate Rb.

In addition, a predetermined line extending through the origin Ob and intersecting the axis Zb, for example, a line interconnecting the origin Ob and the position P0 of the light emitting diode 24 when the shoulder 7 has been rotated from the origin position, is determined as the axis Xb (X-axis) of the reference coordinate Rb, and a line intersecting both the axis Zb and the axis Xb is obtained from an outer product between vectors of the axes and is then determined as the axis Yb (Y-axis) of the reference coordinate Rb. Further, the length of one gradation of the reference coordinate Rb is determined to be the same as the length of one gradation of the camera coordinate Rc.

By the process described above, a reference coordinate Rb is set on the camera coordinate Rc. In the reference coordinate Rb set as described above, the axis Zb is located on the axis Z0 of the robot coordinate R0 along the first axis Lc-1 and the XbYb plane is parallel to the X0-Y0 plane. Further, if there is no inter-axis offset, the axis Xb and the axis Yb are parallel to the axis X0 and the axis Y0. However, when there is an inter-axis offset, since the position P0 of the light emitting diode 24 is deviated by the inter-axis offset in the X0-Y0 direction, the axis Xb and the axis Yb are not parallel to the axis X0 and the axis Y0 and are inclined according to the inter-axis offset as shown in FIG. 16. Further, at the time of setting the reference coordinate Rb, if the position of the end effector is located on the X0-Y0 plane, the Xb-Yb plane coincides with the X0-Y0 plane.

Figure 12:
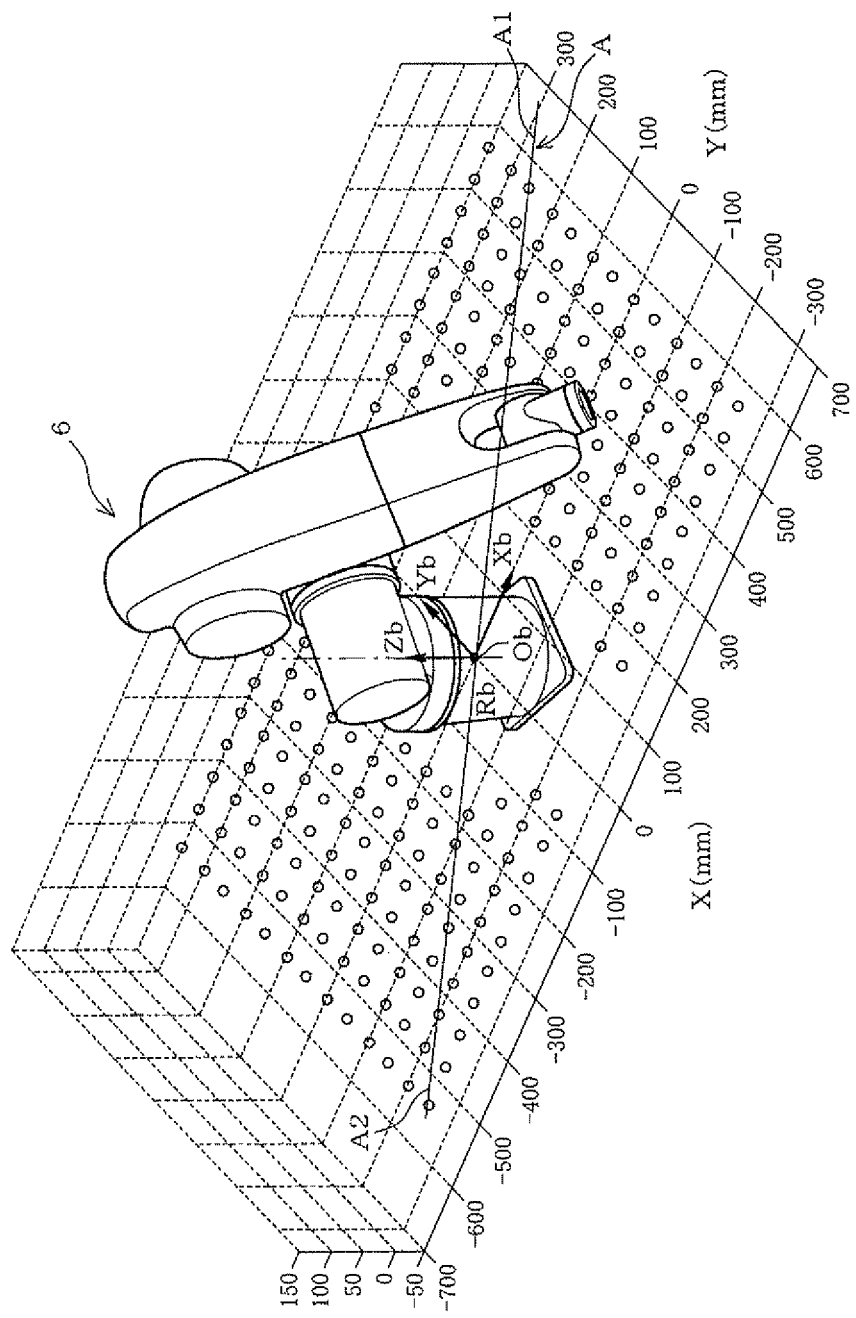
FIG. 12 is a perspective illustrating target positions of movement.

After the reference coordinate Rb is set, one vertical plane including the axis Zb is taken into consideration and a plurality of positions within the plane are determined as target positions of movement. Specifically, in the present embodiment, as shown in FIGS. 10 and 12, a predetermined extension line A1 extending from the axis Zb (origin b) is set on the Xb-Yb plane of the reference coordinate Rb, and an extension line A2 extending from the axis Zb in the opposite direction to the predetermined extension line A1 is also set on the Xb-Yb plane. This extension line A1 in one direction and the extension line A2 in the opposite direction configure one linear lines A passing through the axis Zb, and the linear lines A is located within one plane including the axis Zb. Also, the predetermined extension line A1 is specified by an angle by which the predetermined extension line A1 makes with respect to the axis Xb. For example, in order to set an extension line making plus 30 degrees with respect to the axis Xb, the shoulder 7 is rotated 30 degrees from the origin. In this embodiment, a plurality of such linear lines A are set (although FIGS. 10 and 12 show only one of them), and one linear lines A among the plurality of linear lines A is parallel to the axis Xb.

Further, a plurality of positions are optionally selected on each of the extension lines A1 and A2. Accordingly, the plurality of optionally selected positions on each of the extension lines A1 and A2 exist in one vertical plane including the axis Zb. The plurality of optionally selected positions are indicated by small white empty circles in FIG. 12. To the plurality of optionally selected positions on each linear lines A, the end effector of the robot arm 6 is moved as described later, in order to obtain the inter-axis offset.

Here, although the plurality of optionally selected positions on the linear lines A are positions indicated by coordinate values (Xb, Yb, Zb) of the reference coordinate Rb, the target positions of movement of the end effector operated by the teaching pendent 4 are indicated the coordinate values (X0, Y0, Z0) of the reference coordinate Rb. By this reason, it is necessary to obtain the relation between the robot coordinate R0 and the reference coordinate Rb. In this embodiment, since the axis Zb coincides with the axis Z0, the position of the light emitting diode 24 on the axis Z0 in the obtained reference coordinate Rb corresponds to the position (this position is referred to as Za) of the reference coordinate Rb on the axis Z0 of the Xb-Yb plane.

Further, in relation to the axis Xb and the axis Yb, when there is an inter-axis offset, the axes are inclined as described above. However, the inclination angle is unclear. In contrast, when there is no inter-axis offset, the axis Xb and the axis Yb are parallel to the axis X0 and the axis Y0. Therefore, when there is no inter-axis offset, if the robot coordinate R0 has been moved in parallel to Za along the axis Z0, the robot coordinate R0 coincides with the reference coordinate Rb.

Further, from the relation between the robot coordinate R0 and the reference coordinate Rb when there is no inter-axis offset, each of the target positions of movement is appointed by three-dimensional coordinate values toward the robot coordinate R0, and the end effector is moved to the appointed position. Then, the actually moved position of the end effector may be deviated in the Xb-Yb direction by only a distance corresponding to the inter-axis offset from the target position of movement on the reference coordinate Rb obtained as described above. Therefore, from the amount of the deviation, it is possible to calculate an amount of deviation of the inter-axis offset. Accordingly, the following description is based on an assumption that the axis Zb of the reference coordinate Rb is located on the axis Z0 of the robot coordinate R0 and the axis Xb and the axis Yb of the reference coordinate Rb are parallel to the axis X0 and the axis Y0 of the robot coordinate R0.

Here, before moving the end effector of the robot arm 6 to the plurality of positions optionally selected on the linear lines A1 and A2, a process of removing an error in the moved position of the end effector, which may be caused by the errors (including a deflection of a rotation driving system, an origin position error of the servo motor 15, a twist angle error, and a link length error) other than the inter-axis offset, is performed.

First, the deflection of a rotation driving system refers to a deflection in a twist direction caused by the transmission torque from the rotation shaft of the servo motor 15 through the gear reducing device 16 up to rotation shaft 14 of the first to sixth rotation joints J1 to J6. It is assumed that the rotation shaft 14 is not bent in a shape of a circular arc in the axial direction. The deflection of a rotation driving system can be obtained from a torque applied to the rotation driving system and a spring constant of the rotation driving system. Among the torque and the spring constant, the spring constant is already known in the robot 2 and the value thereof is stored in advance in the ROM 20 of the control unit 3. The torque applied to the rotation driving system will be discussed in relation to the second axis Lc-2, the third axis Lc-3, and the fifth axis Lc-5 (a large torque is not applied to and a deflection causing an absolute position error is not generated in the first axis Lc-1, the fourth axis Lc-4, and the sixth axis Lc-6).

Figure 11:
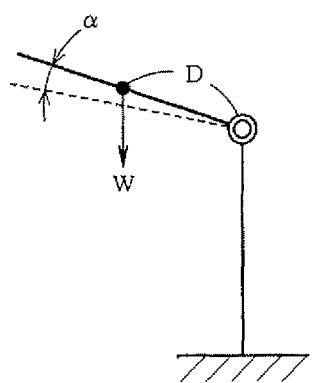
FIG. 11 is a view for explaining a deflection of a rotation driving system.

The torque applied to the rotation driving system can be obtained by a multiplication between a distance D from the rotation shaft 14 to the center of the link L supported by the rotation shaft 14 and the mass W of the link L, as shown in FIG. 11. Further, when the end effector of the robot arm 6 is moved to a plurality of optionally selected positions on the linear lines A, the end effector is moved to the positions while maintaining the fifth axis Lc-5 in parallel to the second axis Lc-2 and the third axis Lc-3, for example, by rotating only the lower arm 8 and the first upper arm 9 without rotating the shoulder 7, the second upper arm 10, the wrist arm 11, and the flange 12. The rotation angles of the second upper arm 10, the lower arm 8, the first upper arm 9, the wrist arm 11, and the flange 12 by the movement to the positions are read from the teaching pendent 4, the torques applied to the second axis Lc-2, the third axis Lc-3, and the fifth axis Lc-5 are calculated from the rotation angles, and the deflection (torsion angle) $\alpha$ of the rotation driving system is obtained (step S2 of FIG. 9).

Further, the rotation angle of the servo motor 15 is increased or decreased as much as the deflection $\alpha$ of the rotation driving system, so as to make the servo motor 15 be in a state equal to the state in which there is no deflection. That is, in FIG. 11, if the position of the link indicated by a solid line corresponds to a target position of movement when there is no deflection in the rotation driving system and the position indicated by a broken line corresponds to an actually moved position when there is a deflection in the rotation driving system, the rotation angle of the servo motor 15 is reduced by the deflection $\alpha$. As a result, in a state in which the rotation driving system is bent, the link can reach the target position of movement of the solid line.

The motor origin position error is detected by, for example, methods disclosed in patent documents of JPA 2003-220587, No. 2009-274186, No. 2009-274187, and No. 2009-274188 described above. Further, the twist angle error and the link length error are detected by, for example, a method disclosed in the JARA report described above. According to the method of the JARA report, the rotation trajectory of the end effector when the robot arm 6 is rotated around each of the first axis Lc-1 to the sixth axis Lc-6 is measured by a three-dimensional gauge, and a normal line of one plane including a rotation trajectory and a position of a rotation center is computed. Since the length of each link is obtained from the position of the rotation center and the direction of each axis is obtained from the direction of the normal line, it can be said that the link length error and the twist angle error can be obtained from those factors, i.e. the length of each link and the direction of each axis (step S3 of FIG. 9).

Moreover, the DH parameter is corrected by the obtained motor origin position error, link length error, and twist angle error, so as to prevent such errors from appearing as absolute position errors (step S4 of FIG. 9).

After the process as described above is performed, the teaching pendent is handled to first align the axis X1 of the coordinate R1 of the shoulder 7 with one desired extension line A1 among the plurality of extension lines. To this end, the shoulder 7 is rotated from the origin position by only an angle made between the extension line A1 and the axis Xb (equal to the axis X0) when there is no inter-axis offset. By this rotation, which corresponds to a rotation of the rotation shafts 14 of the second rotation joint J2 and the third rotation joint J3, the end effector can be moved to a plurality of target positions of movement arranged on the linear lines A1 and A2.

Therefore, only the rotation shafts 14 of the second rotation joint J2 and the third rotation joint J3 are rotated. Specifically, while the fifth axis Lc-5 is maintained in parallel to the second axis Lc-2 and the third axis Lc-3, that is, is horizontally maintained, only the lower arm 8 (the second axis Lc-2) and the first upper arm 9 (the third axis Lc-3) are rotated, so that the end effector is moved to a plurality of optionally selected target positions of movement on the linear lines A1 and A2. In this event, the rotation angle of the servo motor 15 is increased or decreased according to the deflection of the rotation driving system obtained for each target position of movement.

Figure 13:
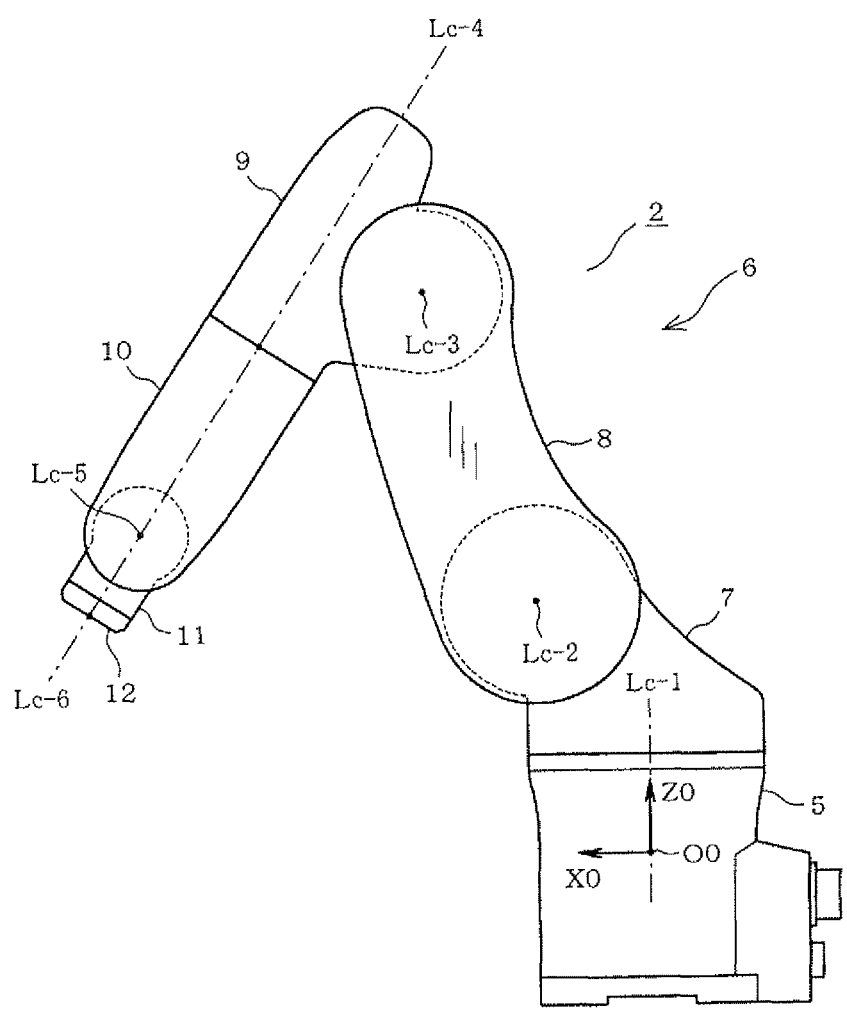
FIG. 13 is a profile illustrating a forward fallen-down state of the robot.
Figure 14:
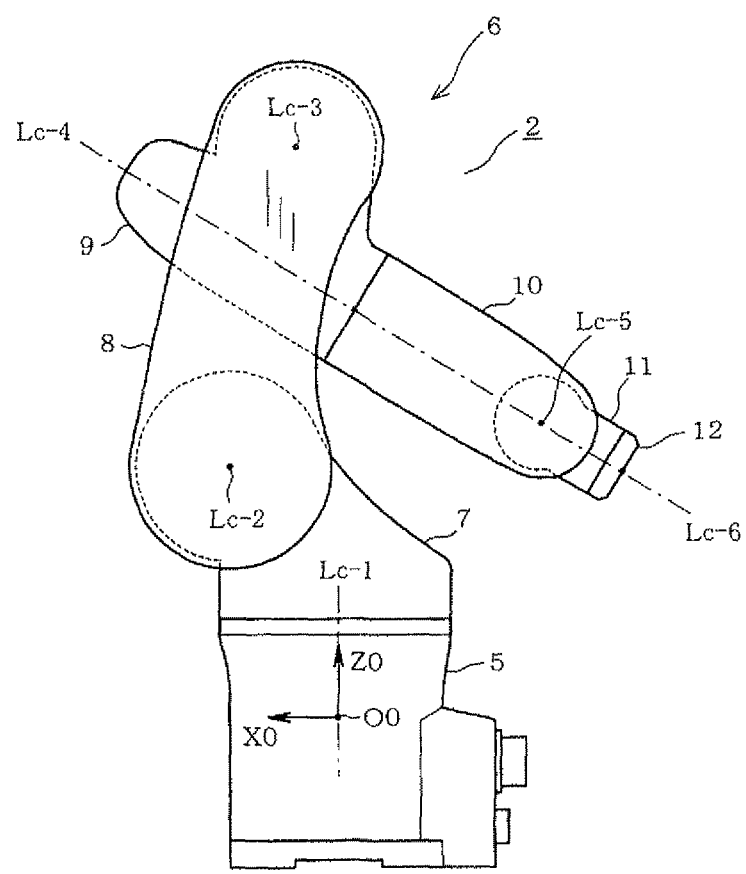
FIG. 14 is a profile illustrating a backward fallen-down state of the robot.

When the end effector is moved to a plurality of optionally selected target positions of movement on the linear lines A1 and A2, the robot arm 6 moves the end effector to a target position of movement on the linear lines A1 of one direction in a posture (forward-bending posture) in which it has been fallen down forward in said one direction from the shoulder 7, by rotating the rotation shafts 14 of at least the second rotation joint J2 and the third rotation joint J3 among the second rotation joint J2, the third rotation joint J3, and the fifth rotation joint J5 in said one direction, as shown in FIG. 13. Further, when the end effector is moved to a target position of movement on the extension line A2 of the opposite direction, the robot arm 6 moves the end effector into a posture (backward-bending posture) in which the robot arm 6 is inverted and has been fallen down backward in the opposite direction from the shoulder 7, by rotating the rotation shafts 14 of at least the second rotation joint J2 and the third rotation joint J3 among the second rotation joint J2, the third rotation joint J3, and the fifth rotation joint J5 in the opposite direction, as shown in FIG. 14.

Further, whenever the end effector is moved to a target position of movement, the position of the light emitting diode (measurement point for measuring an offset) 24 is measured by the three-dimensional gauge 23 (step S5 of FIG. 9). Since the position measured by the three-dimensional gauge 23 is a position of the camera coordinate Rc, the measured position is transformed into a position of the reference coordinate Rb. This transformation is performed by a homogeneous transformation matrix as shown in FIG. 15 (step S6 of FIG. 9).

Thereafter, the errors between the target positions of movement and the actually moved positions are divided into errors in the Zb axis direction and errors on the Xb-Yb plane, based on the coordinate values of Xb, Yb, and Zb in the reference coordinate Rb (the Xb and Yb coordinate values are equal to the X0 and Y0 coordinate value on the robot coordinate R0 and the Zb coordinate value is 0).

FIG. 16 shows the errors on the Xb-Yb plane with respect to a plurality of target positions of movement arranged on the linear lines A1 and A2 coinciding with the axis Xb. Here, for simplification of the description, it is assumed that linear lines A1 and A2 are linear lines coinciding with the axis Xb. In FIG. 16, the white empty circles indicate target positions of movement on the robot coordinate R0, the black solid circles indicate target positions of movement on the reference coordinate Rb, and the x marks indicate actually moved positions of the end effector.

When the end effector is moved to a target position of movement, since the deflection of the rotation driving system, the motor origin position error, the link length error, and the twist angle error have been treated in advance in order to prevent occurrence of an error in the moved position, it is possible to consider that an error between the target position of movement and the actually moved position may have been generated by an inter-axis offset. Further, in consideration of the error generated by the inter-axis offset, since the target position of movement is located on the axis X0, the actually moved positions are deviated from the target positions of movement by the inter-axis offsets and are arranged on a linear lines (even when they are not exactly arranged on a linear lines, they are distributed along the linear lines). Here, segments interconnecting target positions of movement determined on the linear lines A1 and A2 and actually moved positions are drawn on the Xb-Yb plane and are put as measurement dependence segments 5, and a shortest distance between a linear lines Bb obtained by extending the measurement dependence segments and the origin Ob, i.e. the length of a perpendicular line to the line Bb from the origin Ob, is then obtained. Then, the obtained shortest distance corresponds to the inter-axis offset F (step S7 of FIG. 9).

In this event, when the measurement dependence segment obtained by interconnecting the actually moved positions at the time of moving the robot arm 6 to the target positions of movement on the extension line A1 by making the robot arm 6 fall forward and the measurement dependence segment obtained by interconnecting the actually moved positions at the time of moving the robot arm 6 to the target positions of movement on the extension line A2 by making the robot arm 6 fall backward do not make one linear lines (including when they are not arranged in the vicinity of one linear lines), it is determined that there is a defect in the process described above. Then, the process is performed again from the initial step S1. As described above, by determining target positions of movement on two extension lines A1 and A2, it is possible to detect a defect at the time of execution.

Actually, for the target positions of movement determined other identical linear lines coinciding with the axis Xb as well as the linear lines A1 and A2, an inter-axis offset F is obtained in the same way as described above. In this event also, the actually moved positions of the end effector are arranged on a linear lines.

Further, for measurement dependence linear lines B also, each of which can interconnect actually moved positions with respect to target positions of movement determined on another linear lines other than the linear lines A coinciding with the axis Xb, the shortest distance to the origin Ob is measured. The shortest distance between the origin Ob and these measurement dependence linear lines B is all the same regardless of the measurement dependence linear lines B. However, it actually occurs frequently that the shortest distances are not always the same due to the measurement error, etc. In this event, the inter-axis offset is calculated by obtaining an average of the shortest distances between the origin Ob and these measurement dependence linear lines B, by which it is possible to obtain a more exact inter-axis offset.

The inter-axis offset obtained in the way described above corresponds to a sum of inter-axis offsets generated in relation to the second axis Lc-2, the third axis Lc-3, and the fifth axis Lc-5, and it is impossible to analyze the sum of the inter-axis offsets and determine the axis or axes to which the offsets relate. By this reason, from among the DH parameters shown in FIG. 5, the inter-axis offset value is added into one cell of the d column of J2 and J3 or the inter-axis offset values are divisionally added into cells of the d column of J2 and J3. Further, since the fifth axis Lc-5 can have any angle between the horizontal and the vertical by the rotation of the fourth axis Lc-4, a distribution of inter-axis offsets to cells of the d column of J5 may degrade the absolute position accuracy to the contrary. By this reason, the inter-axis offsets are not distributed in the cells of the d column of J5.

In order to check whether the absolute position accuracy has been improved by adding an inter-axis offset value or inter-axis offset values into one cell or cells of the d column of J2 and J3, an experiment, in which a plurality of target positions are appointed on the axis Xb by using the DH parameters to which the inter-axis offset has been added, the end effector is moved to the appointed target positions, and the actually moved positions are measured, was performed.

As a result of the experiment, the position error in the Xb-Yb plane was reduced from 0.67 mm to 0.17 mm. Also, the position error in the direction of the axis Zb was reduced from 0.9 mm to 0.06 mm. From the result of the experiment, it is possible to conclude that the position error in the three-dimensional direction of XbYbZb was reduced from 1.12 mm to 0.18 mm.

By the present embodiment described above, it is possible to detect the amount of the inter-axis offset, correct DH parameters by the inter-axis offset so as to completely prevent occurrence of errors due to the inter-axis offset or reduce the occurrence of errors due to the inter-axis offset as much as possible, and enhance the absolute position accuracy.

Second Embodiment

Figure 17:
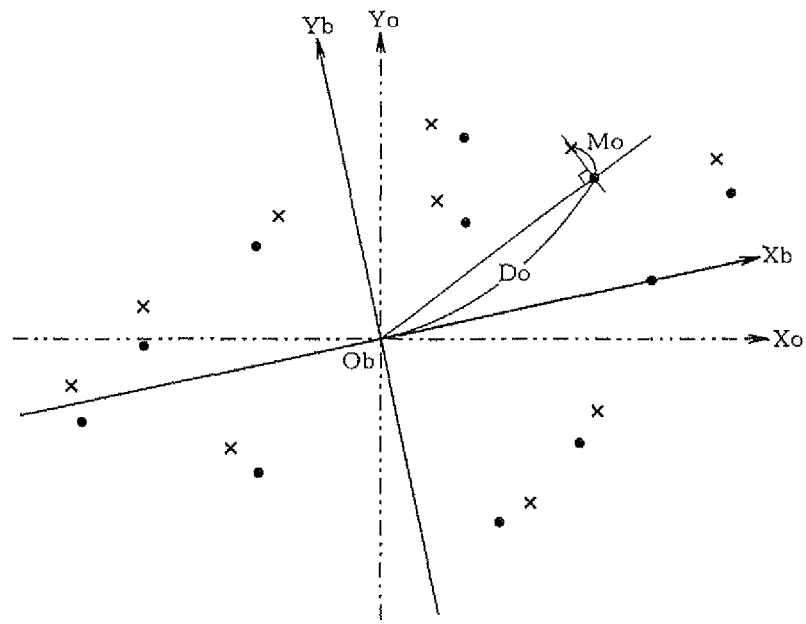
FIG. 17 is a graph illustrating a second embodiment of the present invention.

FIG. 17 shows the second embodiment of the present invention. In not only the second embodiment and subsequent embodiments but also modifications thereof, the components which are similar or identical to those described in the first embodiment will be given the same reference numerals for the sake of a simplified explanation.

In this embodiment, although the reference coordinate Rb is obtained in the same way as in the first embodiment, a different method is employed in obtaining the inter-axis offset.

In the present embodiment, when a plurality of positions are set as target positions of movement and an end effector has been moved to the plurality of position's, the inter-axis offset is obtained based on a difference between a target position of movement and an actually moved position. That is to say, the inter-axis offset is put as "0" and a plurality of positions on the reference coordinate Rb are optionally selected as target positions of movement. Further, since the inter-axis offset is put as "0", the Xb and Yb coordinate values on the reference coordinate Rb are equal to the X0 and Y0 coordinate values on the robot coordinate R0.

In FIG. 17, the plurality of positions selected as the target positions of movement are indicated by solid black circles. Among them, a movement of the end effector to a target position of movement of the plus side (the right side of Yb) of the Xb coordinate value is carried out by a forward-bending posture of the robot arm 6 and a movement of the end effector to a target position of movement of the minus side (the left side of Yb) is carried out by a backward-bending posture of the robot arm 6.

Further, as in the first embodiment, before moving the end effector of the robot arm 6 to the plurality of selected positions, a process of removing an error in the moved position of the end effector, which may be caused by the errors (including a deflection of a rotation driving system, an origin position error of the servo motor 15, a twist angle error, and a link length error) other than the inter-axis offset, is performed.

Thereafter, the end effector is moved to the plurality of selected target positions of movement. The movement in this event is performed by rotating the rotation shafts 14 of the first rotation joint J1 and the second and third rotation joints J2 and J3 among the second, third and fifth rotation joints J2, J3, and J5. In order to maintain the fifth axis Lc-5 to be horizontal, the rotation shaft 14 of the fourth rotation joint J4 is not rotated. Further, the position of the light emitting diode 24 at each target position of movement is measured by the three-dimensional gauge 23.

Since the position measured by the three-dimensional gauge 23 is a position of the camera coordinate Rc, the measured position is transformed into a position of the reference coordinate Rb. Measurement positions of the light emitting diode 24 at respective target positions of movement are indicated by x marks in FIG. 17.

In order to obtain the target position of movement, the position of the light emitting diode 24, or the inter-axis offset, the measurement positions of the light emitting diode 24 and the Xb-Yb coordinate values (equal to the X0-Y0 coordinate values) at the target positions of movement indicated by black circles in FIG. 17 are plotted on the Xb-Yb coordinate surface of the reference coordinate Rb, a length of a segment from the origin Ob to a target position of movement is put as a target position radius D0, and a length of a perpendicular line from a measurement position of the light emitting diode 24 to a linear lines extending through the origin Ob and the target position of movement is put as an offset error component M0. Further, as noted from FIG. 18, a graph having a transverse axis indicating the target position radius D0 and a longitudinal axis indicating the offset error component M0 is drawn, dots reflecting the relation between target position radiuses D0 and the offset error components M0 for respective target positions of movement are plotted, and a linear lines passing through the plotted dots is put as an error linear lines G. Then, if a perpendicular line is drawn from the origin of the graph to the error linear lines G, the length of the perpendicular line corresponds to the sum of inter-axis offsets F of the second, third, and fifth rotation joints.

Third Embodiment

Figure 19:
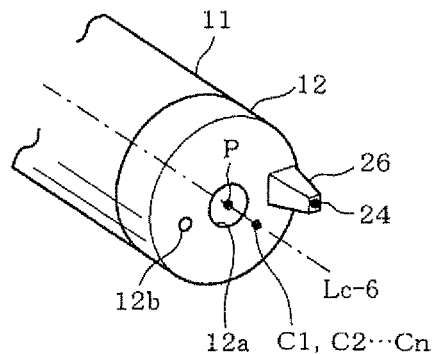
FIG. 19 is a perspective view of a flange according to a third embodiment of the present invention.
Figure 20:
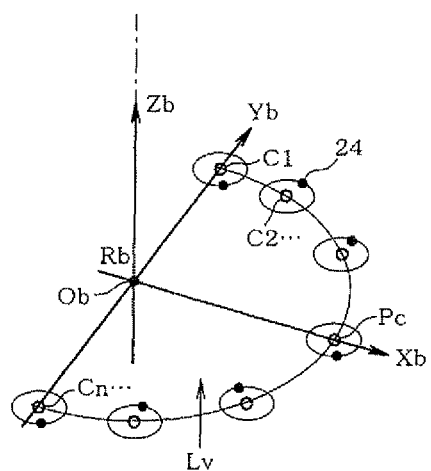
FIG. 20 is a perspective view for describing setting of a reference coordinate.
Figure 21:
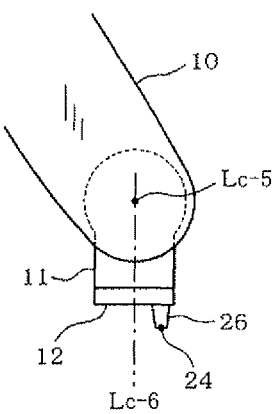
FIG. 21 is a side view illustrating a posture of the flange at target positions of movement.

FIGS. 19 to 21 show the third embodiment of the present invention. Hereinafter, constructions of the present embodiment different from those of the first embodiment will be described. In the present embodiment, the light emitting diode 24 is not attached to the end effector (center of a distal end surface of the flange 12), but is attached to a predetermined position on the flange 12 spaced apart in the direction of diameter from the rotation center line Lc-6 of the sixth rotation joint J6.

In the present embodiment, as shown in FIG. 19, a support 26 on which the light emitting diode 24 is mounted is attached to a predetermined position spaced apart from a center P of a distal end surface of the flange 12.

In order to set the reference coordinate Rb on the camera coordinate Rc, first, the fifth axis Lc-5, which is the rotation center line of the rotation shaft 14 of the fifth rotation joint J5, is maintained in parallel to the second axis Lc-2 and the third axis Lc-3, which are rotation center lines of the rotation shafts 14 of the second and third rotation joints J2 and J3, that is, the fifth axis Lc-5 is maintained to be horizontal. Simultaneously, the center P of the flange 12 is maintained to be spaced apart in the horizontal direction from the first axis Lc-1. Further, in the present embodiment, the wrist arm 11 is maintained to be oriented vertically downward as shown in FIG. 21. Moreover, while maintaining this posture, the shoulder 7 is rotated around the first axis Lc-1. During the rotation, the shoulder 7 is stopped at a plurality of predetermined angle positions, and the flange 12 is rotated at the stopped positions. The wrist arm 11 is not required to have a posture in which it is especially oriented in the vertically downward direction.

Then, by the rotation of the flange 12, the light emitting diode 24 is integrally rotated together. Therefore, at three or more different positions on the rotation trajectory of the light emitting diode 24, the position of the light emitting diode 24 on the camera coordinate Rc is measured by the three-dimensional gauge 23.

In addition, from the three or more different positions on the rotation trajectory of the light emitting diode 24 measured at the respective stopped angle positions of the shoulder 7, a center of the rotation trajectory of the light emitting diode 24 is obtained. The centers C1, C2, . . . , and Cn of the rotation trajectory of the light emitting diode 24 at the respective stopped angle position of the shoulder 7 are located on the rotation center line Lc-6 of the rotation shaft 14 of the sixth rotation joint J6 and serve as virtual end effector positions for setting a reference coordinate.

Since the virtual end effector positions C1, C2, . . . , and Cn for setting a reference coordinate are located on one circular trajectory, a center of a circle passing the virtual end effector positions C1, C2, . . . , and Cn for setting a reference coordinate is obtained by the least square method, and a normal line Lv of one plane including the circle is simultaneously obtained. Then, the center Ob of the circle is determined as the origin of the reference coordinate Rb, and a linear lines, which extends through the origin Ob of the circle in parallel to the normal line Lv, is determined as the axis Zb of the reference coordinate Rb.

Further, a predetermined line extending through the origin Ob and intersecting the axis Zb, for example, a line interconnecting the origin Ob and the position Pc of the light emitting diode 24 when the shoulder 7 has been rotated from the origin position, is determined as the axis Xb (X-axis) of the reference coordinate Rb, and a line intersecting both the axis Zb and the axis Xb is obtained from an outer product between vectors of the axes and is then determined as the axis Yb (Y-axis) of the reference coordinate Rb. By the process described above, a reference coordinate Rb is set on the camera coordinate Rc.

After the reference coordinate Rb is set, as in the first embodiment, a plurality of linear lines, each of which is configured by linear lines A1 and A2, are selected, a plurality of predetermined target positions of movement on the linear lines A1 and A2 are selected, and an inter-axis offset is then obtained. Prior to this process, a process of removing an error in the moved position of the end effector, which may be caused by the errors (including a deflection of a rotation driving system, an origin position error of the servo motor 15, a twist angle error, and a link length error) other than the inter-axis offset, is performed.

Next, the end effector of the robot arm 6 is moved to the plurality of selected positions. In the movement, the wrist arm 11 may have any posture. However, in the present embodiment, like when the reference coordinate Rb is set, the end effector is moved to a target position of movement by rotating the rotation shafts 14 of the second, third, and fifth rotation joints J2, J3, and J5 so that the end effector is moved while maintaining a posture in which the sixth axis Lc-6 of the flange coordinate R6 is maintained to be oriented in the vertically downward direction as shown in FIG. 21 (the sixth axis Lc-6 is in parallel with the first axis Lc-1).

Further, in the state in which the end effector has been moved to each target position of movement, the flange 12 is rotated. Then, since the light emitting diode 24 is also rotated by the rotation of the flange 12, three or more different predetermined positions on the rotation trajectory of the light emitting diode 24 are measured by the three-dimensional gauge 23. Then, from the measured three or more different predetermined positions on the rotation trajectory of the light emitting diode 24, a center position (a virtual end effector position for calculating the offset) of the rotation trajectory of the light emitting diode 24 is obtained and the obtained virtual end effector position for calculating the offset is subjected to a coordinate transformation from the camera coordinate Rc to the reference coordinate Rb. Since the wrist arm 11 is oriented vertically downward, the Xb and Yb coordinate values of the virtual end effector position for calculating the offset are identical to the Xb and Yb coordinate values of the end effector.

After the virtual end effector position for calculating the offset is obtained by moving the end effector to a plurality of target positions of movement on the linear lines A1 and A2 by the process as described above, a length of a perpendicular line from the origin Ob onto an extension line of segments obtained by interconnecting a plurality of virtual end effector positions for calculating the offset is obtained as an amount of deviation, which corresponds to an inter-axis offset.

Further, although the Xb and Yb coordinate values of the virtual end effector position for calculating the offset are identical to the Xb and Yb coordinate values of the end effector when the wrist arm 11 is oriented vertically downward, the wrist arm 11 is not required to be oriented vertically downward if the fifth axis Lc-5 is parallel to the second and third axes Lc-2 and Lc-3. In other words, the movement to the target positions of movement is carried out while maintaining a state in which the fifth axis Lc-5, which is the rotation center line of the wrist arm 11, is maintained to be horizontal, and the virtual end effector position for calculating the offset is thus located on a line parallel to the axis X0 (e.g. line Bb parallel to the axis X0 in FIG. 16) regardless of how the wrist arm 11 is rotated around the fifth axis Lc-5 at each target position of movement). Therefore, there is no change in the amount of the inter-axis offset which can be finally obtained.

Fourth Embodiment

In the fourth embodiment, as in the third embodiment, a support 26 on which the light emitting diode 24 is mounted is attached to a predetermined position spaced apart from a center (end effector) P of a distal end surface of the flange 12. Further, the reference coordinate Rb is obtained in the same process as that of the third embodiment. The only difference between the third embodiment and the fourth embodiment lies in the method of obtaining the inter-axis offset.

In the present embodiment, the inter-axis offset is obtained by the same method as that of the second embodiment. That is, a plurality of target positions of movement are selected at each of the plus side (the right side of Yb in FIG. 17) and the minus side (the left side of Yb in FIG. 17) of the Xb coordinate value. Then, for the plurality of selected target positions of movement, a process of removing an error in the moved position of the end effector, which may be caused by the errors (including a deflection of a rotation driving system, an origin position error of the servo motor 15, a twist angle error, and a link length error) other than the inter-axis offset, is performed.

Thereafter, the end effector is moved to the plurality of selected target positions of movement. In this event, the movement is carried out by rotating the rotation shafts 14 of the first rotation joint J1 and two or more rotation joints among the second, third, and fifth rotation is joints J2, J3, and J5, especially in the present embodiment, three rotation joints including the second, third, and fifth rotation joints J2, J3, and J5, so that the movement can be performed while maintaining a state in which the fifth axis Lc-5 is parallel to the second and third axes Lc-2 and Lc-3 and the wrist arm 11 is oriented vertically downward, that is, the axis Z6 of the coordinate R6 of the flange is oriented vertically downward (the sixth axis Lc-6 is parallel to the first axis Lc-1).

Further, at each target position of movement, the flange 12 is rotated, and three or more positions on the rotation trajectory of the light emitting diode 24 are measured by the three-dimensional gauge 23. From the three or more positions on the rotation trajectory of the light emitting diode 24, a center position (a virtual end effector position for calculating the offset) of the rotation trajectory of the light emitting diode 24 is obtained, and the virtual end effector position for calculating the offset is then subjected to a coordinate transformation from the camera coordinate Rc to the reference coordinate Rb.

Figure 18:
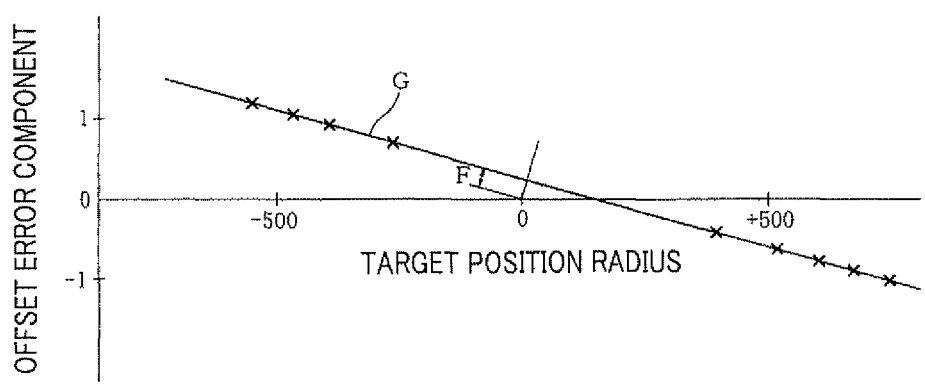
FIG. 18 is a graph for explaining obtaining of an inter-axis offset.

Thereafter, the target positions of movement and the virtual end effector positions (corresponding to the measurement positions of the light emitting diode 24 in FIG. 17) for calculating the offset are plotted on the Xb-Yb coordinate surface of the reference coordinate Rb, a length of a segment from the origin Ob to a target position of movement is put as a target position radius D0, and a length of a perpendicular line from a virtual end effector position for calculating the offset onto a linear lines extending through the origin Ob and the target position of movement is put as an offset error component M0. Then, a graph as shown in FIG. 18 is drawn, dots reflecting the relation between target position radiuses D0 and the offset error components M0 for respective target positions of movement are plotted, and a linear lines passing through the plotted dots is put as an error linear lines G. Then, a perpendicular line is drawn from the origin of the graph to the error linear lines G, and the length of the perpendicular line is obtained as an inter-axis offset amount F corresponding to the sum of inter-axis offsets of the second, third, and fifth rotation joints.

Further, in the present embodiment, if the sixth axis Lc-6, which is the rotation center line of the sixth rotation joint J6, is not parallel to the first axis Lc-1, that is, if it is not vertical, the Xb and Yb coordinate values of the virtual end effector position for calculating the offset are changed according to the inclination angle of the rotation center Lc-6, and the offset error component M0 is also changed by that change. Therefore, it is necessary to make the sixth axis Lc-6, which is the rotation center line of the sixth rotation joint J6, be vertical (Lc-6 is parallel to Lc-1), in order to make the Xb and Yb coordinate values of the virtual end effector position for calculating the offset be identical to the Xb and Yb coordinate values of the end effector.

(Modifications)

The foregoing embodiments can be expanded or modified as follows.

The axis Xb of the reference coordinate Rb is not required to be necessarily parallel to the axis X0, and any linear lines passing through the origin Ob may be selected as the axis Xb of the reference coordinate Rb. In this event, based on an angle (a rotation angle of the shoulder 7 from the origin position) made between a selected linear lines (the axis Xb) and the axis X0, a relation between the reference coordinate Rb and the robot coordinate Rc may be obtained, so that a position on the reference coordinate Rb and a position on the robot coordinate Rc can be transformed into each other through a coordinate transformation between the reference coordinate Rb and the robot coordinate Rc based on the obtained relation.

In the first embodiment, a predetermined extension line A1 extending from the axis Zb is set on the Xb-Yb plane of the reference coordinate Rb, an extension line A2 extending from the axis Zb in the opposite direction to the predetermined extension line A1 is also set on the Xb-Yb plane, and a plurality of positions on each of the extension lines A1 and A2 are optionally selected as target positions of movement. However, instead of the above positions, a plurality of optional positions within one plane (a vertical plane) including the axis Zb may be selected as target positions of movement. This is because, in a state in which the end effector has been moved to a target position of movement, the target position of movement and the actually moved position of the end effector show no difference and have the same value in the Xb axis direction and the Yb axis direction if they have the same Xb-Yb coordinate values even when there is a difference in the Zb axis coordinate value. In this event, in moving the end effector to a plurality of target positions of movement, the end effector can be moved to a selected target position of movement by rotating the rotation shaft 14 of one rotation joint among the second, third, and fifth rotation joints J2, J3, and J5.

In the first embodiment, when the end effector is moved from the linear lines A1 (a plane extending in one direction from the axis Zb) to a target position of movement of the linear lines A2 (a plane extending in the opposite direction from the axis Zb), the end effector may be moved to the target position of movement in a state in which the robot arm 6 is inverted according to the selected target position of movement by rotating the rotation shaft 14 of one rotation joint among the second, third, and fifth rotation joints J2, J3, and J5.

In the second embodiment, in moving the end effector to a plurality of optionally selected target positions of movement, the end effector may be moved by rotating the rotation shafts 14 of either all of the second, third, and fifth rotation joints J2, J3, and J5 or any two rotation joints selected among them. However, according to the selected target position of movement, the end effector may be moved to the target position of movement by rotating the rotation shaft 14 of one rotation joint among the second, third, and fifth rotation joints J2, J3, and J5, in addition to the rotation shaft 14 of the first rotation joint J1. In other words, the end effector may be moved to the target position of movement by rotating a rotation shaft of at least one rotation joint.

In the third embodiment, in moving the end effector to target positions of movement while maintaining a state in which the rotation center line Lc-6 of the sixth rotation joint J6 is parallel to the rotation center line Lc-1 of the first rotation joint J1, the end effector may be moved to selected target position of movement by rotating the rotation shafts 14 of any two rotation joints selected among the second, third, and fifth rotation joints J2, J3, and J5.

In the fourth embodiment, in moving the end effector to target positions of movement while maintaining a state in which the sixth axis Lc-6 corresponding to the rotation center line of the sixth rotation joint J6 is parallel to the first axis Lc-1 corresponding to the rotation center line of the first rotation joint J1, the end effector may be moved to selected target position of movement by rotating the rotation shafts 14 of two or more rotation joints among the second, third, and fifth rotation joints J2, J3, and J5.

Fifth Embodiment

With reference to FIGS. 22 to 30 and some of the drawings described with the first embodiment, hereinafter is described a fifth embodiment of the present invention.

The components which are similar or identical to those described in the first embodiment will now be given the reference numerals for the sake of a simplified explanation.

Figure 22:
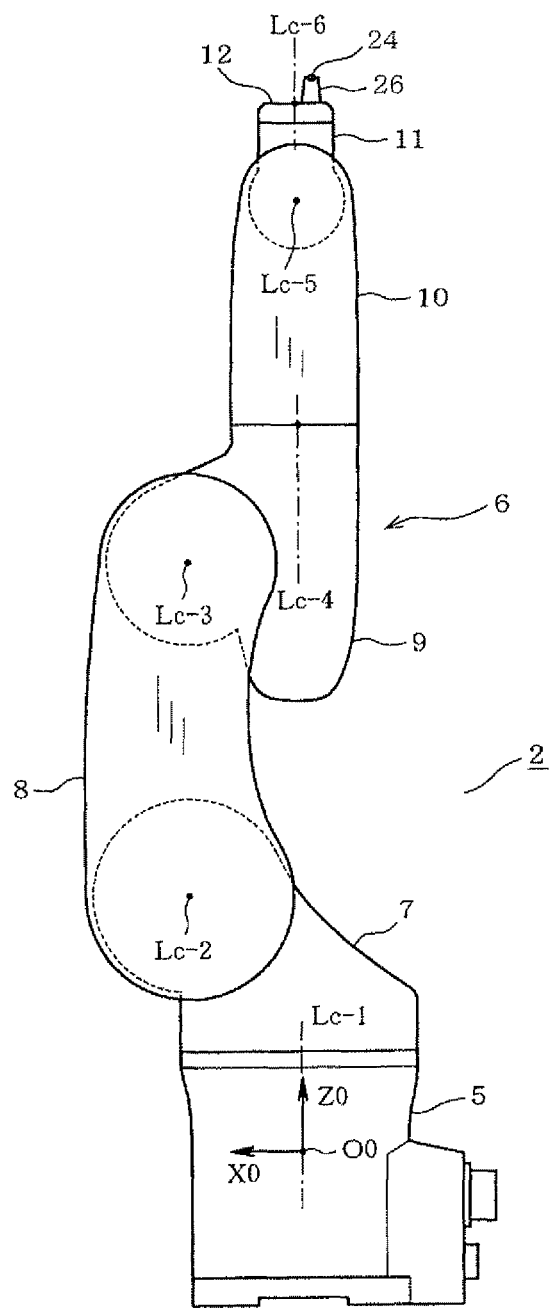
FIG. 22 is a side view of a robot in a state in which a rotation shaft of each rotation joint is set as an origin position.
Figure 23:
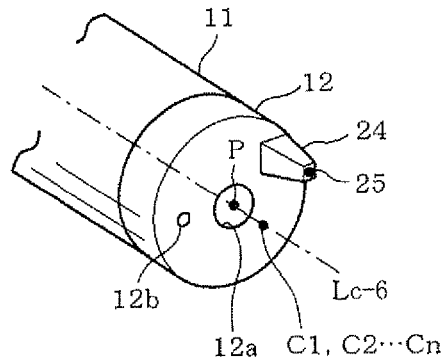
FIG. 23 is a perspective view illustrating a flange portion.

FIG. 22 shows a side view of a robot according to the present embodiment. As shown in FIGS. 2 and 23, the flange 12 has an end surface to which the support 26 is attached at an optional position distanced from the center P. The support 26 has an end portion to which a light emitting diode (LED) 24 as a measurement point is attached. The three-dimensional gauge 23 measures the position of the LED 24.

A three-dimensional coordinate (hereinafter referred to as camera coordinate) Rc is set in advance to the three-dimensional gauge 23 by a measurement controller (measurement control means) 26 composed of a computer. Positions where the three-dimensional gauge 23 measures the position of the LED 24 are indicated on the camera coordinate. The distance expressed by one graduation of the camera coordinate Rc is determined so as to be equal to the distance resulting from the movement of the end effector (i.e. hand) through one graduation of the robot coordinate R0. Accordingly, the length of one graduation of the robot coordinate R0 expresses the same distance as that expressed by the length (unit length) of one graduation of the camera coordinate Rc.

Since other configuration than this is similar to the configuration of the first embodiment described above, the description is omitted.

Figure 24:
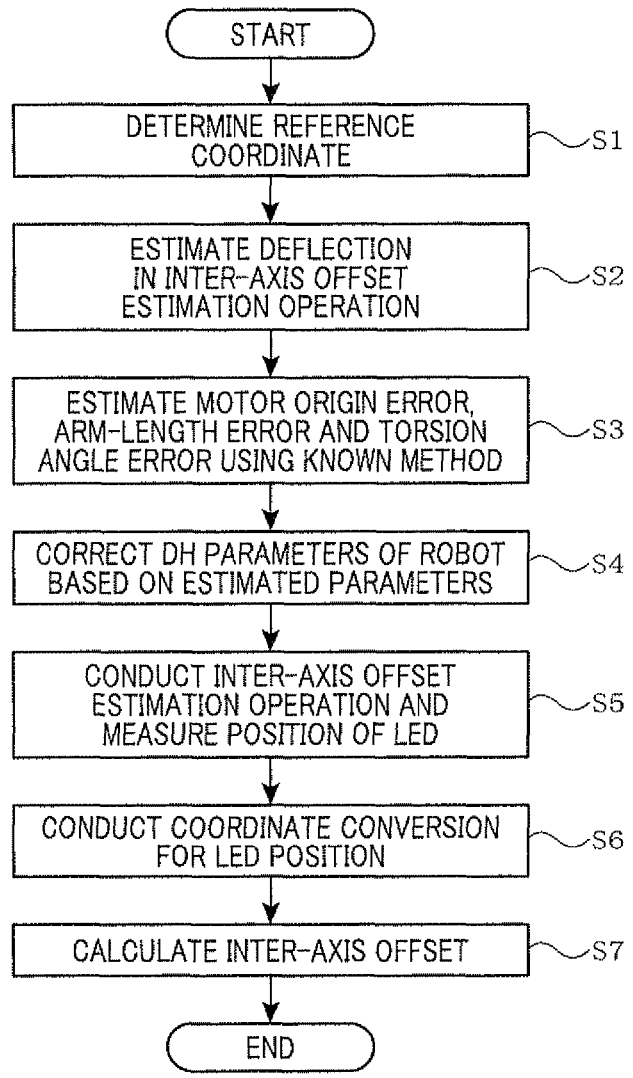
FIG. 24 is a flow diagram illustrating a processing according to the present invention.

The method according to the present invention is realized by the processing shown in FIG. 24. First, neither the position of the robot coordinate R0 on the camera coordinate Rc, nor the directions of the X0, Y0 and Z0 axes of the robot coordinate R0 are known. Thus, in the present embodiment, a reference coordinate Rb is determined on the camera coordinate Rc, instead of the robot coordinate R0, (step S1 of FIG. 24). The motion of the robot arm 6 for determining the reference coordinate Rb is given by the teaching pendant 4.

In the present embodiment, the teaching pendant 4 is configured to separately rotate the servomotors 15 of the shoulder 7, lower arm 8, first upper arm 9, second upper arm 10, wrist arm 11 and the flange 12 by a desired angle. Thus, the shoulder 7, lower arm 8, first upper arm 9, second upper arm 10, wrist arm 11 and flange 12 are rotated from the respective origin positions by a desired angle in forward and reverse directions.

Further, the teaching pendant 4 is able to specify the rotational position of the shoulder 7, and the positions and postures of the lower arm 8, first upper arm 9, second upper arm 10, wrist arm 11, flange 12 and the end effector on the robot coordinate R0. When the positions and postures on the robot coordinate R0 are specified by the teaching pendant 4, the CPU 17 of the robotic device 1 calculates the rotation angles of the shoulder 7, lower arm 8, first upper arm 9, second upper arm 10, wrist arm 11 and flange 12, and drives the respective servomotors 15 to achieve the respective rotation angles. Thus, the shoulder 7, lower arm 8, first upper arm 9, second upper arm 10, wrist arm 11, flange 12 and the end effector are moved so as to take the specified positions and postures.

The positions and postures of the shoulder 7, lower arm 8, first upper arm 9, second upper arm 10, wrist arm 11, flange 12 and the end effector correspond to the coordinates R1 to R6 and Rf.

When the current positions and postures of the shoulder 7, lower arm 8, first upper arm 9, second upper arm 10, wrist arm 11, flange 12 and the end effector are desired to be known, an operation is performed accordingly. Then, the CPU 17 acquires the rotation angles of the shoulder 7, lower arm 8, first upper arm 9, second upper arm 10, wrist arm 11 and flange 12, calculates the positions and postures of the shoulder 7, lower arm 8, first upper arm 9, second upper arm 10, wrist arm 11, flange 12 and the end effector and displays the calculated positions and postures in terms of the robot coordinate R0, on the display 4b of the teaching pendant 4.

Figure 28:
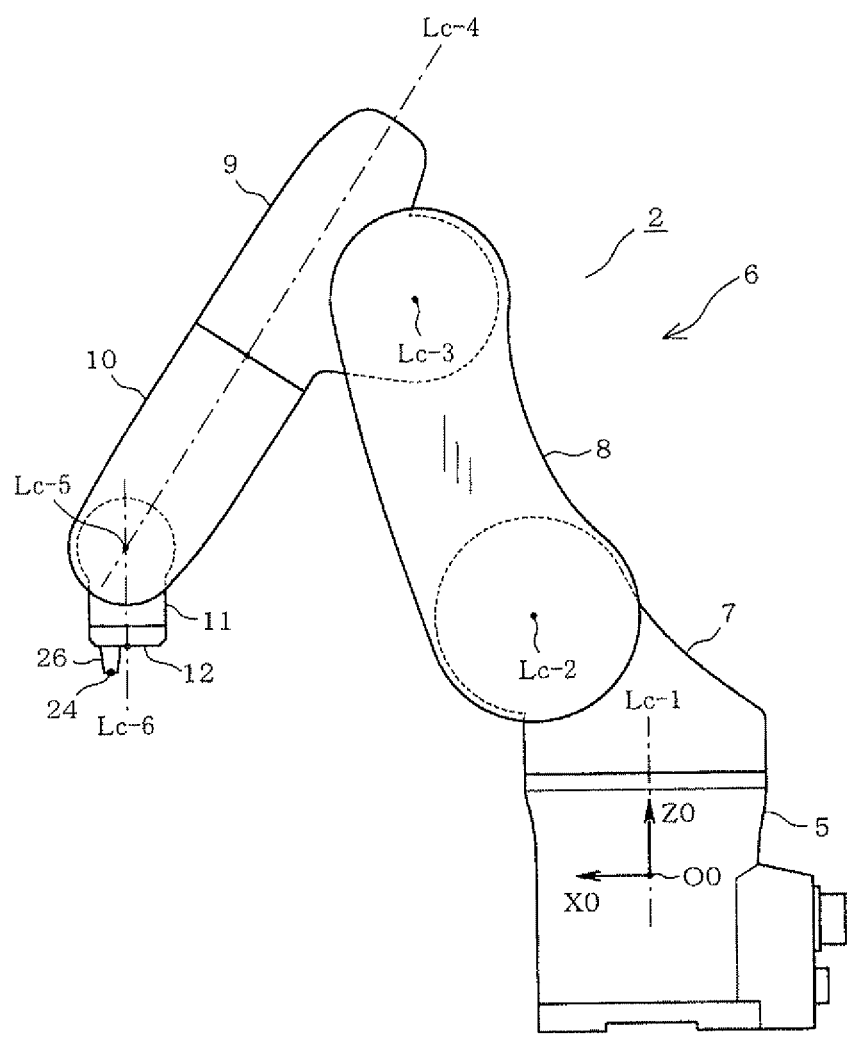
FIG. 28 is a side view illustrating a forward-bending posture of the robot.

In order to determine the reference coordinate Rb on the camera coordinate Rc, initial positions of the shoulder 7 and the flange 12 are determined first. Specifically, the control panel 4a of the teaching pendant 4 is operated to rotate the lower arm 8 and the first upper arm 9 from an upright posture shown in FIG. 22. Thus, the robot arm 6 adopts a forward-bending posture, as shown in FIG. 28, for example, in which the robot arm 6 is inclined forward (plus side of the X1 axis) with respect to the shoulder 7. Alternative to this, the robot arm 6 may adopt a backward-bending posture as sown in FIG. 29 so as to be inclined backward with respect to the shoulder 7. Then, the shoulder 7 is rotated to an appropriate (optional) position.

The fifth axis Lc-5, which is the rotation center line of the rotary shaft 14 of the fifth rotary joint J5, is made parallel to the second and third axes Lc-2 and Lc-3, which are the rotation center lines of the rotary shaft 14 of the rotary joints J2 and J3, i.e. brought to a horizontal position. At the same time, the sixth axis Lc-6, which is the rotation center line of the rotary shaft 14 of the sixth rotary joint J6, is made parallel to the first axis Lc-1, which is the rotation center line of the first rotary joint J1, i.e. brought to a vertical position, being directed vertically downward. Alternative to this, the sixth axis Lc-6 may be made parallel to the first axis Lc-1, being directed vertically upward. Then, the flange 12 is rotated to an appropriate rotational position.

Thus, the shoulder 7 is rotated to an appropriate rotational position while the flange 12 is also rotated to an appropriate rotational position by controlling the teaching pendant 4. These rotational positions are determined to be initial rotational positions of the shoulder 7 and the flange 12. In this case, it is desirable that the flange 12 is at an initial rotational position where the image of the LED 24 is easily picked up by the three-dimensional gauge 23, i.e. where the LED 24 is located nearer to the three-dimensional gauge 23 than to the sixth axis Lc-6, irrespective of the position of the end effector.

Figure 25A:
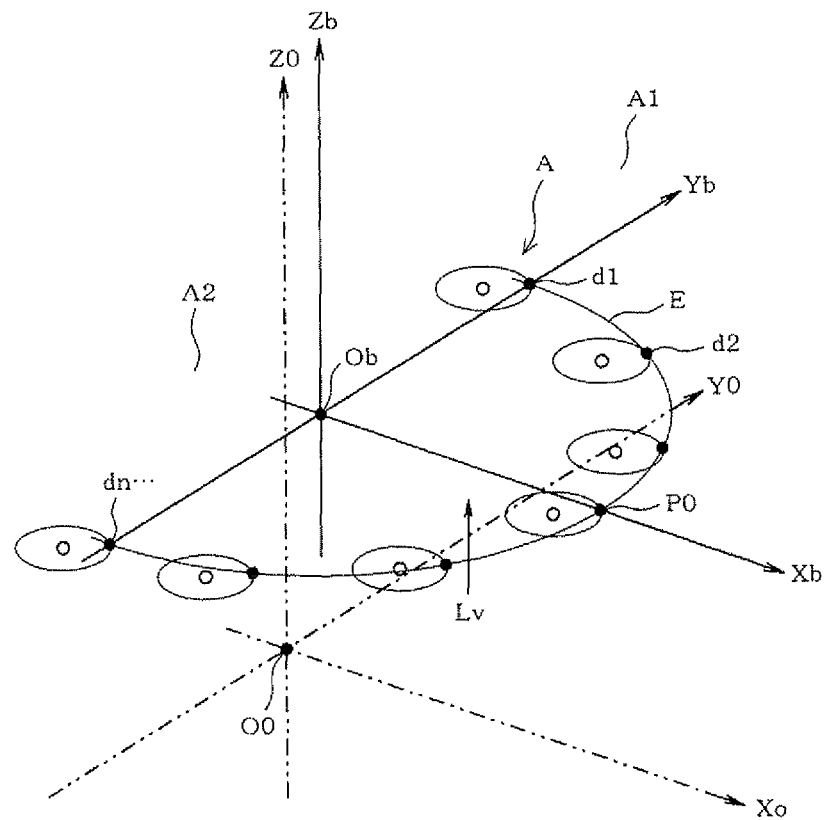
FIGS. 25A and 25B are perspective view and plan view, respectively, illustrating how to determine a reference coordinate.
Figure 25B:
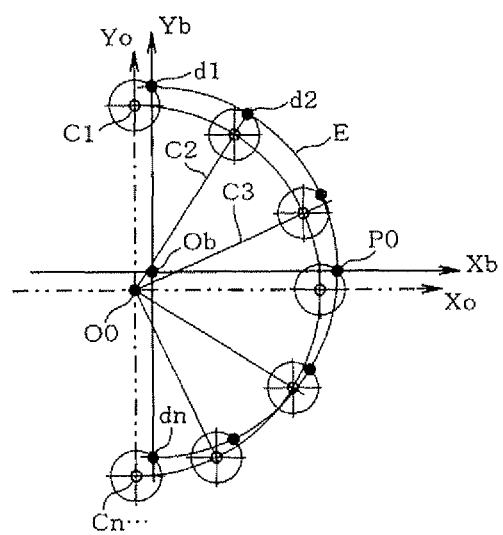

After determining the initial rotational positions of the shoulder 7 and the flange 12 as described above, the shoulder 7 is rotated so as to be located at a plurality of optional rotational positions C1, C2 ... en (see FIG. 25B). In this case, the fifth axis Lc-5 is maintained parallel to the second and third axes Lc-2 and Lc-3, while the sixth axis Lc-6 is maintained parallel to the first axis Lc-1. Then, at each of the rotational positions, the flange 12 is rotated from its initial rotational is position in a direction opposite to the direction of rotation of the shoulder 7 from its initial rotational position to the current rotational position. In this case, the flange 12 is rotated by an angle corresponding to the angle of rotation of the shoulder 7 from its initial rotational position to the current rotational position.

For example, when the robot arm 6 is rotate to the plus side of the Z0 axis of the robot coordinate R0, i.e. when the robot arm 6 is rotated clockwise by 30° from its initial rotational position, as viewed from above, the flange 12 is brought to a state of being rotated counterclockwise by 30° from its initial rotational position. Thus, the flange 12 is rotated in a direction opposite to the rotation of the shoulder 7 by the same angle of rotation of the shoulder 7 at each rotational position of the shoulder 7. Accordingly, as shown in FIG. 25B, the LED 24 is constantly located at the initial position as viewed from the plus side of the Z0 axis, with the robot coordinate R0 being translated along the sixth axis Lc-6.

Then, in the state where the flange 12 is rotated in a direction opposite to the direction of rotation of the shoulder 7 by the same angle of rotation of the shoulder 7 at each rotational position, the position of the LED 24 as a measurement point for determining the reference coordinate, is measured by the three-dimensional gauge 23. As shown in FIGS. 25A and 25B, three or more measurement positions d1, d2, ... dn of the LED 24 are provided on a circular rotation locus E centering on a vertical axis which is parallel to the first axis Lc-1 (Z0 axis). The measurement controller 26 calculates a position Ob that is the rotation center of the LED 24 using a least-square method, based on the plurality of positions d1, d2, ... dn on the rotation locus E of the LED 24 measured by the three-dimensional gauge 23. At the same time, the measurement controller 26 calculates a normal line Lv with respect to a plane including the plurality of positions d1, d2, ... dn of the LED 24. Then, the position Ob that is the rotation center of the LED 24 is determined to be an origin of the reference coordinate Rb. Also, the linear lines passing through the origin Ob and parallel to (directed to the same direction as) the normal line Lv, i.e. a vertical axis parallel to the first axis Lc-1 is determined to be a Zb axis (Z axis) of the reference coordinate Rb.

Further, an optional linear lines passing through the origin Ob and intersecting the Zb axis at right angle is determined to be an Xb axis (X axis) of the reference coordinate Rb. For example, the Xb axis may be a linear line connecting the origin Ob and a position P0 of the LED 24 when the shoulder 7 is rotated to the origin position. A linear lines that intersects both of the Zb and Xb axes at right angles is calculated based on an outer product of these axes and determined to be a Yb axis (Y axis) of the reference coordinate Rb. The length of one graduation in the reference coordinate Rb is made equal to that of one graduation in the camera coordinate Rc, and accordingly, in the robot coordinate R0.

Thus, the reference coordinate Rb is determined on the camera coordinate Rc. In the reference coordinate Rb determined in this way, the Zb axis is parallel to the first axis Lc-1 and thus to the Z0 axis of the robot reference R0, while the Xb-Yb plane is parallel to the X0-Y0 plane. In determining the reference coordinate Rb, if the position of the LED 24 is on the X0-Y0 plane, the Xb-Yb plane coincides with the X0-Y0 plane.

The Zb axis is present in a predetermined direction from the Z0 axis being apart therefrom by a predetermined distance. In other words, the positional relationship between the Z0 axis and the Zb axis is the same as the positional relationship between the sixth axis Lc-6 and the LED 24 when the flange 12 is at the initial rotational position. Thus, the direction from the Z0 axis to the Zb axis coincides with the direction from the sixth axis Lc-6 to the LED 24 when the flange 12 is at the initial position. Further, the distance from the Z0 axis to the Zb axis is equal to the distance from the sixth axis Lc-6 to the LED 24.

Figure 30:
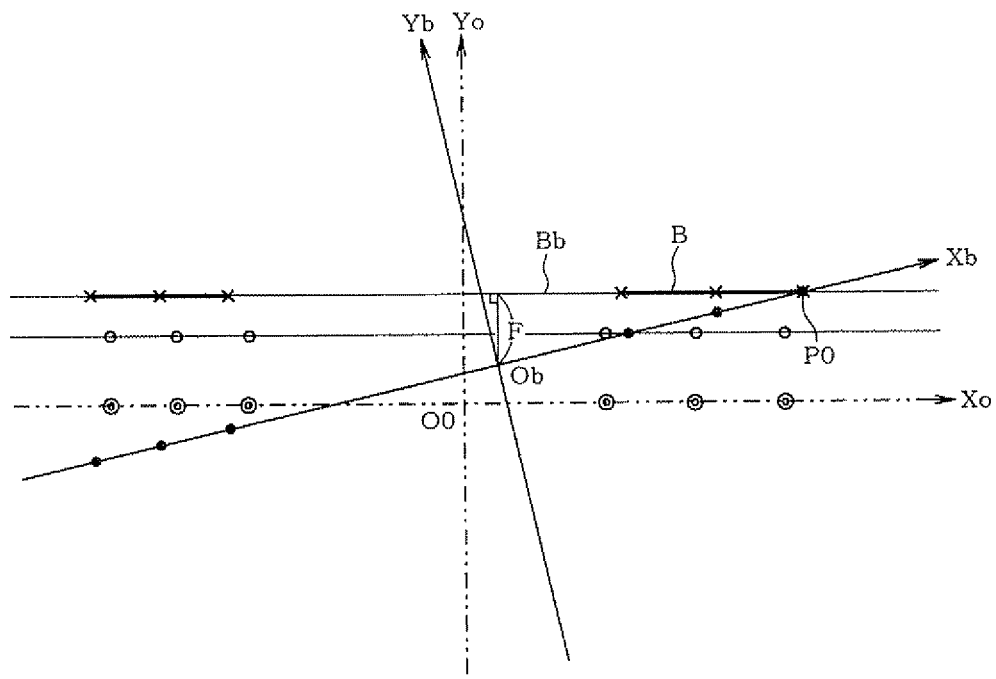
FIG. 30 is a diagram illustrating how to calculate an inter-axis offset.

In the absence of an inter-axis offset, the Xb and Yb axes are parallel to the X0 and Y0 axes of the robot coordinate R0. However, in the presence of an inter-axis offset, the position P0 of the LED 24 when the shoulder 7 is rotated to the origin position (0°) is offset in the X0-Y0 direction by an amount corresponding to the inter-axis offset, in determining the reference coordinate Rb. Thus, as shown in FIG. 30, the Xb and Yb axes are not parallel to the X0 and Y0 axes, respectively, but inclined in conformity with the inter-axis offset.

Figure 27:
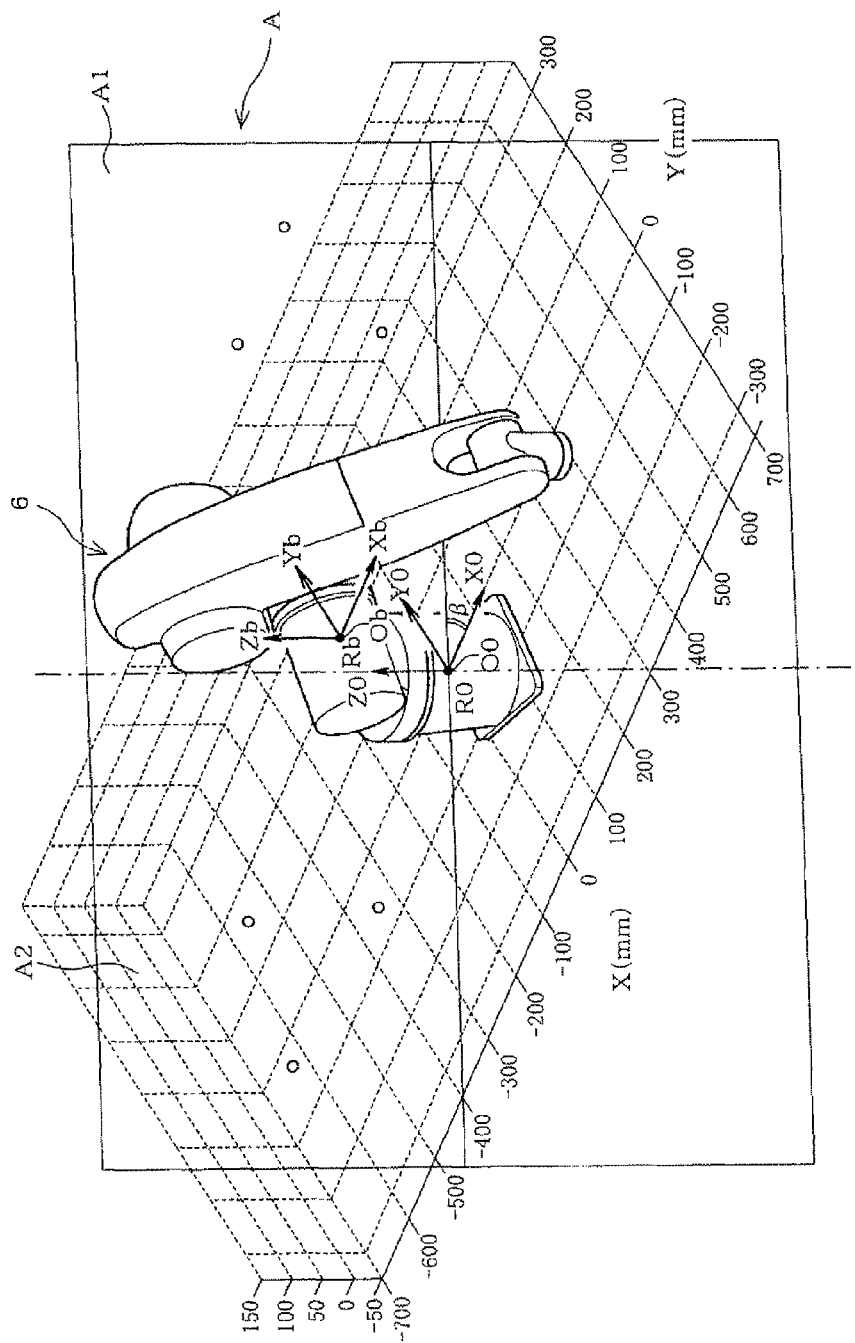
FIG. 27 is a perspective view illustrating target positions of movement.

After determining the reference coordinate Rb, an optional plane A1 is assumed, as shown in FIG. 27, which is extended from the first axis Lc-1 and includes the first axis Lc-1. In this case, the plane A1 is specified by an angle with respect to the X0 axis. In order that the end effector is positioned on a plane whose angle with respect to the X0 axis is plus 30°, for example, the shoulder 7 may be rotated from the origin position by plus 30° (in the absence of an inter-axis offset).

In the present embodiment, as shown in FIG. 27, in addition to the plane A1 extended in one direction from the Z0 axis, i.e. the first axis Ic-1, of the robot reference R0 and including the Z0 axis, a plane A2 is assumed, which is extended from the Z0 axis in the opposite direction. The planes A1 and A2 are flush with each other and form a single plane A. In the present embodiment, several planes A are set (only one plane A is shown in FIG. 12) and one of the planes A includes the X0 axis ($\beta=0°$).

A plurality of positions are optionally selected as target positions of movement on the assumed plane A1 extending in one direction and the plane A2 extending in the opposite direction. In FIG. 27, the selected target positions of movement are indicated by small hollow circles. The target positions of movement are specified by values on the robot coordinate R0. As will be described later, the end effector of the robot arm 6 is moved to each of the target positions of movement to calculate an inter-axis offset.

As mentioned above, the plurality of selected target positions of movement on the planes A1 and A2 are specified by values on the robot coordinate R0. The end effector is moved to each of the target positions of movement with the fifth axis Lc-5 being maintained parallel to the second and third axes Lc-2 and Lc-3 and the sixth axis Lc-6 being maintained parallel to the first axis-Lc-1 (the target position reaching posture of the flange 12). At each target position of movement, the flange 12 is rotated from its initial rotational position in a direction opposite to the direction of rotation of the shoulder 7 from its initial rotational position to the current target position of movement. In this case, the flange 12 is rotated by an angle of rotation of the shoulder 7 from its initial rotational position to the current target rotational position (initial position retention motion).

Then, the positional relationship between the LED 24 and the end effector (center P of the end surface of the flange 12) at this moment is the same as the positional relationship between the reference coordinate Rb and the robot coordinate R0, regarding the directions X0 (Xb) and Y0 (Yb). In other words, the position of the end effector is moved in a direction from the origin O0 of the robot coordinate R0 toward the origin Ob of the reference coordinate Rb, as viewed from the plus side of the Z0 axis, by a distance corresponding to the distance from the origins O0 to Ob. With this movement, each position of the LED 24 on the rotation locus E is achieved.

Accordingly, values X0, Y0 on the robot coordinate R0 for indicating a target position of movement of the end effector become equal to values Xb, Yb on the reference coordinate Rb for indicating the position of the LED 24 when the end effector has moved to a target position of movement (in the absence of an inter-axis offset). At this moment, however, the flange 12 should be in a state of having conducted the initial position retention motion in the target position reaching posture. The Xb-Yb position of the LED 24 on the reference coordinate Rb at this moment is rendered to be a target position of movement of the LED 24. Then, when the end effector has moved to the target position of movement, if there is an inter-axis offset, the actual travel position of the end effector is offset in the X0-Y0 direction from the target position of movement by an amount corresponding to the inter-axis offset. As a result, the position of the LED 24 is also deviated in the Xb-Yb direction in conformity with the target position of movement. Accordingly, an inter-axis offset is calculated from the amount of deviation of the LED 24.

Prior to the movement of the end effector of the robot arm 6 to target positions of movement selected on the planes A1 and A2, a travel position error is removed. The travel position error is ascribed to various errors (deflection of rotary drive systems, origin position error of the servomotors 15, torsion angle error and link-length error) other than the inter-axis offset.

Removal of travel position error is specifically described. The deflection of the rotary drive systems corresponds to a deflection in the direction of torsion, which is caused by torque transmitted from the rotary shafts of the servomotors 15 to the rotary shafts 14 of the respective rotary joints J1 to J6 via the respective reduction gears 16. It should be appreciated that each rotary shaft 14 causes no arc deflection in the axial direction. The deflection in each rotary drive system may be calculated from the torque acting on the rotary drive system and the spring constant of the rotary drive system. The spring constant has been obtained in advance in the robot 2 and stored in the ROM 20 of the control unit 3. The torque acting on the rotary drive systems is discussed regarding the second, third and fifth axes Lc-2, Lc-3 and Lc-5 (no large torque acts on the first, fourth and sixth axes Lc-1, Lc-4 and Lc-6 and thus there is no deflection that causes absolute position error).

Figure 26:
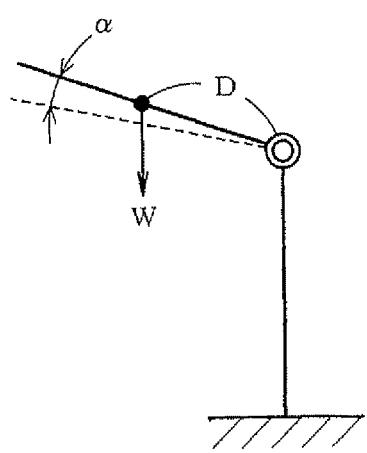
FIG. 26 is a diagram illustrating deflection of a rotary drive system.

As shown in FIG. 26, the torque acting on each rotary drive system is calculated based on the product of a mass W of a link L supported by the rotary shaft 14, and a distance D from the rotary shaft 14 to the center of the link L. When the end effector of the robot arm 6 is moved to the plurality of optionally selected positions on the plane A, the shoulder 7 is rotated to an angular position that matches the angle of the plane A with respect to the X0 axis to maintain the fifth axis Lc-5 parallel to the second and third axes Lc-2 and Lc3. Then, at least two of the lower arm 8, the first upper arm 9 and the wrist arm 11 (all of them in the present embodiment) are rotated to move the end effector to the each of the target positions of movement. At each of the target positions of movement, the flange 12 is permitted to conduct the initial position retention motion in its target position reaching posture. In this case, the robot arm 6 adopts the forward-bending posture or the backward-bending posture depending on the target position of movement.

Then, the rotation angles of the second upper arm 10, lower arm 8, first upper arm 9, wrist arm 11 and flange 12 after movement to each target position of movement are read from the teaching pendant 4. Based on the rotation angles, the torque acting on the second, third and fifth axes Lc-2, Lc-3 and Lc-5 are calculated to obtain deflection (angle) $\alpha$ of the rotary drive systems (step S2 of FIG. 24). The rotation angle of each servomotor 15 is adjusted by an angle corresponding to the obtained deflection $\alpha$ of the rotary drive system so as to be equivalent to the case where no deflection is caused. Specifically, in FIG. 26, the position of the link indicated by a solid line is a target position of movement when the rotary drive system has no deflection, and the position indicated by a broken line is an actual travel position when the rotary drive system has a deflection. In this case, the rotation angle of each servomotor 15 is reduced by an angle corresponding to the deflection α. Thus, the link reaches the actual target position of movement indicated by the solid line in a state where the rotary drive system has a deflection.

The motor origin position error is detected using the method disclosed, for example, in the known patent documents JP-2003-220587-A, JP-2009-274186-A, JP-2009-274187-A or JP-2009-274188-A. The torsion angle error and the link-length error are detecting using the method disclosed, for example, in the non-patent document "3-pair Joint Axis Estimating Method", 4.3.2, page 52, a report on "Investigation research on standardization of intelligent robots for plants" (1997), JARA (Japan Robot Association)". In the method disclosed in this known non-patent document, the robot arm 6 is rotated about the first to six axes Lc-1 to Lc-6. In this rotation, the rotation trajectory of the end effector is measured by a three-dimensional gauge to calculate the position of the rotation center and a normal line with respect to the plane that includes the rotation trajectory. The length of each link is calculated from the rotation center position and the direction of each axis is calculated from the direction of the normal line. Accordingly, the link-length error and the torsion angle error are calculated from the length of each link and the direction of the axis (step S3 of FIG. 24).

Using the calculated motor origin position error, the link-length error and the torsion angle error, the DH parameters are corrected so that the errors will not appear in the form of an absolute position error (step S4 of FIG. 24).

After performing the processing (removal of travel position error) as described above, the teaching pendant 4 is operated to move the end effector to each target position of movement on each plane A. In moving the end effector to each target position of movement on each plane A, the shoulder 7 is rotated first from the origin position by the angle β of the plane A1 with respect to the X0 axis to have the X1 axis of the coordinate R1 positioned on the plane A. Then, while the shoulder 7 is being fixed, the rotary shafts 14 of the second, third and fifth rotary joints J2, J3 and J5 are rotated. Thus, the end effector is moved to the target positions of movement on the planes A1 and A2, with the flange 12 being in the target position reaching posture.

After that, the flange 12 carries out the initial position retention motion. Then, the lower arm 8, the first upper arm 9 and the wrist arm 11 are rotated while the flange 12 is maintained in the target position is reaching posture. Thus, the end effector is moved to each of the plurality of optionally selected target positions of movement on the planes A1 and A2. In this case, the robot arm 6 adopts the same posture as the one when the torque acting on the rotary drive systems has been calculated. Also, the rotation angle of each servomotor 15 is adjusted according the deflection of the rotary drive system, which has been calculated for each target position of movement.

When the end effector is moved to the plurality of optionally selected target positions of movement on the planes A1 and A2, the rotary shafts 14 of the second, third and fifth rotary joints J2, J3 and J5 of the robot arm 6 are rotated, as shown in FIG. 28, in one direction. Thus, the robot arm 6, being inclined to one direction, or being bent forward at the shoulder 7 (forward-bending posture), is able to move the end effector to the target positions of movement on the plane A1.

Figure 29:
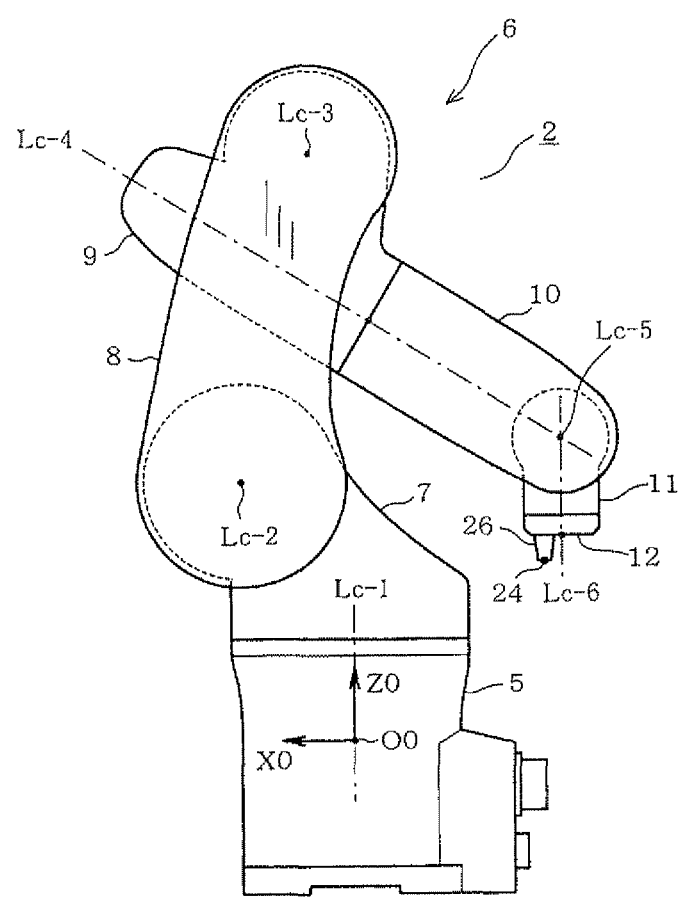
FIG. 29 is a side view illustrating a backward-bending posture of the robot.

When the end effector is moved to the target positions of movement on the other plane A2, the rotary shafts 14 of the second, third and fifth rotary joints J2, J3 and J5 of the rotary arm 6 are rotated, as shown in FIG. 29, in the other direction. Thus, the robot arm 6, being turned around and inclined to the other side, or being bent backward at the shoulder 7 (backward-bending posture), is able to move the end effector to the target positions of movement on the plane A2. Then, at each target position of movement, the position of the LED (measurement point for measuring an offset) 24 is measured by the three-dimensional gauge 23 (step S5 of FIG. 24).

The timing for the flange 12 to carry out the initial position retention motion is not limited to the timing after the X1 axis is positioned on the plane A1 but before the end effector is moved to each target position of movement. The timing may be when the end effector has been moved to each target position of movement. However, since the end effector is moved to each target position of movement with the shoulder 7 being fixed, once the initial position retention motion is performed when the end effector is moved to the initial target position of movement, the initial position retention motion is not required to be performed any more at the subsequent target positions of movement.

The position measured by the three-dimensional gauge 23 corresponds to a position on the camera coordinate Rc. Accordingly, the position on the camera coordinate Rc is converted to a position on the reference coordinate Rb. The conversion is performed using a homogeneous transformation matrix shown in FIG. 15 (step S6 of FIG. 24).

FIG. 30 shows: target positions of movement (indicated by values of the robot coordinate R0) of the end effector as seen from the plus side of the Z0 axis; target positions of movement (indicated by values of the reference coordinate Rb) of the LED 24; actual positions of the end effector when moved to the target positions of movement; and positions of the LED 24 (which are converted from the values on the camera coordinate Rc to the values on the reference coordinate Rb) when the end effector is moved to the target positions of movement. In FIG. 30, for clarification, the planes A1 and A2 are assumed to be on the X0 axis and the target positions of movement of the end effector are assumed to have been selected from positions on the X0 axis. In FIG. 30, double circles indicate target positions of movement of the end effector, hollow circles indicate actual travel positions of the end effector, filled circles indicate target positions of movement of the LED 24, and cross marks indicate actual travel positions of the LED 24.

As described above, in moving the end effector to each target position of movement, pre-processing has been conducted so that no error is caused at the travel position by the deflection of the rotary drive systems, the motor origin error, the link-length error and the torsion angle error. Therefore, the error between each target position of movement of the LED 24 and the actual travel position thereof (which is equal to the error between each target position of movement of the end effector and the actual travel position thereof) is regarded as being caused by an inter-axis offset. Since the target positions of movement are on the X0 axis, the error caused by the inter-axis offset allows the actual travel positions to be aligned along a line parallel to the X0 axis, which line is offset from the target positions of movement by an amount corresponding to the inter-axis offset. In this case, the actual travel positions, if not precisely linearly aligned, will be distributed along a linear line.

The inter-axis offset corresponds to a distance between each target position of movement of the end effector and the actual travel position thereof in the X0-Y0 direction. This distance is equal to the distance between each target position of movement of the LED 24 and the actual travel position thereof in the Xb-Yb direction in the absence of an inter-axis offset (when the Xb axis is parallel to the X0 axis). Accordingly, the plurality of actual travel positions of the LED 24 are connected to provide a measurement dependent line segment B on the Xb-Yb plane. The measurement dependent line segment B is extended to provide a linear lines Bb. A minimum distance between the linear lines Bb and the origin Ob of the reference coordinate Rb (length of a perpendicular dropped from Ob to Bb) is calculated. The calculated minimum distance corresponds to an inter-axis offset F (step S7 of FIG. 24).

In this case, if a measurement dependent line segment B resulting from the movement of the robot arm 6 in the forward-bending posture on an extended line A1 does not align with a measurement dependent line segment B resulting from the movement of the robot arm 6 in the backward-bending posture on an extended line A2 (including the case where the line segments B are not positioned near a linear lines), it is considered that there is a defect somewhere in the processing that has been conducted so far. Accordingly, in this case, the processing is restarted from step S1. In this way, an actual defect in conducting the processing is detected by setting the target positions of movement on the two extended lines A1 and A2.

An inter-axis offset appears in the Xb-Yb direction and thus is irrelevant to a position in the Zb direction. Therefore, when the target positions of movement of the end effector are not on the X0 axis, the travel positions of the LED 24 may only have to be plotted on the Xb-Yb plane based on only the Xb coordinate values and the Yb coordinate values.

An inter-axis offset F is calculated in a manner similar to the above, for target positions of movement set in similar planes including the Xb axis, other than the planes A1 and A2. In this case as well, the actual travel positions of the LED 24 should align. Accordingly, a minimum distance to the origin Ob is similarly measured for the measurement dependent line segment B obtained by connecting the actual travel positions (Xb, Yb coordinate values) of the LED 24. All the measurement dependent line segments B should have an even minimum distance to the origin Ob. In practice, however, the minimum distance is often not necessarily even due to a measurement error, for example. In such a case, an average of the minimum distances from the respective measurement dependent line segments B to the origin Ob is obtained to calculate an inter-axis offset. Thus, an inter-axis offset is more accurately calculated.

The inter-axis offset calculated as described above is a sum of inter-axis offsets caused in the second, third and fifth axes Lc-2, Lc-3 and Lc-5, and thus there is no analyzing regarding correlation of the calculated inter-axis offset to these axes. Accordingly, of the DH parameters shown in FIG. 5, either one of the parameters in the column "d" of J2 and J3 is added with the inter-axis offset, or the parameters in the column "d" of J2 and J3 are permitted to share the inter-axis offset. The fifth axis Lc-5 can have any angle between a horizontal line and a vertical line depending on the rotation of the fourth axis Lc-4. Accordingly, when the inter-axis offset is distributed to the column "d" of J5, the accuracy of absolute position is rather impaired. For this reason, the inter-axis offset is not distributed to the column "d" of J5.

It is required to confirm whether or not the absolute position accuracy has been improved by adding the inter-axis offset to either one of the parameters in the column "d" of J2 and J3, or by dividing the inter-axis offset between the parameters in the column "d" of J2 and J3. To this end, an experiment was conducted. In the experiment, a plurality of target positions were set on the Xb axis using DH parameters added with the inter-axis offset. Then, the end effector was moved to the target positions in a manner as described above to measure the actual travel positions.

As a result of the experiment, position error on the Xb-Yb plane was reduced from 0.67 mm to 0.17 mm. Position error in the Zb axis direction was also reduced from 0.9 mm to 0.06 mm. As will be understood from this, position error was reduced from 1.12 mm to 0.18 mm, regarding the Xb-Yb-Zb three-dimensional direction.

According to the present embodiment, the inter-axis offset is quantitatively grasped. Based on the inter-axis offset, DH parameters are corrected so that an error due to the inter-axis offset will not occur, or such an error occurs as less as possible. Thus, the absolute position accuracy is enhanced.

Sixth Embodiment

Figure 31:
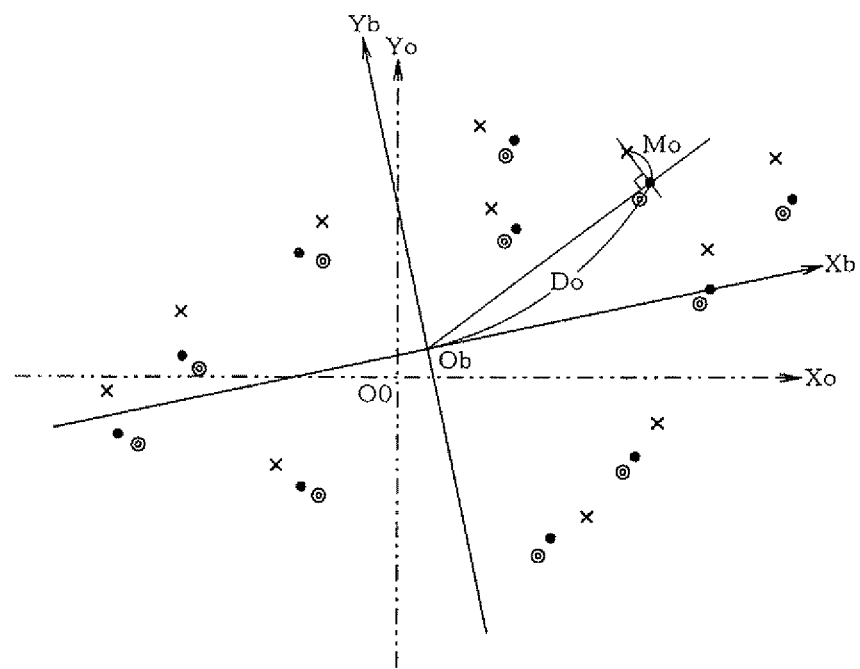
FIG. 31 is a diagram illustrating a sixth embodiment of the present invention.
Figure 32:
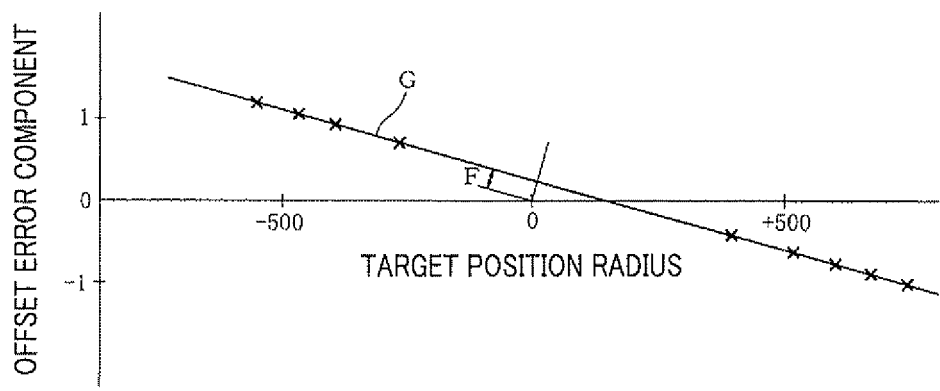
FIG. 32 is a diagram illustrating how to calculate an inter-axis offset.

FIGS. 31 and 32 show a sixth embodiment of the present invention. In the sixth embodiment, the reference coordinate Rb is obtained in a manner similar to the fifth embodiment. However, the sixth embodiment is different from the fifth embodiment in the process of calculating an inter-axis offset.

In the present embodiment, a plurality of optional positions are set as target positions of movement in a movable range of the end effector. When the end effector is moved to the plurality of target positions of movement, an inter-axis offset is calculated based on the difference between each target position of movement and the actual travel position of the LED 24.

Specifically, a plurality of positions as target positions of movement are optionally selected first on the robot coordinate R0. In FIG. 31, double circles indicate the plurality of positions selected as target positions of movement. FIG. 31 shows positions only in the horizontal direction (X0-Y0 direction, Xb-Yb direction). The end effector is moved to the target positions of movement on the plus side of the X0 coordinate values (right side with respect to the Y0 axis) in a state where the robot arm 6 is in the forward-bending posture. The end effector is moved to the target positions of movement on the minus side (left side with respect to the Y0 axis) in a state where the robot arm 6 is in the backward-bending posture.

Similar to the fifth embodiment, prior to the movement of the end effector to the plurality of selected target positions of movement, a travel position error due to several errors other than an inter-axis offset is removed. The several errors include deflection of the rotary drive systems, origin position errors of the servomotors 15, torsion angle error and link-length error.

After that, the end effector is moved, in the target position reaching posture, to the plurality of selected target positions of movement. The end effector is moved by rotating the rotary shafts 14 of at least two rotary joints among the first, second, third and fifth rotary joints J1, J2, J3 and J5 (in the present embodiment, three rotary joints, i.e. second, third and fifth rotary joints J2, J3 and J5). The rotary shaft 14 of the fourth rotary joint J4 is not rotated in order to maintain the fifth axis Lc-5 at a horizontal position. At each target position of movement, the position of the LED 24 is measured by the three-dimensional gauge 23, with the flange 12 being in a state of having conducted the initial position retention motion.

The position measured by the three-dimensional gauge 23 corresponds to the position on the camera coordinate Rc and thus the position is converted to the position on the reference coordinate Rb. Measurement positions of the LED 24 at the individual target positions of movement are indicated by cross marks in FIG. 31.

In order to calculate an inter-axis offset from the target positions of movement of the LED 24 and the actual travel positions thereof, the Xb values and the Yb values on the reference coordinate Rb are required to be calculated for the target positions of movement of the LED 24. As described in the fifth embodiment, in the absence of an inter-axis offset, the Xb and Yb axes of the reference coordinate Rb are parallel to the X0 and YD axes, respectively. Therefore, the X0, Y0 coordinate values indicating the movement of the end effector are equal to the Xb, Yb coordinate values when the target positions of movement of the LED 24 are indicated on the robot coordinate Rb.

The target positions of movement of the LED 24 expressed by the Xb, Yb values on the reference coordinate Rb are plotted, as shown in FIG. 31 by filled circles. The length of a line segment from the origin Ob to each target position of movement is rendered to be a target position radius D0. The length of a perpendicular dropped from a measurement position of the LED 24 on a linear lines passing through the origin Ob and a target position of movement is rendered to be an offset error component M0.

Then, a graph is prepared as shown in FIG. 32, in which the horizontal axis indicates the target position radius D0 and the vertical axis indicates the offset error component M0. In the graph, the target position radii D0 relative to the offset error components M0 of the individual target positions of movement are plotted. A linear lines passing through the plotted points is rendered to be an error linear lines G. When a perpendicular is dropped from the origin of the graph to the error linear lines G, the length of the perpendicular corresponds to en inter-axis offset F that is a sum of the inter-axis offsets of the second, third and fifth rotary joints.

(Modifications)

The present invention is not limited to the embodiments described above and illustrated in the drawings. The present invention may be modified or extended as set forth below.

The fixation surface of the base 5 does not have to be necessarily horizontal.

The measurement point is not limited to the LED 24. The measurement point may simply be a mark, or desirably, may be a dot-like mark.

The Xb axis of the reference coordinate Rb does not have to be necessarily parallel to the X0 axis. An optional linear lines passing through the origin Ob may be used as the Xb axis. In this case, an angle between the optional linear lines (Xb axis) and the X0 axis is calculated based on an angle between the X1 and X0 axes when the Xb axis is determined and based on the initial position of the LED 24. Accordingly, a relationship between the reference coordinate Rb and the robot coordinate R0 is calculated based on the angle between the Xb and X0 axes, followed by coordinate conversion. Thus, a position on the reference coordinate Rb is converted to that on the robot coordinate R0, or vice versa.

In the fifth embodiment, the end effector is moved from the plane A1 (plane extending in one direction from the Zb axis) to the target positions of movement on the plane A2 (plane extending in the opposite direction from the Zb axis). In this case, the rotary shafts 14 of two of the second, third and fifth rotary joints J2, J3 and J5 may be rotated, depending on the selected target positions of movement. Thus, the robot arm 6 is turned around to move the end effector to the target positions of movement.

In the sixth embodiment, the end effector is moved to the plurality of optionally selected target positions of movement. In this case, the rotary shafts 14 of all of or any two of the second, third and fifth rotary joints J2, J3 and J5 may be rotated. Alternatively, is depending on the target positions of movement, the rotary joints 14 of two of the second, third and fifth rotary joints J2, J3 and J5 may be rotated, in addition to the first rotary joint J1 to move the end effector to the target positions of movement. In other words, the rotary shafts of at least two rotary joints may be rotated.

Seventh Embodiment

With reference to FIGS. 33 to 43 and some of the drawings described with the first embodiment, hereinafter is described a seventh embodiment of the present invention.

Figure 33:
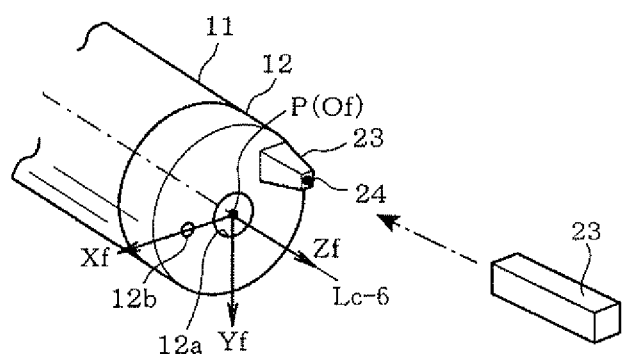
FIG. 33 is a perspective view illustrating a flange portion.

As shown in FIG. 33, the support 26 is attached to an optional position of the flange 12 to calculate the position of the two-axis orthogonal intersection C. The support 26 has an end portion which is provided with a light emitting diode (LED) 24 as a measurement point. At a position appropriately distanced from the robot 2, a three-dimensional gauge 23 is fixed to measure the position of the LED 24.

The configuration other than this is similar to or identical with the one described in the fourth embodiment and thus the description is omitted.

Figure 34:
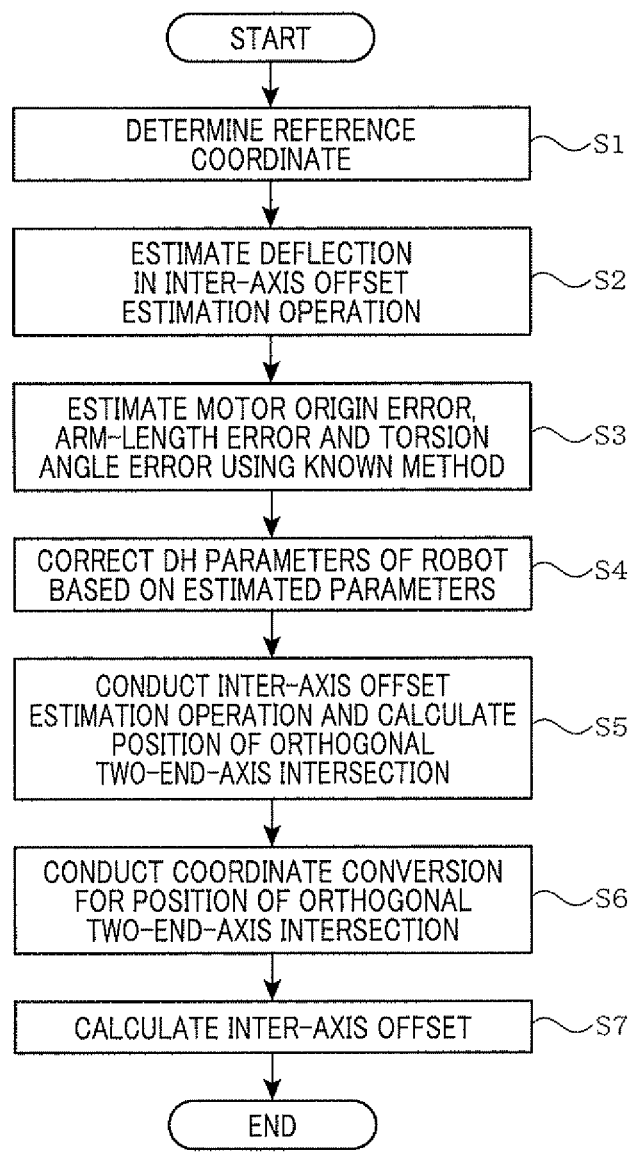
FIG. 34 is a flow diagram illustrating a processing according to the present invention.

The method according to the present invention is performed based on a processing shown in FIG. 34. Neither the position of the robot coordinate R0 on the camera coordinate Rc, nor the directions of the X0, Y0 and Z0 axes of the robot coordinate R0 are known. Accordingly, in the present embodiment, a coordinate as a reference coordinate Rb is determined on the camera coordinate Rc, instead of the robot coordinate R0 (step S1 of FIG. 34). The reference coordinate Rb is determined using the teaching pendant 4.

In the present embodiment, the teaching pendant 4 is configured to individually rotate the servomotors 15 of a shoulder 7, lower arm 8, first upper arm 9, second upper arm 10, wrist arm 11 and flange 12 by a desired angle. Thus, the shoulder 7, lower arm 8, first upper arm 9, second upper arm 10, wrist arm 11 and flange 12 are rotated by a desired angle from the respective origin positions in forward and reverse directions.

Further, the teaching pendant 4 is able to specify the positions and postures of the shoulder 7, lower arm 8, first upper arm 9, second upper arm 10, wrist arm 11, flange 12 and an end effector on the robot coordinate R0. When the positions and postures are specified on the robot coordinate R0 by the teaching pendant 14, the CPU 17 of the robotic device 1 calculates the rotation angles of the shoulder 7, lower arm 8, first upper arm 9, second upper arm 10, wrist arm 11 and flange 12 and drives the servomotors 15 to realize the rotation angles. Thus, coordinates R1 to R6 and Rf as well as the end effector are operated so as to realize the specified positions and postures.

Further, if the current positions and postures of the shoulder 7, lower arm 8, first upper arm 9, second upper arm 10, wrist arm 11, flange 12 and the end effector are desired to be known, an operation is performed accordingly. Then, the CPU 17 calculates the positions and postures of the shoulder 7, lower arm 8, first upper arm 9, second upper arm 10, wrist arm 11, flange 12 and the end effector, based on the rotation angles of the shoulder 7, lower arm 8, first upper arm 9, second upper arm 10, wrist arm 11 and flange 12 and displays the calculated positions and postures in terms of the robot coordinate R0, on the display 4b of the teaching pendant 4.

The positions and postures of the shoulder 7, lower arm 8, first upper arm 9, second upper arm 10, wrist arm 11, flange 12 and the end effector correspond to the positions and postures on the coordinates R1 to R6 and Rf.

Figure 38:
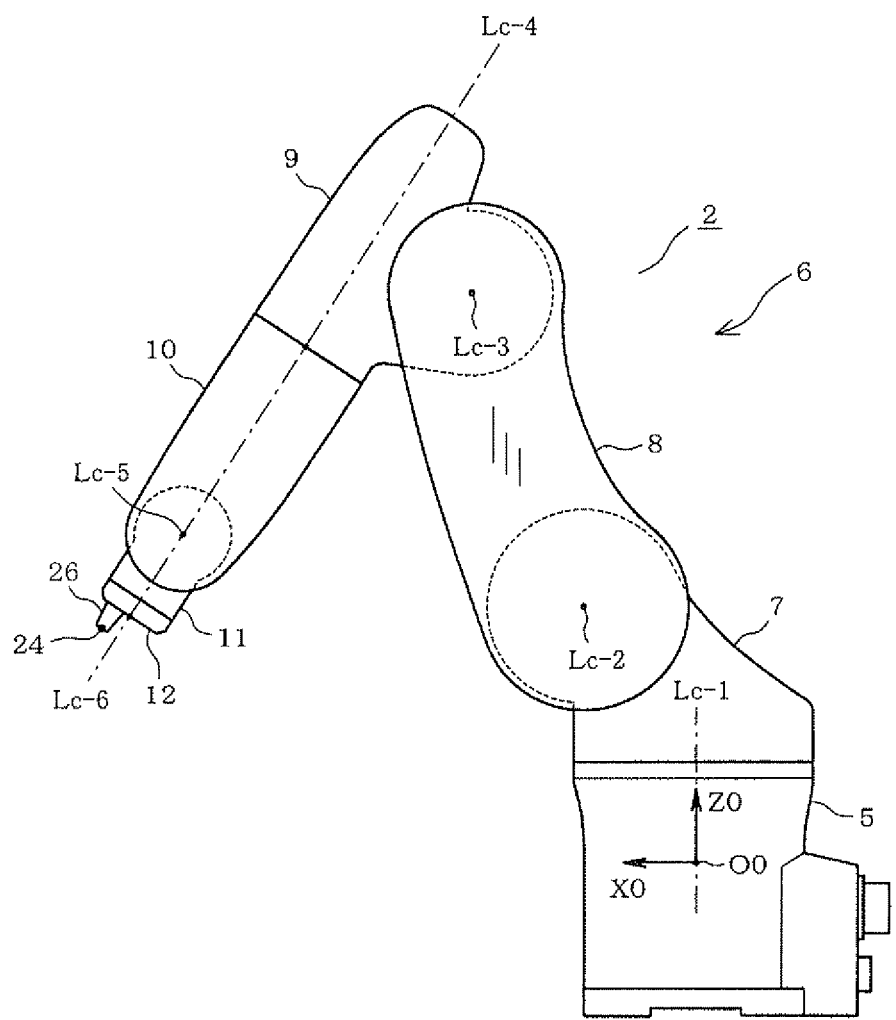
FIG. 38 is a side view illustrating a forward-bending posture of the robot.
Figure 39:
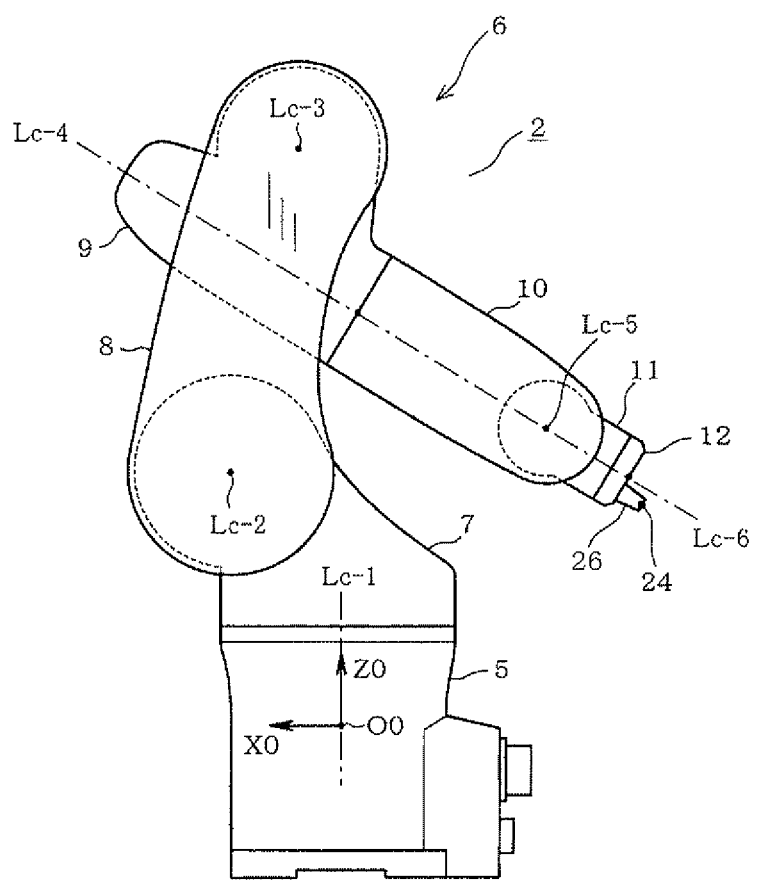
FIG. 39 is a side view illustrating a backward-bending posture of the robot.

In determining the reference coordinate Rb on the camera coordinate Rc, the control panel 4a of the teaching pendant 4 is operated to have the robot arm 6 adopted an optional posture. In this case, for example, the robot arm 6 adopts a posture in which the LED 24 is ensured to be located at a position horizontally distanced from the first axis Lc-1, in a state where the fifth axis Lc-5 is maintained parallel to the second and third axes Ic-2 and Lc-3, i.e. maintained at a horizontal position. In the present embodiment, as shown in FIG. 38, the robot arm 6 is maintained in a forward-bending posture in which the lower arm 8 and the first arm 9 are rotated to have the flange 12 inclined obliquely downward (posture in which the robot arm 6 is inclined front side with respect to the shoulder 7 (plus side of the X0 axis)), turning from the upright posture (refer to FIG. 22). Alternative to this, the posture adopted at this moment may be the backward-bending posture as shown in FIG. 39. Thus, the LED 24 is horizontally distanced from the first axis Lc-1 so that, when the robot arm 6 is rotated about the first axis Lc-1, the LED 24 moves on a rotation locus.

With this posture being maintained, the shoulder 7 is rotated about the first axis Lc-1 by a desired angle, or desirably, rotated by 180° or more including an angle from a plus 90° position to a minus 90° position via a 0° position (origin position). In determining the reference coordinate Rb, the fifth axis Lc-5 is not necessarily required to be made parallel to the first and second axes Lc-2 and Lc-3.

Figure 35:
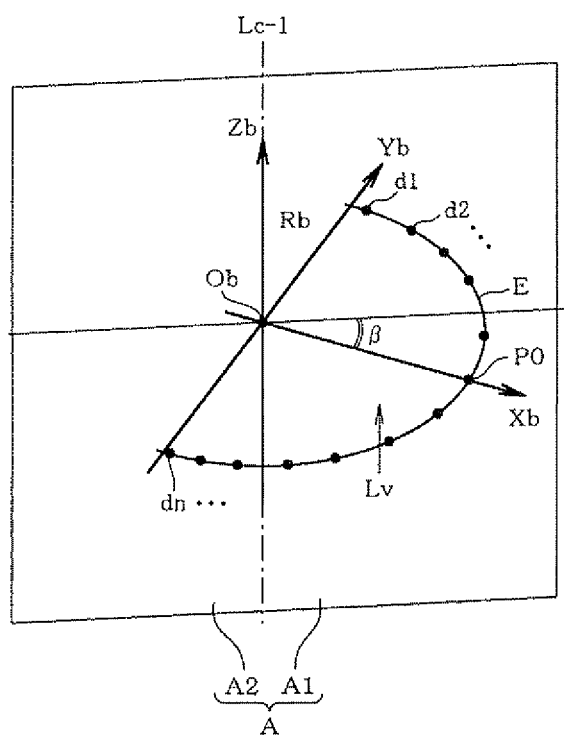
FIG. 35 is a perspective view illustrating how to determine a reference coordinate.

Thus, as shown in FIG. 35, the LED 24 as a measurement point for determining the reference coordinate traces a circular rotation locus E centering on the first axis Lc-1. Accordingly, the three-dimensional gauge 23 measures three or more of the positions d1, d2, . . . dn on the rotation locus E of the LED 24. The measurement controller 25 calculates a position Ob that is the rotation center of the LED 24 using a least-square method based on the plurality of positions d1, d2, . . . dn on the rotation locus E of the LED 24, which have been measured by the three-dimensional gauge 23. At the same time, the measurement controller 24 calculates a normal line Lv with respect to a plane that includes the rotation locus E of the LED 24. Thus, the measurement controller 25 determines the position Ob of rotation center to be an origin of the reference coordinate Rb and determines a linear lines passing through the origin Ob and parallel to the normal line Lv (directed in the same direction as the normal line Lv) to be a Zb axis (Z axis) of the reference coordinate Rb.

Further, the measurement controller 25 determines an optional linear lines intersecting the Zb axis at right angle and passing through the origin Ob to be an Xb axis (X axis) of the reference coordinate Rb. For example, the linear lines corresponds to the linear lines connecting a position P0 of the LED 24 to the origin Ob when the shoulder 7 is rotated to the origin position. The measurement controller 25 also calculates a linear lines intersecting the Zb and Xb axes at right angles from an outer product of these axes for use as a Yb axis (Y axis) of the reference coordinate Rb. The length of one graduation in the reference coordinate Rb is made equal to that of one graduation in the camera coordinate Rc.

Thus, the reference coordinate Rb is determined on the camera coordinate Rc. In the reference coordinate Rb determined in this way, the Zb axis coincides with the first axis Lc-1 and accordingly coincides with the Z0 axis of the robot coordinate R0, while the Xb-Yb plane is parallel to the X0-Y0 plane. In determining the reference coordinate Rb, if the LED 24 is positioned on the X0-Y0 plane, the Xb-Yb plane coincides with the X0-Y0 plane.

Figure 41A:
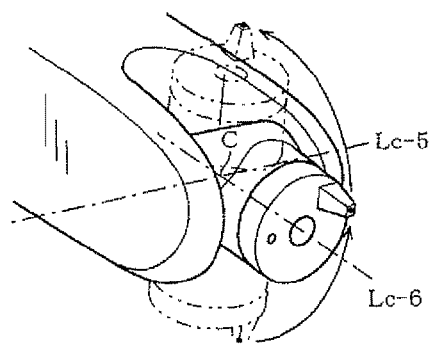
FIGS. 41A and 41B are diagrams illustrating how to calculate a second linear lines.
Figure 41B:
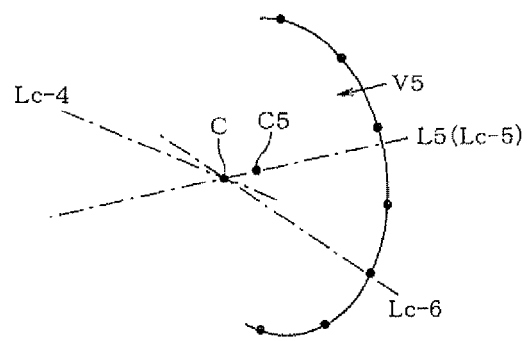

In the absence of an inter-axis offset, the Xb and Yb axes are parallel to the X0 and Y0 axes of the robot coordinate R0. However, in the presence of an inter-axis offset, the position P0 of the LED 24 when the shoulder 7 is rotated to the origin position is offset in the X0-Y0 direction by an amount corresponding to the inter-axis offset. Accordingly, the Xb and Yb axes are not parallel to the X0 and Y0 axes but are inclined, as shown in FIGS. 41A and 41B, in conformity with the inter-axis offset.

Figure 37:
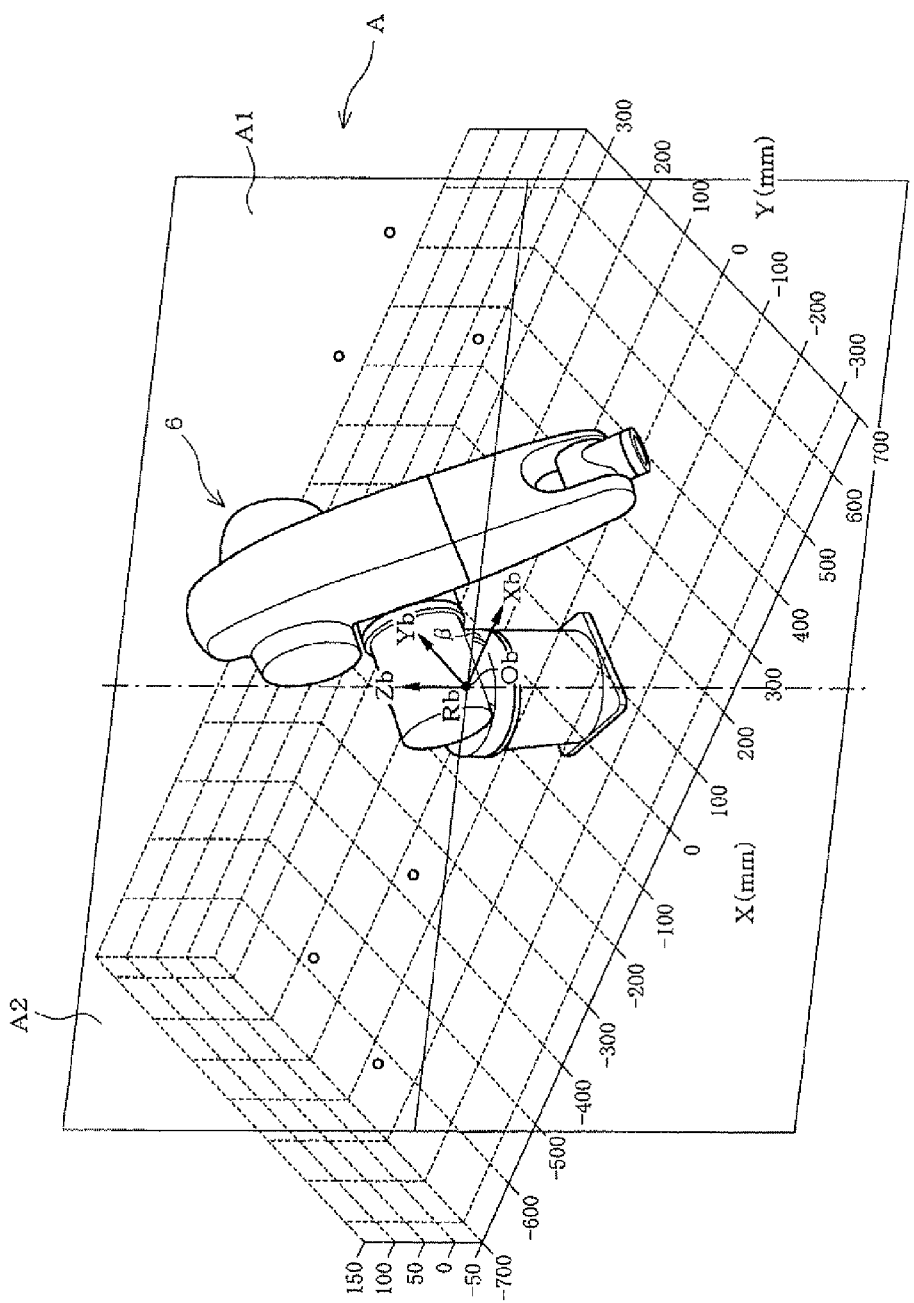
FIG. 37 is a perspective view illustrating target positions of movement.

After determining the reference coordinate Rb, a vertical plane is assumed, which is an extension from the first axis Lc-1 in an optional direction and includes the first axis Lc-1. A plurality of target positions of movement are set in the plane. In the present embodiment, as shown in FIGS. 35 and 37, planes A1 and A2 are assumed. The plane A1 is an optional plane extended from the Zb axis or the Z0 axis coinciding with the first axis Lc-1 in an optional direction and including the Z0 axis. The plane A2 is a plane extended from the Z0 axis in a direction opposite to the direction of the plane A1. The planes A1 and A2 are flush with each other forming a single plane A. In the present embodiment, a plurality of such planes A are assumed (FIGS. 35 and 37 show only one plane A). One of the planes A includes the X0 axis. Each plane A is specified by an angle β with respect to the X0 axis.

A plurality of target positions of movement are optionally selected on each of the planes A1 and A2. In FIG. 37, the plurality of optionally selected target positions of movement are indicated by small hollow circles. As will be described later, the two-axis orthogonal intersection C is moved to the plurality of optionally selected target positions of movement on the planes A1 and A2, in a state where the fifth axis Lc-5 is parallel to the second and third axes Lc-2 and Lc-3, for the purpose of calculating an inter-axis offset.

The plurality of positions selected on the plane A are specified by values (of X0, Y0, Z0) on the robot coordinate R0. The Zb axis of the reference coordinate Rb coincides with the Z0 axis, while the Xb and Yb axes in the absence of an inter-axial offset are parallel to the X0 and Y0 axes, respectively. Accordingly, the X0 and Y0 coordinate values of each target position of movement are equal to the Xb and Yb coordinate values on the reference coordinate Rb. However, the origin Ob of the reference coordinate Rb is distanced from the origin O0 of the robot coordinate R0. Accordingly, the position of the LED 24 on the Z0 axis after calculating the reference coordinate Rb corresponds to the position of the origin Ob of the reference coordinate Rb (this position is designated as Za). Therefore, the Zb coordinate value in the reference coordinate Rb at each target position of movement is expressed by (Z0-Za). Thus, in the absence of an inter-axis offset, the Xb and Yb axes are parallel to the X0 and Y0 axes, respectively. Accordingly, in the absence of an inter-axis offset, the robot coordinate R0 after being translated along the Z0 axis to the position Za coincides with the reference coordinate Rb. Although the value of the position Za is unclear, since an inter-axis offset appears in the X0- and Y0-axis direction but not in the Z0-axis direction, the unclear value of the position Za will not create any problem in calculating an inter-axis offset.

The correlation between the reference coordinate Rb and the robot coordinate R0 in the absence of an inter-axis offset is used for calculating an inter-axis offset. Specifically, each target position of movement is specified by three-dimensional values in the robot coordinate R0 and the two-axis orthogonal intersection C is moved thereto. In this case, the actual travel position of the two-axis orthogonal intersection C is deviated in the Xb-Yb direction from the target position of movement on the reference coordinate Rb calculated as described above, by an amount corresponding to the inter-axis offset. Thus, an inter-axis offset can be calculated from the amount of deviation of the two-axis orthogonal intersection C.

The two-axis orthogonal intersection C coincides with the origins O5 and O6 of the coordinate R5 of the wrist arm 11 and the coordinate R6 of the flange 12, respectively. Accordingly, using the teaching pendant 4, the two-axis orthogonal intersection C is moved to each target position of movement by moving the coordinate R5 of the wrist arm 11 or the coordinate R6 of the flange 12 to the target position of movement.

Prior to the movement of the two-axis orthogonal intersection C of the robot arm 6 to the plurality of optionally selected positions on the planes A1 and A2, the fifth axis Lc-5, for example, may be made parallel to the second third axes Lc-2 and Lc-3. Then, the rotary axes 14 of the second and third rotary joints J2 and J3 may be rotated. Thus, in moving the two-axis orthogonal intersection C to each target position of movement, a travel position error of the two-axis orthogonal intersection C is removed, which error would have been caused by various errors (deflection of the rotary drive systems, origin position errors of the servomotors 15, torsion angle error and link-length error) other than the inter-axis offset.

Removal of travel position error is specifically described. The deflection of the rotary drive system corresponds to the deflection in the direction of torsion caused by the torque transmitted from the rotary shafts of the respective servomotors 15 to the rotary shafts 14 of the rotary joints J1 to J6 via the respective reduction gears 16. It should be appreciated that each rotary shaft 14 causes no arc deflection in the axial direction. The deflection in each rotary drive system may be calculated from the torque acting on the rotary drive system and the spring constant of the rotary drive system. The spring constant is obtained in advance in the robot 2 and stored in the ROM 20 of the control unit 3. The torque acting on the rotary drive system is discussed regarding the second, third and fifth axes Lc-2, Lc-3 and Lc-5 (no large torque acts on the first, fourth and sixth axes Lc-1, Lc-4 and Lc-6 and thus there is no deflection that causes absolute position error).

Figure 36:
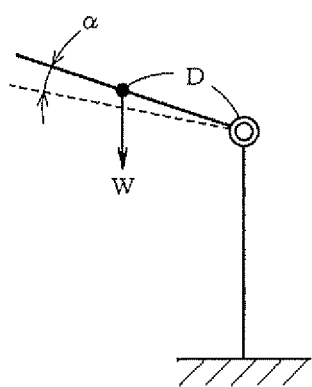
FIG. 36 is a diagram illustrating a deflection of a rotary drive system.

As shown in FIG. 36, the torque acting on each rotary drive system is calculated based on the product of a mass W of a link L supported by the rotary shaft 14, and a distance D from the rotary shaft 14 to center of the link L. When the two-axis orthogonal intersection C of the robot arm 6 is moved to the plurality of optionally selected positions on the plane A, the fifth axis Lc-5 is maintained parallel to the second and third axes Lc-2 and Lc-3, while the lower arm 8 and the first upper arm 9 are rotated to move the two-axis orthogonal intersection C to the optionally selected plurality of positions. In this case, rotation angles of the second upper arm 10, lower arm 8, first upper arm 9, wrist arm 11 and flange 12, when being moved to the positions, are read from the teaching pendant 4. Based on the rotation angles, torque acting on the second, third and fifth axes Lc-2, Lc-3 and Lc-5 are calculated. Then, a deflection (angle) α of each rotary drive system caused by the torque is calculated (step S2 of FIG. 34).

The rotation angle of each of the servomotors 15 is adjusted by an angle corresponding to the obtained deflection α of the rotary drive system so as to be equivalent to the case where no deflection is caused. Specifically, in FIG. 36, the position of the link indicated by a solid line is a target position of movement when the rotary drive system has no deflection, and the position indicated by a broken line is an actual travel position when the rotary drive system has a deflection. In this case, the rotation angle of each servomotor 15 is reduced by an angle corresponding to the deflection α. Thus, the link reaches the actual target position of movement indicated by the solid line in a state where the rotary drive system has a deflection.

As described before, the motor origin position error is detected using a known method and the torsion angle error and the link-length error are detecting using a known method (step S3 of FIG. 34).

Using the calculated motor origin position error, the link-length error and the torsion angle error, the DH parameters are corrected so that the errors will not appear in the form of an absolute position error (step S4 of FIG. 34).

After performing the processing (removal of travel position error) as described above, the teaching pendant 4 is operated, so that, among the plurality of planes A1, the X1 axis of the coordinate R1 of the shoulder 7 matches a desired one plane A1. To this end, the shoulder 7 is rotated from its origin position by an angle β with respect to the X0 axis of the plane A1. Thus, when the rotary shafts 14 of the second and third rotary joints J2 and J3 are rotated, the two-axis orthogonal intersection C is moved to the plurality of target positions of movement on the planes A1 and A2.

For example, the rotary shafts 14 of the second and third rotary joints J2 and J3 are rotated in a state where the fifth axis Lc-5 is maintained parallel to the second and third axes Lc-2 and Lc-3. Thus, while the fifth axis Lc-5 is maintained at a horizontal position, only the lower arm 8 (second axis Lc-2) and the first arm 9 (third axis Lc-3) are rotated to move the two-axis orthogonal intersection C to the plurality of optionally selected target positions of movement on the planes A1 and A2. In this case, the rotation angles of the servomotors 15 are adjusted in conformity with the deflection of the rotary drive systems calculated in advance for each target position of movement.

When the end effector is moved to the plurality of optionally selected target positions of movement on the planes A1 and A2, the rotary shafts 14 of the second and third rotary joints J2 and J3 of the robot arm 6 are rotated, as shown in FIG. 38, in one direction. Thus, the robot arm 6, being inclined to one direction, or being bent forward at the shoulder 7 (forward-bending posture), is able to move the end effector to the target positions of movement on the plane A1. In moving the two-axis orthogonal intersection C to the target positions of movement on the plane A2, the rotary shafts 14 of the second and third joints J2 and J3 are rotated in the other direction. Thus, as shown in FIG. 39, the robot arm 6, being turned around and inclined to the other direction, or being bent backward at the shoulder 7 (backward-bending posture), is able to move the two-axis orthogonal intersection C to the target positions of movement.

Figure 40A:
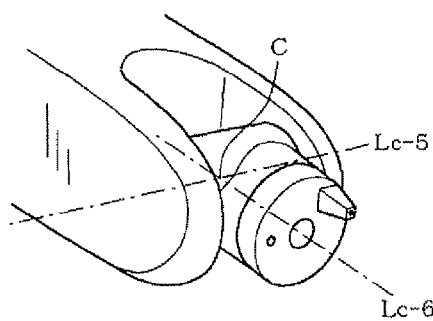
FIGS. 40A and 40B are diagrams illustrating how to calculate a first linear lines.
Figure 40B:
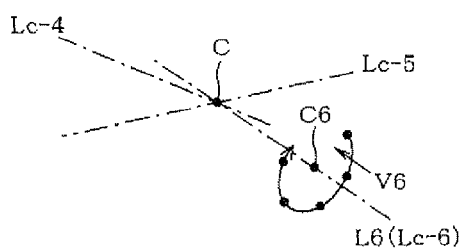

Every time the two-axis orthogonal intersection C is moved to a target position of movement, the following operation is performed to estimate the actual position of the two-axis orthogonal intersection C. Specifically, as shown in FIGS. 40A and 41B, the rotary shaft 14 of the sixth rotary joint Lc-6 is rotated at each target position of movement. When the LED 24 moves along a circular rotation locus with this rotation, three or more different positions of the LED 24 on the rotation locus are measured by the three-dimensional gauge 23. The measured three or more positions of the LED 24 are used for calculating a center position C6 of the rotation locus of the LED 24 and a normal line V6 with respect to a plane that includes the three or more positions on the rotation locus of the LED 24. Then, a first linear lines L6 is calculated, which passes through the center of the rotation locus of the LED 24 and is parallel to the normal line V6 (first operation).

Further, as shown in FIGS. 41A and 41B, the rotary shaft 14 of the fifth rotary joint Lc-5 is rotated. When the LED 24 moves along a circular rotation locus with this rotation, three or more different positions of the LED 24 on the rotation locus are measured by the three-dimensional gauge 23. The measured three or more positions of the LED 24 are used for calculating a center position C5 of the rotation locus of the LED 24 and a normal line V5 with respect to a plane that includes the three or more positions on the rotation locus of the LED 24. Then, a second linear lines L5 is calculated, which passes through the center of the rotation locus of the LED 24 and is parallel to the normal line V5 (second operation).

The intersection of the first and second linear lines L6 and L5 is rendered to be a measurement position of the two-axis orthogonal intersection C. A method of calculating the measurement position (the camera coordinate Rc) of the two-axis orthogonal intersection C is set forth below.

The center position C6 on the camera coordinate is expressed by (X6, Y6, Z6) and the normal line V6 (vector) is expressed by (l6, m6, n6). Also, the center position C5 on the camera coordinate is expressed by (X5, Y5, Z5) and the normal line V5 (vector) is expressed by (l5, m5, n5). The normal lines V6 and V5 each indicate a unit vector, while (l6, m6, n6) and (l5, m5, n5) indicate lengths obtained by decomposing the normal lines V6 and V5, respectively, in directions along Xc, Yc and Zc axes.

The following equation P1 in Formula (1) expresses a linear lines passing through the center position C6 and parallel to the normal line V6.

$$(x,y,z) = (X6, Y6, Z6) + t(l6, m6, n6)$$

$$P1 = C6 + t \cdot V6 \quad (1)$$

The following equation P2 in Formula (2) expresses a linear lines passing through the center position C5 and parallel to the normal line V5.

$$(x,y,z) = (X5, Y5, Z5) + s(l5, m5, n5)$$

$$P2 = C5 + s \cdot V5 \quad (2)$$

In the equations, t and s indicate parameters.

A linear lines connecting between the linear lines P1 and P2 for providing a minimum distance therebetween is perpendicular to both of the linear lines P1 and P2. Accordingly, when a vector directed from P1 toward P2 is expressed by "u", an inner product Dot of u, V6 and an inner product Dot of u, V5 each equal to zero as follows.

$$Dot(u, V6) = 0$$

$$Dot(u, V5) = 0$$

When the two formulas of the linear lines are substituted into the above equations of the inner products, the following Formulas (3) and (4) are established.

$$Dot(u, V6) = Dot(C5 - C6 + s \cdot V5 - t \cdot V6, V6) \quad (3)$$
$$= Dot(C5 - C6, V6) + s \cdot Dot(V5, V6) - t = 0$$

$$Dot(u, V5) = Dot(C5 - C6 + s \cdot V5 - t \cdot V6, V5) \quad (4)$$
$$= Dot(C5 - C6, V6) + s - t \cdot Dot(V5, V6) = 0$$

Figure 42:
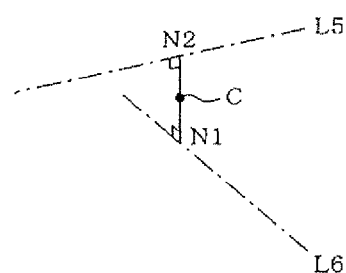
FIG. 42 is a diagram illustrating how to calculate a two-axis orthogonal intersection based on the first and second linear lines.

Since values other than the values of t and s are available, the values s and t can be calculated from Formulas (3) and (4). When the calculated s and t are substituted into Formulas (1) and (2), nearest points N1 and N2 of the two linear lines are obtained. As shown in FIG. 42, averaging the calculated nearest points N1 and N2 of the two linear lines, the position of the two-axis orthogonal intersection C is obtained. When the two linear lines intersect at one point, the nearest points N1 and N2 of the two linear lines will have the same value.

The position of the two-axis orthogonal intersection C calculated in this way is on the camera coordinate Rc and thus is converted to a position on the reference coordinate Rb. The conversion is performed using a homogeneous transformation matrix shown in FIG. 15 (step S6 of FIG. 34).

After that, for the measurement position of the two-axis orthogonal intersection C at each of the target positions of movement, values Xb, Yb on the reference coordinate Rb are acquired. Then, the positions of the two-axis orthogonal intersection C indicated by coordinate values Xb, Yb are plotted on the Xb-Yb plane of the reference coordinate Rb.

Figure 43:
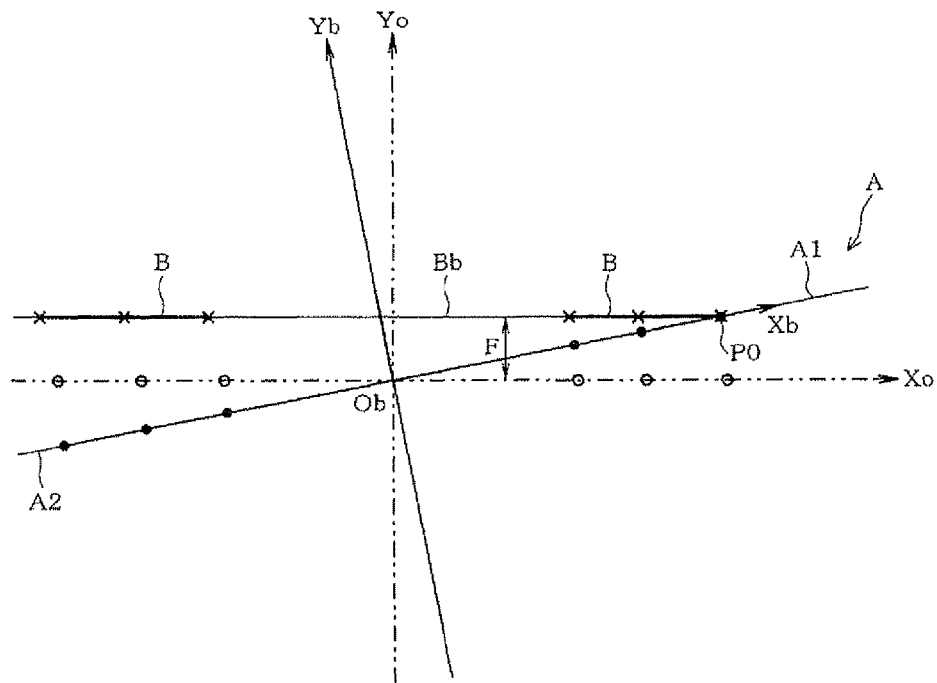
FIG. 43 is a diagram illustrating how to calculate an inter-axis offset.

FIG. 43 shows the Xb-Yb plane of the reference coordinate Rb. For clarification, the plurality of target positions of movement are rendered to be present on the X0 axis. In FIG. 43, small hollow circles indicate the target positions of movement of the two-axis orthogonal intersection C on the robot coordinate R0. Filled circles indicate the target positions of movement of the two-axis orthogonal intersection C on the reference coordinate Rb (the Xb, Yb coordinate values are equal to the X0, Y0 coordinate values). Cross marks indicate measurement positions of the two-axis orthogonal intersection C.

As described above, in moving the two-axis orthogonal intersection C to each target position of movement, pre-processing is conducted so that no error is caused in the travel position by the deflection of the rotary drive systems, the motor origin error, the link-length error and the torsion angle error. Therefore, the error between each target position of movement and the actual travel position is regarded as being caused by an inter-axis offset. Since the target positions of movement are on a vertical plane (on the X0 axis here), the error caused by the inter-axis offset allows the measurement positions of the two-axis orthogonal intersection C to be aligned along a line which is offset from the target positions of movement on the robot coordinate R0 by an amount corresponding to the inter-axis offset. In this case, the measurement positions of the two-axis orthogonal intersection C, if not precisely linearly aligned, will be distributed along a linear line. A line segment connecting between the measurement positions is rendered to be a measurement dependent line segment B. A linear lines extended from the measurement dependent line segment B is rendered to be a linear lines Bb. A minimum distance between the linear lines Bb and the origin Ob (length of a perpendicular dropped from Ob to Bb) is calculated. The calculated minimum distance corresponds to an inter-axis offset F (step S7 of FIG. 34).

In this case, if a measurement dependent line segment B obtained by connecting the actual travel positions in the movement of the robot arm 6 in the forward-bending posture on the plane A1 does not align with a measurement dependent line segments B obtained by connecting the actual travel positions in the movement of the robot arm 6 in the backward-bending posture on the plane A2 (including the case where these line segments B are not positioned near a linear line), it is considered that there is a defect somewhere in the processing that has been conducted so far. Accordingly, in this case, the processing is restarted from step S1. In this way, an actual defect in conducting the processing is detected by setting the target positions of movement on the two planes A1 and A2.

The inter-axis offset F is calculated similarly for the target positions of movement set in each of other similar planes than the planes A1 and A2 that include the X0 axis. In this case as well, the actual travel positions of the end effector should align.

The target positions of movement set in each of other planes A than the plane A that includes the X0 axis are connected to provide a measurement dependent line segment B. Thus, a minimum distance between the measurement dependent line segment B and the origin Ob is similarly measured for each of other planes A. All the measurement dependent line segments B should have a uniform distance to the origin Ob. In practice, however, the minimum distance is often not necessarily uniform due to a measurement error, for example. In such a case, an average of the minimum distances between the respective measurement dependent line segments B and the origin Ob is obtained to calculate an inter-axis offset. Thus, an inter-axis offset is more accurately calculated.

The inter-axis offset calculated as described above is a sum of inter-axis offsets caused in the second, third and fifth axes Lc-2, Lc-3 and Lc-5, and thus there is no analyzing regarding correlation of the calculated inter-axis offset to these axes. Accordingly, of the DH parameters shown in FIG. 5, either one of the parameters in the column "d" of J2 and J3 is added with the inter-axis offset, or the parameters in the column "d" of J2 and J3 are permitted to share the inter-axis offset. The fifth axis Lc-5 can have any angle between a horizontal line and a vertical line depending on the rotation of the fourth axis Lc-4. Accordingly, when the inter-axis offset is distributed to the column "d" of J5, the accuracy of absolute position is rather impaired. For this reason, the inter-axis offset is not distributed to the column "d" of J5.

It is required to confirm whether or not the absolute position accuracy has been improved by adding the inter-axis offset to either one of the parameters in the column "d" of J2 and J3, or by dividing the inter-axis offset between the parameters in the column "d" of J2 and J3. To this end, an experiment was conducted. In the experiment, a plurality of target positions were set on the Xb axis using DH parameters added with the inter-axis offset. Then, the end effector was moved to the target positions in a manner as described above to measure the actual travel positions.

As a result of the experiment, position error on the Xb-Yb plane was reduced from 0.67 mm to 0.17 mm. Position error in the Zb axis direction was also reduced from 0.9 mm to 0.06 mm. As will be understood from this, position error was reduced from 1.12 mm to 0.18 mm, regarding the Xb-Yb-Zb three-dimensional direction.

According to the present embodiment, the inter-axis offset is quantitatively grasped. Based on the inter-axis offset, DH parameters are corrected so that an error due to the inter-axis offset will not occur, or such an error occurs as less as possible. Thus, the absolute position accuracy is enhanced.

Eighth Embodiment

Figure 44:
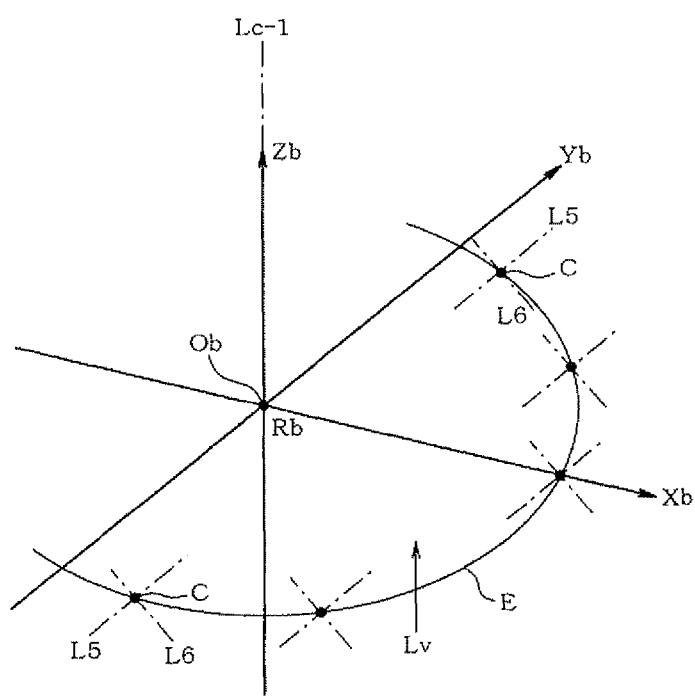
FIG. 44 is a perspective view illustrating how to determine a reference coordinate according to an eighth embodiment of the present invention.

FIG. 44 shows an eighth embodiment of the present invention. In the eighth embodiment, the reference coordinate Rb is determined using a method different from that of the first embodiment. However, the subsequent method of calculating an inter-axis offset is the same as that of the first embodiment.

In the present embodiment, the reference coordinate Rb is determined using the two-axis orthogonal intersection C. Specifically, of the rotary shafts 14 of the first to sixth rotary joints J1 to J6, the rotary shafts 14 of at least the second to fourth rotary joints J2 to J4 are fixed. In this state, the shoulder 7 is rotated to three or more optional angular positions by the rotary shaft 14 of the first rotary joint J1. Then, a first linear lines L6 (the sixth axis Lc-6 that is the rotation center line of the flange 12) is calculated at each of these angular positions by performing the first operation described in the seventh embodiment. At the same time, a second linear lines L5 (the fifth axis Lc-5 that is the rotation center line of the wrist arm 11) is calculated by performing the second operation. After that, an intersection of the first and second linear lines L6 and L5, i.e. the two-axis orthogonal intersection C, is calculated for use as a measurement position of the two-axis orthogonal intersection C.

Such measurement positions of the two-axis orthogonal intersection C are present on a circle E centering on the first axis Lc-1. The measurement controller 25 calculates a center position of the circle E that passes through the measurement positions of the two-axis orthogonal intersection C, and a normal line Lv with respect to a plane that includes the measurement positions of the two-axis orthogonal intersection C. Then, the measurement controller 25 determines the reference coordinate Rb. In the reference coordinate Rb, the origin Ob corresponds to the center of the circle E. The Zb axis corresponds to a linear lines passing through the origin Ob and parallel to the normal line Lv. The Xb axis corresponds to any optional linear lines passing through the origin Ob and intersecting the Zb axis at right angle. The Yb axis corresponds to a linear lines passing through the origin Ob and intersecting the Zb and Xb axes at right angles.

Ninth Embodiment

Figure 45:
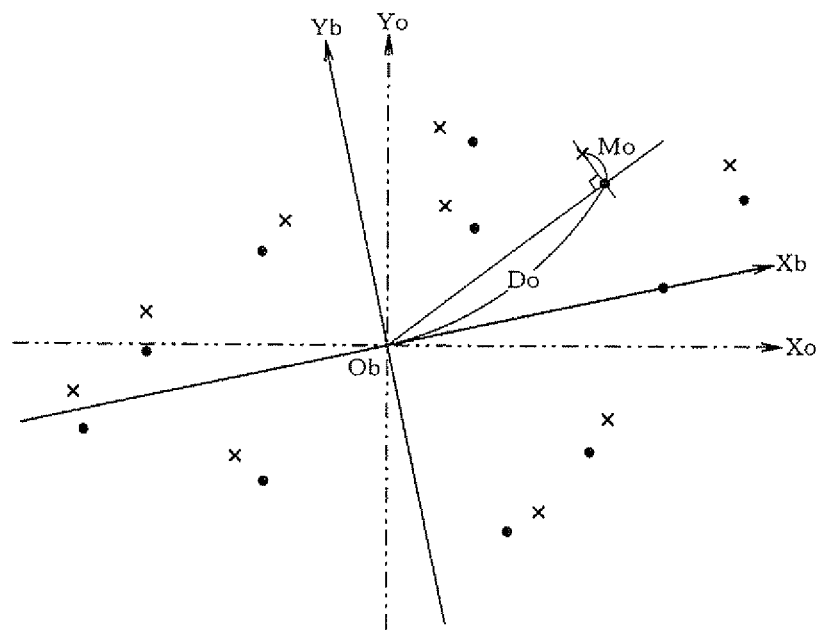
FIG. 45 is a diagram illustrating target positions of movement of a two-axis orthogonal intersection and actual travel positions thereof, according to a ninth embodiment of the present invention.
Figure 46:
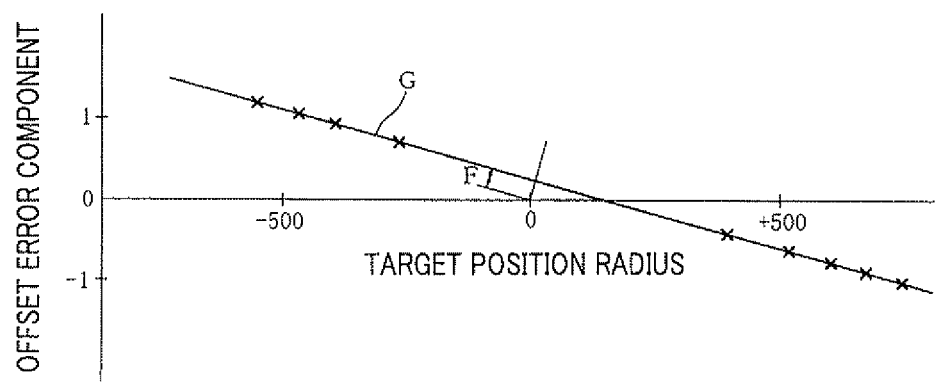
FIG. 46 is a diagram illustrating how to calculate an inter-axis offset.

FIGS. 45 and 46 show a ninth embodiment of the present invention. In the ninth embodiment, the reference coordinate Rb is calculated similar to the seventh or eighth embodiment. However, an inter-axis offset is calculated using a method different from that in the seventh embodiment.

In the present embodiment, a plurality of optional positions are set within a range in which the two-axis orthogonal intersection C is movable. When the two-axis orthogonal intersection C is moved to each of the plurality of positions, an inter-axis offset is calculated based to a difference between the target position of movement and the actual travel position of the two-axis orthogonal intersection C.

Specifically, a plurality of optional positions are optionally selected as target positions of movement on the robot coordinate R0. The X0, Y0 values of each target position of movement specified on the robot coordinate R0 are equal to the Xb, Yb values on the reference coordinate Rb (in the absence of the inter-axis offset).

In FIG. 45, the plurality of selected positions as the target positions of movement are indicated by filled circles. Regarding the target positions of movement having a plus side Xb coordinate value (right side with respect to the Yb axis), the robot arm 6 moves to these positions in a forward-bending posture. Regarding the target positions of movement having a minus side Xb coordinate value (left side with respect to the Yb axis), the robot arm 6 moves to these positions in a backward-bending posture.

Then, similar to the seventh embodiment, prior to the movement of the two-axis orthogonal intersection C to the plurality of selected target positions of movement, travel position error of the two-axis orthogonal intersection C caused by several errors other than the inter-axis offset is removed. The several errors include deflection of the rotary drive systems, origin position errors of the servomotors 15, torsion angle error and link-length error.

After that, the two-axis orthogonal intersection C is moved to the plurality of selected target positions of movement. The movement at this moment is performed by rotating the rotary shaft 14 of the first rotary joint J1 and the rotary shafts 14 of the second and third rotary joints J2 and J3 among the second, third and fifth rotary joints J2, J3 and J5. In order to maintain the fifth axis Lc-5 at a horizontal position, the rotary shaft 14 of the fourth rotary joint J4 is not rotated. The rotary shaft 14 of the fifth rotary joint J5 is not necessary for moving the two-axis orthogonal intersection C to each target position of movement and thus is not required to be rotated.

Then, a first linear lines (the sixth axis Lc-6 that is the rotation center line of the flange 12) is calculated at each target position of movement by performing the first operation described in the seventh embodiment. At the same time, a second linear lines (the fifth axis Lc-5 that is the rotation center line of the wrist arm 11) is calculated by performing the second operation. After that, an intersection of the first and second linear lines, i.e. the two-axis orthogonal intersection C, is calculated for use as a measurement position of the two-axis orthogonal intersection C.

The measurement position of the two-axis orthogonal intersection C calculated in this way, which is a position on the camera coordinate Rc, is converted to a position on the reference coordinate Rb. The measurement positions of the two-axis orthogonal intersection C at the target positions of movement are indicated by cross marks in FIG. 45.

In calculating an inter-axis offset from the target positions of movement and the measurement positions of the two-axis orthogonal intersection C, the Xb, Yb coordinate values (equal to the X0, Y0 coordinate values) of the target positions of movement as indicated by filled circles in FIG. 45 are plotted together with the measurement positions, on the Xb-Yb coordinate plane of the reference coordinate Rb. The length of a line segment from the origin Ob to a target position of movement is rendered to be a target position radius D0. The length of a perpendicular dropped from a measurement position of the LED 24 to the linear lines passing through the origin Ob and the target position of movement is rendered to be an offset error component M0. Then, as shown in FIG. 46, a graph is prepared, in which the horizontal axis indicates the target position radius D0 and the vertical axis indicates the offset error component M0. In the graph, correlation of the target position radius D0 to the offset error component M0 is plotted for the individual target positions of movement. A linear lines passing through the plotted points is rendered to be a straight error line G. When a perpendicular is dropped from the origin of the graph to the straight error line G, the length of the perpendicular corresponds to an inter-axis offset F that is a sum of the inter-axis offsets of the second, third and fifth rotary joints.

Tenth Embodiment

Figure 47A:
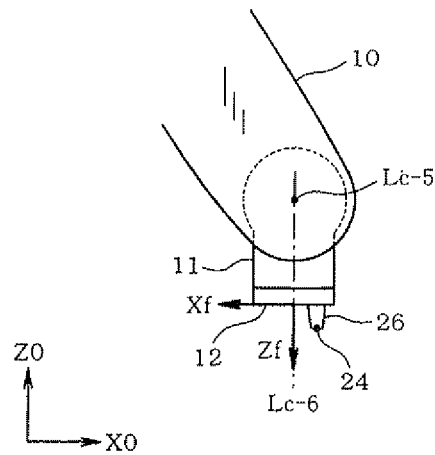
FIGS. 47A and 47B are side view and a bottom view, respectively, of a flange portion according to a tenth embodiment of the present invention.
Figure 47B:
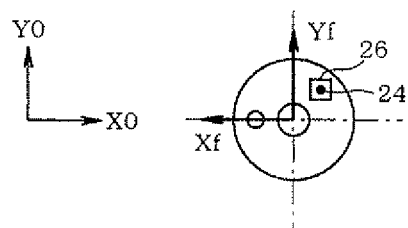
Figure 48:
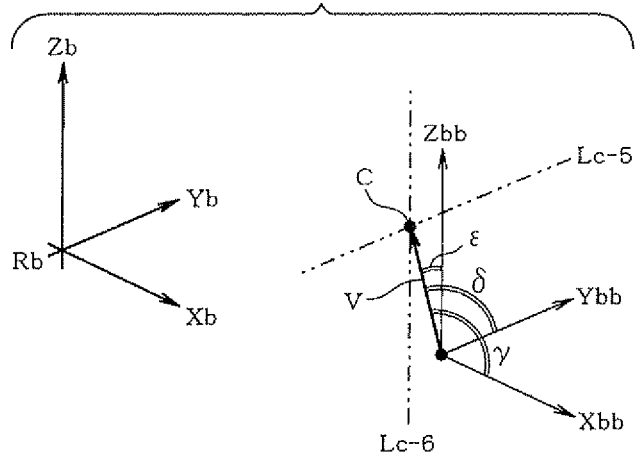
FIG. 48 is a perspective view illustrating detected vectors.

FIGS. 47A and 47B and FIG. 48 show a tenth embodiment of the present invention. In the tenth embodiment, the reference coordinate Rb is determined in a manner similar to the first or eighth embodiment. After that, a positional correlation of the position of the LED 24 to the two-axis orthogonal intersection C when the end effector is in an optional reference posture is calculated. Then, when the two-axis orthogonal intersection C is moved to each target position of movement, the end effector is permitted to adopt the reference posture to measure the position of the LED 24. Then, using the measured position of the LED 24 and the positional correlation, calculated in advance, of the LED 24 to the two-axis orthogonal intersection C, the measurement position of the two-axis orthogonal intersection C is calculated.

Specifically, after determining the reference coordinate Rb, the end effector is permitted to adopt a reference posture. An example of the reference posture is shown in FIGS. 47A and 47B, in which an end effector coordinate Rf has a Zf axis parallel to the Z0 axis (first axis Lc-1), with the plus side of the Zf axis being directed downward (opposite to the direction of the Z0 axis), an Xf axis parallel to the X0 axis, with the direction of the plus side being directed opposite to that of the plus side of the X0 axis, and a Yf axis parallel to the Y0 axis, with the direction of the plus side coinciding with that of the plus side of the Y0 axis.

In the reference posture of the end effector, the position of the LED 24 is measured by the three-dimensional gauge 23. Further, a first linear lines (the sixth axis Lc-6 that is the rotation center line of the flange 12) is calculated by performing the first operation described in the seventh embodiment. At the same time, a second linear lines (the fifth axis Lc-5 that is the rotation center line of the wrist arm 11) is calculated by performing the second operation. After that, an intersection of the first and second linear lines, i.e. the position of the two-axis orthogonal intersection C, is calculated.

The position of the LED 24 and the position of the two-axis orthogonal intersection C obtained from the first and second linear lines in the reference posture of the end effector are on the camera coordinate Rc. Accordingly, these two positions are converted to the positions on the reference coordinate Rb. Then, as shown in FIG. 48, a vector is calculated on the reference coordinate Rb, the vector having a starting point that is the position of the LED 24 and an ending point that is the position of the two-axis orthogonal intersection C. The vector is rendered to be a vector V. Angles $\gamma$, $\delta$ and $\epsilon$ of the vector V with respect to the Xb, Yb and Zb axes, respectively, of the reference coordinate Rb are calculated for use as directional angles.

Then, similar to the seventh or eighth embodiment, the target positions of movement of the two-axis orthogonal intersection C are set for the purpose of calculating an inter-axis offset. Then, the two-axis orthogonal intersection C is corrected so that no position error is caused due to the motor origin position error, deflection in the first to fourth rotary drive systems, link-length error in the first to fourth links, and error in an angle between the rotary shafts of the current and the subsequent rotary joints. Then, the two-axis orthogonal intersection C is moved to each target position of movement.

Every time the two-axis orthogonal intersection C is moved to each target position of movement, the position of the LED 24 is measured by the three-dimensional gauge 23. Since the position of the LED 24 measured by the three-dimensional gauge 23 is the position on the camera coordinate Rc, the position is converted to the position on the reference coordinate Rb. Then, the vector V is calculated for each target position of movement, the vector having a starting point that is the position of the LED 24 and having the directional angles $\gamma$, $\delta$ and $\epsilon$ with respect to the Xb, Yb and Zb axes, respectively, of the reference coordinate Rb. The position of the ending point of the vector V is rendered to be the measurement position of the two-axis orthogonal intersection C on the reference coordinate Rb.

In this way, using the measurement positions of the two-axis orthogonal intersection C on the reference coordinate Rb, an inter-axis offset is calculated in a manner similar to the first or eighth embodiment.

(Modifications)

The present invention is not limited to the embodiments described above and illustrated in the drawings but may be modified or extended as set forth below.

In moving the two-axis orthogonal intersection C to each target position, the rotation center of the rotary shaft of the fifth rotary joint is not necessarily required to be parallel to the rotation center lines of the rotary shafts of the second and third rotary joints.

The Xb axis of the reference coordinate Rb is not necessarily required to be a linear lines parallel to the X0 axis (in the absence of an inter-axis offset) but may be an optional linear lines passing through the origin Ob. In this case, a correlation between the reference coordinate Rb and the robot coordinate R0 may be obtained based on the angle of the optional linear lines (Xb axis) with respect to the X0 axis (rotation angle of the shoulder 7 from its origin position). Then, the position on the reference coordinate Rb may be converted to that on the robot coordinate R0, or vice versa.

In the seventh embodiment, the end effector is moved from the plane A1 (plane extending in one direction from the Zb axis) to the target positions of movement in the plane A2 (plane extending in the opposite direction from the Zb axis). In this case, the rotary axis 14 of one of the second, third and fifth rotary joints J2, J3 and J5 may be rotated, depending on the selected target position of movement. Thus, the robot arm 6 is turned around so that the end effector is moved to the target position of movement.

The deflection α of the rotary drive systems, the motor origin position error, the link-length error and the torsion angle error may be obtained only for the first to fourth axes Lc-1 to Lc-4 (the link-length error may be obtained for the first to fourth links 7 to 10). This is because the error of the fifth and sixth axes Lc-5 and Lc-6 has no adverse effect on the positions of the two-axis orthogonal intersection C. However, the deflection α of the rotary drive systems, which is calculated only based on the horizontal direction, is obtained in practice for the second and third axes Lc-2 and Lc-3.

In the seventh embodiment, either of the first and second linear lines L6 and L5 may be calculated first.

In the first and eighth embodiments, the robot arm 6 is rotated centering on the first axis Lc-1 in calculating the reference coordinate Rb. In this case, the rotary shafts 14 of the fifth and sixth rotary joints J5 and J6 may be fixed or may be rotated.

What is claimed is:

1. A method of detecting an inter-axis offset of a robot, which is a 6-axis robot including a base link fixed to an installation surface and a robot arm opposed to the base link, and the robot arm is configured by sequentially interconnecting a first link, a second link, a third link, a fourth link, a fifth link, and a sixth link of a robot arm through a first rotation joint, a second rotation joint, a third rotation joint, a fourth rotation joint, a fifth rotation joint, and a sixth rotation joint, wherein a rotation center line of a rotation shaft of the second rotation joint connecting the second link to the first link extends parallel to a direction perpendicular to a rotation center line of a rotation shaft of the first rotation joint connecting the first link to the base link, a rotation center line of a rotation shaft of the third rotation joint connecting the third link to the second link extends parallel to the rotation center line of the rotation shaft of the second rotation joint, a rotation center line of a rotation shaft of the fourth rotation joint connecting the fourth link to the third link extends parallel to a direction perpendicular to the rotation center line of the rotation shaft of the third rotation joint, a rotation center line of a rotation shaft of the fifth rotation joint connecting the fifth link to the fourth link extends parallel to a direction perpendicular to the rotation center line of the rotation shaft of the fourth rotation joint, a rotation center line of a rotation shaft of the sixth rotation joint connecting the sixth link to the fifth link extends parallel to a direction perpendicular to the rotation center line of the rotation shaft of the fifth rotation joint, coordinates of the first to sixth links are set on the rotation center lines of the rotation shafts of the first to sixth rotation joints, and a coordinate of an end effector of the robot arm is set at a position of a rotation center of a distal end surface of the sixth link, the distal end surface corresponding to a most distal end of the robot arm, the position of the rotation center of the distal end corresponding to a position of the end effector, the method comprising the steps of:

arranging a measurement point on the end effector and arranging a three-dimensional measurement device capable of measuring a three-dimensional position of the measurement point;

rotating the robot arm around the rotation shaft of the first rotation joint while maintaining a posture in which the rotation center line of the fifth rotation joint is parallel to the rotation center lines of the second rotation joint and the third rotation joint, and measuring three or more different positions of the measurement point, which moves along a circular rotation trajectory by the rotation of the robot arm, by a three-dimensional measurement device;

obtaining, from the three or more different positions of the measurement point on the circular rotation trajectory, a normal line of a plane including a center position of the rotation trajectory and the three or more different positions of the measurement point, and determining a reference coordinate in which a center of the rotation trajectory of the measurement point serves as an origin of the reference coordinate, a linear line extending through the origin parallel to the normal line serves as a Z-axis thereof, a linear line extending through the origin and perpendicular to the Z-axis serves as an X-axis thereof, and a linear line extending through the origin and perpendicular to both the Z-axis and the X-axis serves as a Y-axis thereof;

determining a plurality of positions on one plane including the Z-axis of the reference coordinate and extending from the Z-axis as target positions of movement, and moving the end effector to the target positions of movement;

performing a correction in order to prevent occurrence of position error of the end effector due to a motor origin error of a motor operating the first to sixth links through first to sixth driving systems including the rotation shafts of the first to sixth rotation joints, a deflection of the first to sixth rotation driving systems, the position errors by the length errors of the first to sixth links, and angle errors between rotations shafts of a rotation joint and a next rotation joint;

rotating the rotation shaft of the first rotation joint to a position, which enables the end effector to be moved to the target positions of movement by rotating at least one rotation joint among the second, third, and fifth rotation joints while maintaining a state in which the rotation center line of the fifth rotation joint is parallel to the rotation center lines of the rotation shafts of the second and third rotation joints, moving the end effector to each of the target positions of movement by rotating at least one rotation joint among the second, third, and fifth rotation joints, while fixing the rotation shaft of the first rotation joint, and measuring the position of the measurement point by the three-dimensional measurement device at the respective target positions of movement;

obtaining X and Y coordinate values of the measurement point on the reference coordinate by performing a coordinate transformation of the positions of the measurement point measured at the target positions of movement into positions on the reference coordinate, plotting the obtained X and Y coordinate values of the measurement point on the X-Y plane of the reference coordinate, putting segments interconnecting the plotted points as measurement dependence segments, obtaining a length of a perpendicular line from the origin of the reference coordinate onto a linear line obtained by extending the measurement dependence segments, and determining the obtained length of the perpendicular line as an amount of deviation; and determining the determined amount of deviation as a sum of inter-axis offsets of the second, third, and fifth rotation joints.

2. The method of claim 1, wherein an operation of determining a plurality of positions on a plane including the Z-axis of the reference coordinate and extending from the Z-axis as target positions of movement and moving the end effector to the target positions of movement on the plane is performed with respect to two planes extending in opposite directions from the Z-axis of the reference coordinate, and a movement of the end effector from a plane extending in one direction from the Z-axis to a plane extending in the opposite direction is performed by inverting the robot arm by rotating a rotation shaft of at least one rotation joint among the second, third, and fifth rotation joints in a state in which the rotation shaft of the first rotation joint is fixed.

3. The method of claim 1, comprising, in place of an operation up to when the inter-axis offset is obtained, after the reference coordinate is determined:

when the end effector is moved to a plurality of target positions of movement on the reference coordinate, performing a correction in order to prevent occurrence of position error of the end effector due to a motor origin error of a motor operating the first to sixth links through first to sixth driving systems including the rotation shafts of the first to sixth rotation joints, a deflection of the first to sixth rotation driving systems, the position errors by the length errors of the first to sixth links, and angle errors between rotations shafts of a rotation joint and a next rotation joint;

moving the end effector to each of the target positions of movement by rotating at least one rotation joint among the second, third, and fifth rotation joints, while maintaining a state in which the rotation center line of the fifth rotation joint is parallel to the rotation center lines of the rotation shafts of the second and third rotation joints, and measuring the position of the measurement point by the three-dimensional measurement device at the respective target positions of movement;

obtaining coordinate values of the measurement point on the reference coordinate by performing a coordinate transformation of the positions of the measurement point measured at the target positions of movement into positions on the reference coordinate;

for each of the target positions of movement, plotting X and Y coordinate values of the target position of movement and X and Y coordinate values of the measurement point on the X-Y plane of the reference coordinate, putting a length of a segment from the origin of the reference coordinate to the target position of movement as a target position radius, and putting a length of a perpendicular line from the measurement point to a linear line extending through the origin and the target position of movement as an offset error component;

for each of the target positions of movement, drawing a graph having two orthogonal axes indicating the target position radius and the offset error component, respectively, plotting dots reflecting a relation between the target position radius and the offset error component for the target position of movement, putting a linear line passing through the plotted dots as an error linear line, drawing a perpendicular line from an origin of the graph to the error linear line, and obtaining a length of the perpendicular line as an amount of deviation; and determining the obtained amount of deviation as a sum of inter-axis offsets of the second, third, and fifth rotation joints.

4. The method of claim 3, wherein an operation of moving the end effector to a plurality of target positions of movement on the reference coordinate is performed in both a forward fallen-down posture in which the robot arm is fallen down in one direction from the first link and a backward fallen-down posture in which the robot arm is fallen down in an opposite direction from the first link, by rotating the rotation shafts of at least the second and third rotation joints among the second, third, and fifth rotation joints in one direction and an opposite direction in a state in which the rotation shaft of the first rotation joint is fixed.

5. A method of detecting an inter-axis offset of a robot, which is a 6-axis robot including a base link fixed to an installation surface and a robot arm opposed to the base link, and the robot arm is configured by sequentially interconnecting a first link, a second link, a third link, a fourth link, a fifth link, and a sixth link of a robot arm through a first rotation joint, a second rotation joint, a third rotation joint, a fourth rotation joint, a fifth rotation joint, and a sixth rotation joint, wherein a rotation center line of a rotation shaft of the second rotation joint connecting the second link to the first link extends parallel to a direction perpendicular to a rotation center line of a rotation shaft of the first rotation joint connecting the first link to the base link, a rotation center line of a rotation shaft of the third rotation joint connecting the third link to the second link extends parallel to the rotation center line of the rotation shaft of the second rotation joint, a rotation center line of a rotation shaft of the fourth rotation joint connecting the fourth link to the third link extends parallel to a direction perpendicular to the rotation center line of the rotation shaft of the third rotation joint, a rotation center line of a rotation shaft of the fifth rotation joint connecting the fifth link to the fourth link extends parallel to a direction perpendicular to the rotation center line of the rotation shaft of the fourth rotation joint, a rotation center line of a rotation shaft of the sixth rotation joint connecting the sixth link to the fifth link extends parallel to a direction perpendicular to the rotation center line of the rotation shaft of the fifth rotation joint, coordinates of the first to sixth links are set on the rotation center lines of the rotation shafts of the first to sixth rotation joints, and a coordinate of an end effector of the robot arm is set at a given position on the rotation center line of the rotation shaft of the sixth rotation joint of the sixth link, the given position corresponding to a position of the end effector, the method comprising:

arranging a measurement point integrally operating with the sixth link at a position spaced apart from the rotation center line of the sixth link, and arranging a three-dimensional measurement device capable of measuring a three-dimensional position of the measurement point;

rotating the first link to three or more different angle positions while maintaining the robot arm in a posture in which the rotation center line of the fifth rotation joint is parallel to the rotation center lines of the second rotation joint and the third rotation joint, and measuring three or more different positions of the measurement point on a rotation trajectory, which rotates integrally with the sixth link, by the three-dimensional measurement device during a rotation of the sixth link at each of the angle positions of the first link;

from the three or more different positions of the measurement point on the rotation trajectory by the rotation of the sixth link measured at the respective angle positions of the first link, obtaining a position of a rotation center of the measurement point at each of the angle positions, determining a center of the rotation center of the measurement point as a virtual end effector position for setting a reference coordinate, obtaining a normal line of a plane, which includes a center position of a circle passing through the virtual end effector position for setting a reference coordinate and three or more virtual end effector positions for setting the reference coordinate, from the obtained virtual end effector position for setting the reference coordinate, and determining a reference coordinate in which a center of the obtained circle of the measurement point serves as an origin of the reference coordinate, a linear line extending through the origin parallel to the normal line serves as a Z-axis thereof, a linear line extending through the origin and perpendicular to the Z-axis serves as an X-axis thereof, and a linear line extending through the origin and perpendicular to both the Z-axis and the X-axis serves as a Y-axis thereof;

determining a plurality of positions on one plane extending from the Z-axis of the reference coordinate as target positions of movement, and moving the end effector to the target positions of movement;

performing a correction in order to prevent occurrence of position error of the end effector due to a motor origin error of a motor operating the first to sixth links through first to sixth driving systems including the rotation shafts of the first to sixth rotation joints, a deflection of the first to sixth rotation driving systems, the position errors by the length errors of the first to sixth links, and angle errors between rotations shafts of a rotation joint and a next rotation joint;

rotating the rotation shaft of the first rotation joint to a position, which enables the end effector to be moved to the target positions of movement by rotating at least one rotation joint among the second, third, and fifth rotation joints while maintaining a state in which the rotation center line of the fifth rotation joint is parallel to the rotation center lines of the rotation shafts of the second and third rotation joints, moving the end effector to each of the target positions of movement by rotating at least one rotation joint among the second, third, and fifth rotation joints, while fixing the rotation shaft of the first rotation joint, and measuring three or more different positions on a rotation trajectory of the measurement point, which rotates integrally with the sixth link, by the three-dimensional measurement device during a rotation of the sixth link at the respective target positions of movement;

obtaining a rotation center position of the measurement point from the three or more positions on the rotation trajectory of the measurement point measured at the respective target positions of movement, and obtaining X and Y coordinate values of the virtual end effector position for setting the reference coordinate on the reference coordinate by performing a coordinate transformation of the virtual end effector position for setting the reference coordinate into positions on the reference coordinate;

plotting the obtained X and Y coordinate values of the virtual end effector position for setting the reference coordinate on the X-Y plane of the reference coordinate, putting segments interconnecting the plotted points as measurement dependence segments, obtaining a length of a perpendicular line from the origin of the reference coordinate onto a linear line obtained by extending the measurement dependence segments, and determining the obtained length of the perpendicular line as an amount of deviation; and determining the determined amount of deviation as a sum of inter-axis offsets of the second, third, and fifth rotation joints.

6. The method of claim 5, wherein an operation of determining a plurality of positions on a plane extending from the Z-axis of the reference coordinate as target positions of movement and moving the end effector to the target positions of movement on the plane is performed with respect to two planes extending in opposite directions from the Z-axis of the reference coordinate, and a movement of the end effector from a plane extending in one direction from the Z-axis to a plane extending in the opposite direction is performed by inverting the robot arm by rotating a rotation shaft of at least one rotation joint among the second, third, and fifth rotation joints in a state in which the rotation shaft of the first rotation joint is fixed.

7. The method of claim 5, comprising, in place of an operation up to when the inter-axis offset is obtained, after the reference coordinate is determined:

when the end effector is moved to a plurality of target positions of movement on the reference coordinate, performing a correction in order to prevent occurrence of position error of the end effector due to a motor origin error of a motor operating the first to sixth links through first to sixth driving systems including the rotation shafts of the first to sixth rotation joints, a deflection of the first to sixth rotation driving systems, the position errors by the length errors of the first to sixth links, and angle errors between rotations shafts of a rotation joint and a next rotation joint;

moving the end effector to each of the target positions of movement in a state, in which the rotation center line of the rotation shaft of the sixth rotation joint is parallel to the rotation center line of the rotation shaft of the first rotation joint, by rotating at least one rotation joint among the second, third, and fifth rotation joints, while maintaining a state in which the rotation center line of the fifth rotation joint is parallel to the rotation center lines of the rotation shafts of the second and third rotation joints, and measuring three or more different positions on a rotation trajectory of the measurement point, which rotates integrally with the sixth link, by the three-dimensional measurement device during a rotation of the sixth link at the respective target positions of movement;

obtaining a rotation center position of the measurement point from a plurality of positions on the rotation trajectory of the measurement point measured at the respective target positions of movement, performing a coordinate transformation of the virtual end effector position for setting the reference coordinate into positions on the reference coordinate, and obtaining X and Y coordinate values of the virtual end effector position for setting the reference coordinate on the reference coordinate;

for each of the target positions of movement, plotting X and Y coordinate values of the target position of movement and X and Y coordinate values of the measurement point on the X-Y plane of the reference coordinate, putting a length of a segment from the origin of the reference coordinate to the target position of movement as a target position radius, and putting a length of a perpendicular line from the virtual end effector position for setting the reference coordinate to a linear line extending through the origin of the reference coordinate and the target position of movement on the X-Y plane as an offset error component;

for each of the target positions of movement, drawing a graph having two orthogonal axes indicating the target position radius and the offset error component, respectively, plotting dots reflecting a relation between the target position radius and the offset error component for the target position of movement, putting a linear line passing through the plotted dots as an error linear line, drawing a perpendicular line from an origin of the graph to the error linear line, and obtaining a length of the perpendicular line as an amount of deviation; and determining the obtained amount of deviation as a sum of inter-axis offsets of the second, third, and fifth rotation joints.

8. The method of claim 7, wherein an operation of moving the end effector to a plurality of target positions of movement on the reference coordinate is performed in both a forward fallen-down posture in which the robot arm is fallen down in one direction from the first link and a backward fallen-down posture in which the robot arm is fallen down in an opposite direction from the first link, by rotating the rotation shafts of at least the second and third rotation joints among the second, third, and fifth rotation joints in one direction and an opposite direction in a state in which the rotation shaft of the first rotation joint is fixed.

9. A method of detecting an inter-axis offset of a robot, which is a 6-axis robot including a base link fixed to an installation surface and a robot arm opposed to the base link, and the robot arm is configured by sequentially interconnecting a first link, a second link, a third link, a fourth link, a fifth link, and a sixth link of a robot arm through a first rotation joint, a second rotation joint, a third rotation joint, a fourth rotation joint, a fifth rotation joint, and a sixth rotation joint, wherein a rotation center line of a rotation shaft of the second rotation joint connecting the second link to the first link extends parallel to a direction perpendicular to a rotation center line of a rotation shaft of the first rotation joint connecting the first link to the base link, a rotation center line of a rotation shaft of the third rotation joint connecting the third link to the second link extends parallel to the rotation center line of the rotation shaft of the second rotation joint, a rotation center line of a rotation shaft of the fourth rotation joint connecting the fourth link to the third link extends parallel to a direction perpendicular to the rotation center line of the rotation shaft of the third rotation joint, a rotation center line of a rotation shaft of the fifth rotation joint connecting the fifth link to the fourth link extends parallel to a direction perpendicular to the rotation center line of the rotation shaft of the fourth rotation joint, a rotation center line of a rotation shaft of the sixth rotation joint connecting the sixth link to the fifth link extends parallel to a direction perpendicular to the rotation center line of the rotation shaft of the fifth rotation joint, a coordinate of the robot is set on the rotation center line of the rotation shaft of the rotation shaft of the first ration joint, coordinates of the first to sixth links are set on the rotation center lines of the rotation shafts of the first to sixth rotation joints, and a coordinate of an end effector of the robot arm is set at a given position on the rotation center line of the rotation shaft of the sixth rotation joint of the sixth link, the given position corresponding to a position of the end effector, the method comprising:

arranging a measurement point integrally operating with the sixth link at a position spaced apart from the rotation center line of the sixth link, and arranging a three-dimensional measurement device capable of measuring a three-dimensional position of the measurement point;

setting an initial rotation position of the first link corresponding to a proper rotation position of the first link and setting an initial rotation position of the sixth link corresponding to a proper rotation position of the sixth link gained when the first link is at the initial rotation position;

rotating the first link to three or more different rotation positions while maintaining the robot arm in a posture in which the rotation center line of the fifth rotation joint is parallel to the rotation center lines of the second and third rotation joints and the rotation center line of the sixth rotation joint is parallel to the rotation center line of the rotation shaft of the first rotation joint, and measuring, at each of the rotation positions of the first link, the position of the measurement point using the three-dimensional measurement device in a state where the sixth link is rotated from the initial rotation position thereof by an angle corresponding to a rotation angle of the first link obtained when the first link is rotated from the initial rotation position thereof to each of the respective rotation positions of the first link in a direction oppositely to a rotation direction of the first link;

obtaining, from the three or more positions of the measurement point measured at each of the rotation positions of the first link, a center position of a circle passing through the three or more positions and a normal line to a plane including the three or more positions, and setting a reference coordinate whose origin is the center position of the circle, whose Z-axis is a line parallel with the normal line passing through the origin, whose X-axis is a line being normal to the Z-axis and passing through the origin, and whose Y-axis is a line being normal to both the Z- and X-axes and passing through the origin;

setting, as target positions of movement, plural positions on a plane including the rotation center line of the rotation shaft of the first rotation joint, the plane being extended from the rotation center line of the rotation shaft of the first rotation joint;

performing a correction in order to prevent occurrence of position error of the end effector due to a motor origin error of a motor operating the first to sixth links through first to sixth driving systems including the rotation shafts of the first to sixth rotation joints, a deflection of the first to sixth rotation driving systems, the position errors by the length errors of the first to sixth links, and angle errors between rotations shafts of a rotation joint and a next rotation joint;

moving the end effector to the plural target positions of movement by rotating the rotation shafts of at least two of the second, third and fifth rotation joints in a state where i) the rotation center line of the rotation shaft of the fifth rotation joint is parallel with the rotation center lines of the rotation shafts of the second and third rotation joints and ii) a target-position reached posture is maintained, the target-position reached posture providing a state where the rotation center lines of the rotation shafts of the sixth and first rotation joints are parallel with each other;

obtaining offset-calculating measurement positions which are the positions of the target positions of movement measured by the three-dimensional measurement device, the measurement being made at each of the target positions of movement in the state where the sixth link is rotated from the initial rotation position thereof by the angle corresponding to the rotation angle of the first link obtained when the first link is rotated from the initial rotation position thereof to each of the respective rotation positions of the first link in the direction oppositely to the rotation direction of the first link;

calculating X and Y coordinate values of the offset-calculating measurement positions in the reference coordinate by coordinate-converting the offset-calculating measurement positions to positions in the reference coordinate;

plotting the calculated X and Y coordinate values of the offset-calculating measurement positions on the X-Y plane of the reference coordinate, putting segments interconnecting the plotted points as measurement dependence segments, obtaining a length of a perpendicular line from the origin of the reference coordinate onto a linear line obtained by extending the measurement dependence segments, the length being an amount of deviation; and determining the obtained amount of deviation as a sum of inter-axis offsets of the second, third, and fifth rotation joints.

10. The method of claim 9, wherein setting the target positions of movement and moving the end effector to the plural target positions of movement are performed for two planes extended from the rotation center line of the rotation shaft of the first rotation joint in mutually opposite directions, the method comprising transferring one of the planes to the other plane by inverting the robot arm, wherein the rotation shafts of at least two of the second, three and fifth rotation joints are rotated with the first link fixed.

11. A method of detecting an inter-axis offset of a robot, which is a 6-axis robot including a base link fixed to an installation surface and a robot arm opposed to the base link, and the robot arm is configured by sequentially interconnecting a first link, a second link, a third link, a fourth link, a fifth link, and a sixth link of a robot arm through a first rotation joint, a second rotation joint, a third rotation joint, a fourth rotation joint, a fifth rotation joint, and a sixth rotation joint, wherein a rotation center line of a rotation shaft of the second rotation joint connecting the second link to the first link extends parallel to a direction perpendicular to a rotation center line of a rotation shaft of the first rotation joint connecting the first link to the base link, a rotation center line of a rotation shaft of the third rotation joint connecting the third link to the second link extends parallel to the rotation center line of the rotation shaft of the second rotation joint, a rotation center line of a rotation shaft of the fourth rotation joint connecting the fourth link to the third link extends parallel to a direction perpendicular to the rotation center line of the rotation shaft of the third rotation joint, a rotation center line of a rotation shaft of the fifth rotation joint connecting the fifth link to the fourth link extends parallel to a direction perpendicular to the rotation center line of the rotation shaft of the fourth rotation joint, a rotation center line of a rotation shaft of the sixth rotation joint connecting the sixth link to the fifth link extends parallel to a direction perpendicular to the rotation center line of the rotation shaft of the fifth rotation joint, a coordinate of the robot is set on the rotation center line of the rotation shaft of the rotation shaft of the first ration joint, coordinates of the first to sixth links are set on the rotation center lines of the rotation shafts of the first to sixth rotation joints, and a coordinate of an end effector of the robot arm is set at a given position on the rotation center line of the rotation shaft of the sixth rotation joint of the sixth link, the given position corresponding to a position of the end effector, the method comprising:

arranging a measurement point integrally operating with the sixth link at a position spaced apart from the rotation center line of the sixth link, and arranging a three-dimensional measurement device capable of measuring a three-dimensional position of the measurement point;

setting an initial rotation position of the first link corresponding to a proper rotation position of the first link and setting an initial rotation position of the sixth link corresponding to a proper rotation position of the sixth link gained when the first link is at the initial rotation position;

rotating the first link to three or more different rotation positions while maintaining the robot arm in a posture in which the rotation center line of the fifth rotation joint is parallel to the rotation center lines of the second and third rotation joints and the rotation center line of the sixth rotation joint is parallel to the rotation center line of the rotation shaft of the first rotation joint, and measuring, at each of the rotation positions of the first link, the position of the measurement point using the three-dimensional measurement device in a state where the sixth link is rotated from the initial rotation position thereof by an angle corresponding to a rotation angle of the first link obtained when the first link is rotated from the initial rotation position thereof to each of the respective rotation positions of the first link in a direction oppositely to a rotation direction of the first link;

obtaining, from the three or more positions of the measurement point measured at each of the rotation positions of the first link, a center position of a circle passing through the three or more positions and a normal line to a plane including the three or more positions, and setting a reference coordinate whose origin is the center position of the circle, whose Z-axis is a line parallel with the normal line passing through the origin, whose X-axis is a line being normal to the Z-axis and passing through the origin, and whose Y-axis is a line being normal to both the Z- and X-axes and passing through the origin;

setting, as target positions of movement, plural positions on a plane including the rotation center line of the rotation shaft of the first rotation joint, the plane being extended from the rotation center line of the rotation shaft of the first rotation joint;

performing a correction in order to prevent occurrence of position error of the end effector due to a motor origin error of a motor operating the first to sixth links through first to sixth driving systems including the rotation shafts of the first to sixth rotation joints, a deflection of the first to sixth rotation driving systems, the position errors by the length errors of the first to sixth links, and angle errors between rotations shafts of a rotation joint and a next rotation joint;

moving the end effector to the plural target positions of movement by rotating the rotation shaft of the first joint and the rotation shafts of at least two of the second, third and fifth rotation joints in a state where i) the rotation center line of the rotation shaft of the fifth rotation joint is parallel with the rotation center lines of the rotation shafts of the second and third rotation joints and ii) a target-position reached posture is maintained, the target-position reached posture providing a state where the rotation center lines of the rotation shafts of the sixth and first rotation joints are parallel with each other;

obtaining offset-calculating measurement positions which are the positions of the target positions of movement measured by the three-dimensional measurement device, the measurement being made at each of the target positions of movement in the state where the sixth link is rotated from the initial rotation position thereof by the angle corresponding to the rotation angle of the first link obtained when the first link is rotated from the initial rotation position thereof to each of the respective rotation positions of the first link in the direction oppositely to the rotation direction of the first link;

calculating X and Y coordinate values of the offset-calculating measurement positions in the reference coordinate by coordinate-converting the offset-calculating measurement positions to positions in the reference coordinate, and calculating target positions of movement in the reference coordinate by coordinate-converting the X and Y coordinate values of the target positions of movement to X and Y positions in the reference coordinate;

obtaining offset error components, wherein, for each of the target positions of movement, the X and Y coordinate values of the target positions of movement and the X and Y positions of the offset-calculating measurement positions are plotted on an X-Y plane of the reference coordinate, a length of a segment from an origin of the reference coordinate to the target position of movement on the X-Y plane is set as a target position radius, and a length of a normal line from the offset-calculating measurement position on the X-Y plane to a linear line passing through the origin of the reference coordinate and the target position of movement on the X-Y plane is set as the offset error component;

obtaining an amount of deviation, wherein, for each of the target positions of movement, a relationship between the target position radius and the offset error component is plotted on a graph with mutually orthogonal two axes such that the target position radius is assigned to one of the axes and the offset error component is assigned to the other axis, plotted points in the graph is connected by a linear line, and a normal line is drawn from an origin of the graph to the liner line, the normal line presenting the amount of deviation; and determining the obtained amount of deviation as a sum of inter-axis offsets of the second, third, and fifth rotation joints.

12. The method of claim 11, wherein setting the target positions of movement and moving the end effector to the plural target positions of movement are performed for forward-bending and rearward-bending postures of the robot arm which are realized by rotating, in two mutually-opposite directions, the rotation shafts of at least the second and third rotation joints among the second, third and fifth rotation joints with the rotation shaft of the first rotation joint fixed, rotating the robot arm in the two directions providing the robot arm with the forward-bending and rearward-bending postures, respectively.

13. A method of detecting an inter-axis offset of a robot, which is a 6-axis robot including a base link fixed to an installation surface and a robot arm opposed to the base link, and the robot arm is configured by sequentially interconnecting a first link, a second link, a third link, a fourth link, a fifth link, and a sixth link of a robot arm through a first rotation joint, a second rotation joint, a third rotation joint, a fourth rotation joint, a fifth rotation joint, and a sixth rotation joint, wherein a rotation center line of a rotation shaft of the second rotation joint connecting the second link to the first link extends parallel to a direction perpendicular to a rotation center line of a rotation shaft of the first rotation joint connecting the first link to the base link, a rotation center line of a rotation shaft of the third rotation joint connecting the third link to the second link extends parallel to the rotation center line of the rotation shaft of the second rotation joint, a rotation center line of a rotation shaft of the fourth rotation joint connecting the fourth link to the third link extends parallel to a direction perpendicular to the rotation center line of the rotation shaft of the third rotation joint, a rotation center line of a rotation shaft of the fifth rotation joint connecting the fifth link to the fourth link extends parallel to a direction perpendicular to the rotation center line of the rotation shaft of the fourth rotation joint, a rotation center line of a rotation shaft of the sixth rotation joint connecting the sixth link to the fifth link extends parallel to a direction perpendicular to the rotation center line of the rotation shaft of the fifth rotation joint, a coordinate of the robot is set on the rotation center line of the rotation shaft of the rotation shaft of the first ration joint, coordinates of the first to sixth links are set on the rotation center lines of the rotation shafts of the first to sixth rotation joints, and a coordinate of an end effector of the robot arm is set at a given position on the rotation center line of the rotation shaft of the sixth rotation joint of the sixth link, the given position corresponding to a position of the end effector, the method comprising:

locating a measurement point integrally operating with the six axis and arranging a three-dimensional measurement device capable of measuring a three-dimensional position of the measurement point;

first measuring, using the three-dimensional measurement device, three or more positions of the measurement point which moves on a circular rotary trajectory produced by rotating the robot arm about the rotation shaft of the first rotation joint with the robot arm maintained in an arbitrary posture thereof during the rotation;

first obtaining, from the measured three or more positions of the measurement point, a normal line to a plane including a center position of the rotation trajectory of the measurement point and the measured three or more positions of the measurement point, and setting a reference coordinate whose origin is provided as the center position of the rotation trajectory, whose Z-axis is provided by a linear line being parallel with the normal line and passing the origin, and whose X-axis is provided by an arbitrary linear line passing the origin and being perpendicular to the Z-axis, and whose Y-axis provided as a linear line being perpendicular to the Z- and X-axes and passing the origin;

setting a plurality of positions, as target positions of movement, on a plane including the rotation center line of the rotation shaft the first rotation joint;

performing a correction in order to prevent occurrence a positional error of a two-axis orthogonal intersection due to errors of origin positions of motors driving the first to fourth links via first to fourth rotation drive systems including the first to fourth rotation joints respectively, deflection of the first to fourth rotation drive systems, errors of lengths of the first to fourth links, and an error of an angle between rotation shafts of a rotation joint and a next rotation joint, the two-axis orthogonal intersection being a point at which the rotation center lines of the rotation shafts of both the fifth and sixth rotation joints intersect orthogonally to each other;

rotating the rotation shaft of the first rotation joint to a position which allows the two-axis orthogonal intersection to travel to the target positions of movement by rotating the rotation shafts of the second and third rotation joints;

moving the orthogonal intersection to each of the target positions of movement by rotating the rotation shafts of the second and third rotation joints with the rotation shaft of the first rotation joint positionally fixed;

second measuring three or more positions of the measurement point moving on a circular rotation trajectory produced by rotating the rotation shaft of the sixth rotation joint at each of the target positions of movement, by using the three-dimensional measurement device;

second obtaining, from the measured three or more points on the rotation trajectory, a center position of the rotation trajectory, a normal line normal to a plane including the center position and the measured three or more positions, and a first linear line being parallel with the normal line and passing the center position of the rotation trajectory;

third measuring three or more positions of the measurement point moved on a circular trajectory produced by rotating the rotation shaft of the fifth joint, by using the three-dimensional measurement device;

third obtaining, from the measured three or more points on the rotation trajectory, a center position of the rotation trajectory, a normal line normal to a plane including the center position and the measured three or more positions, and a second linear line being parallel with the normal line and passing the center position of the rotation trajectory;

fourth obtaining an intersection of both the first and second liner lines as the two-axis orthogonal intersection, and obtaining X- and Y-coordinate values of the intersection in the reference coordinate by coordinate-converting a position of the intersection into the reference coordinate;

fifth obtaining an amount of deviation by plotting the obtained X- and Y-coordinate values on the X-Y plane of the reference coordinate, and putting a segment interconnecting the plotted points as a measurement dependence segment, and obtaining a length of a perpendicular line from the origin of the reference coordinate onto a linear line obtained by extending the measurement dependence segment, the length being the amount of deviation; and determining the obtained amount of deviation as a sum of inter-axis offsets of the second, third, and fifth rotation joints.

14. The method of claim 13, wherein
the first measuring step is a measuring step in which, with the rotation shafts of, at least, the second to fourth rotation joints among the first to sixth rotation joints fixed, and the first link is rotated to any three or more angular positions, and the rotation shaft of the sixth rotation joint is rotated at each of the three or more angular positions of the first link to produce the three or more positions of the measurement point on the rotation trajectory for the measurement using the three-dimensional measurement device; and the first obtaining step includes
a step of obtaining, from the measured three or more positions of the measurement point on the rotation trajectory, a center position of the rotation trajectory, a normal line normal to a plane including the center position and the three or more positions on the rotation trajectory, and a first linear line being parallel with the normal line and passing the center position of the rotation trajectory, a step of making the rotation shaft of the fifth rotation joint rotate to produce a circular rotation trajectory, three or more positions of the measurement point being provided on the rotation trajectory, the three or more positions being measured by the three-dimensional measurement device, a step of obtaining, from the measured three or more positions, a center position of the rotation trajectory and a normal line normal to a plane including the center position and the measured three or more positions, and obtaining a second linear line being parallel with the normal line and passing the center position of the rotation trajectory, a step of designating an intersection of the obtained first and second liner lines as a measurement position of the two-axis orthogonal intersection, and a step of defining the reference coordinate by obtaining, from the three or more two-axis orthogonal lines obtained at the respective angular positions, a center position of an arch passing the measurement positions of the three or more two-axis orthogonal intersections and a normal line to a plane including the measurement positions of the three or more two-axis orthogonal lines, the reference coordinate having an origin which is the center of the arc, the Z-axis which passes the origin and is parallel with the normal line, and the X-axis which passes the origin and is orthogonal to the Z-axis, and the Y-axis which passes the origin and is orthogonal to both the Z- and X-axes.

15. The method of claim 13, wherein, in place of the step of setting the target positions of movement, the step of performing the correction, the step of rotating the rotation shaft of the first rotation joint, the step of moving the orthogonal intersection, the second measuring step, the second obtaining step, the third measuring step, the third obtaining step, the fourth obtaining step, and the fifth obtaining step, defining, as target positions of movement, a plurality of positions within a movable range of the two-axis orthogonal intersection;

moving the two-axis orthogonal intersection to each of the plurality of target positions of movement by rotating the rotation shafts of the first to third rotation joints, wherein a correction is made to prevent occurrence a positional error of the two-axis orthogonal intersection due to errors of origin positions of motors driving the first to fourth links via first to fourth rotation drive systems including the first to fourth rotation joints respectively, deflection of the first to fourth rotation drive systems, errors of lengths of the first to fourth links, and an error of an angle between rotation shafts of a rotation joint and a next rotation joint;

measuring, by using the three-dimensional measuring device, three or more positions on a circular rotation trajectory of the measurement point produced by rotating the rotation shaft of the six rotation joint at each of the target positions of movement;

obtaining, from the measured three or more positions of the measurement point, a center position of the rotation trajectory and a normal line to a plane including the measured three or more positions to obtain a first linear line being parallel with a normal line and passing the center position;

measuring, using the three-dimensional measuring device, three or more positions on a rotation trajectory of the measurement point produced by rotating the rotation shaft of the fifth rotation joint;

obtaining, from the measured three or more positions of the measurement point, a center position of the rotation trajectory and a normal line to a plane including the measured three or more positions to obtain a second liner line being parallel with the normal line and passing the center position;

obtaining a target position of movement in the reference coordinate by obtaining a measured position of a two-axis orthogonal intersection defined as an intersection of the first and second linear lines, coordinate-converging the measured position of the two-axis orthogonal intersection into X- and Y-coordinate values in the reference coordinate, and coordinate-converting X- and Y-coordinate values of each of the target positions of movement in the robot coordinate into X- and Y-coordinate values in the reference coordinate;

plotting the X- and Y-coordinate values of each of the target positions of movement and the X- and Y-coordinate values of the measured position of the two-axis orthogonal intersection into an X-Y plane of the reference coordinate, obtaining, as a target position radius, as a length of a segment from an origin of the reference coordinate to each of the target positions of movement in the X-Y plane, and obtaining, as an offset error component, a length of a normal line extending from the measured position of the two-axis orthogonal intersection in the X-Y plane to a liner line passing the origin of the reference coordinate and each of the target positions of movement; and plotting, in a graph having mutually orthogonal two axes, for each of the target positions of movement, a relationship between the target position radius and the offset error component and the target position radius, the relationship being assigned to one of the axes and the target position radius being assigned to the other of the axes, obtaining an error liner line passing plotted points in the graph, and obtaining, as an amount of deviation, a length of a normal line from an origin of the graph to the error linear line.

16. A method of detecting an inter-axis offset of a robot, which is a 6-axis robot including a base link fixed to an installation surface and a robot arm opposed to the base link, and the robot arm is configured by sequentially interconnecting a first link, a second link, a third link, a fourth link, a fifth link, and a sixth link of a robot arm through a first rotation joint, a second rotation joint, a third rotation joint, a fourth rotation joint, a fifth rotation joint, and a sixth rotation joint, wherein a rotation center line of a rotation shaft of the second rotation joint connecting the second link to the first link extends parallel to a direction perpendicular to a rotation center line of a rotation shaft of the first rotation joint connecting the first link to the base link, a rotation center line of a rotation shaft of the third rotation joint connecting the third link to the second link extends parallel to the rotation center line of the rotation shaft of the second rotation joint, a rotation center line of a rotation shaft of the fourth rotation joint connecting the fourth link to the third link extends parallel to a direction perpendicular to the rotation center line of the rotation shaft of the third rotation joint, a rotation center line of a rotation shaft of the fifth rotation joint connecting the fifth link to the fourth link extends parallel to a direction perpendicular to the rotation center line of the rotation shaft of the fourth rotation joint, a rotation center line of a rotation shaft of the sixth rotation joint connecting the sixth link to the fifth link extends parallel to a direction perpendicular to the rotation center line of the rotation shaft of the fifth rotation joint, a coordinate of the robot is set on the rotation center line of the rotation shaft of the rotation shaft of the first ration joint, coordinates of the first to sixth links are set on the rotation center lines of the rotation shafts of the first to sixth rotation joints, and a coordinate of an end effector of the robot arm is set at a given position on the rotation center line of the rotation shaft of the sixth rotation joint of the sixth link, the given position corresponding to a position of the end effector, the method comprising:

locating a measurement point integrally operating with the sixth link and arranging a three-dimensional measurement device capable of measuring a three-dimensional position of the measurement point;

measuring, using the three-dimensional measuring device, three or more positions on a circular trajectory of the measurement point produced by rotating the robot arm about the rotation shaft of the first rotation joint in a state the robot arm is maintained in an arbitrary posture, defining a reference coordinate using the measured three or more positions, wherein data of the measured three or more positions are used to obtain a center position of the rotation trajectory and a normal line to a plane including the measured three or more points, and the reference coordinate is defined to have an origin as the center position, a Z-axis being parallel with the normal line and having the origin, an X-axis being orthogonal to the Z-axis and passing the origin, and a Y-axis being orthogonal to both the Z- and X-axes and passing the origin;

measuring, using the three-dimensional measuring device, a position of the measurement point with the end effector maintained in a reference posture and three or more points on a circular trajectory of the measurement point produced by rotating the rotation shaft of the sixth rotation joint;

obtaining a first linear line, wherein the measured three or more positions of the measurement point are used to obtain a center position of the rotation trajectory and a normal line to a plane including the measured three or more positions, the first linear line being parallel with the normal line and passing the center position;

measuring, using the three-dimensional measuring device, three or more positions on a circular rotation trajectory of the measurement point by rotating the rotation shaft of the fifth rotation joint;

obtaining a second linear line, wherein the measured three or more positions of the measurement point are used to obtain a center position of the rotation trajectory and a normal line to a plane including the measured three or more positions, the second linear line being parallel with the normal line and passing the center position;

obtaining a vector directed from the measured point in the reference posture of the end effector to an intersection of the first and second linear lines and an angle made between the vector and the X-, Y- and Z-axes of the reference coordinate;

defining, as target position of movements, a plurality of positions in a single plane including the rotation center line of the rotation shaft of the first rotation joint;

performing a correction in order to prevent occurrence a positional error of a two-axis orthogonal intersection due to errors of origin positions of motors driving the first to fourth links via first to fourth rotation drive systems including the rotation shafts of the first to fourth rotation joints respectively, deflection of the first to fourth rotation drive systems, errors of lengths of the first to fourth links, and an error of an angle between rotation shafts of a rotation joint and a next rotation joint, the two-axis orthogonal intersection being a point at which the rotation center lines of the rotation shafts of both the fifth and sixth rotation joints intersect orthogonally to each other;

rotating the rotation shafts of the second and third rotation joints such that the rotation shaft of the first rotation joint is rotated to a position which allow the two-axis orthogonal intersection to be moved to the target positions of movement;

moving the two-axis orthogonal intersection to each of the plural target positions of movement by rotating the rotation shafts of both the second and third rotation joints with the rotation shaft of the first rotation joint fixed;

measuring, using the three-dimensional measuring device, a position of the measurement point at each of the target positions of movement with the end effector maintained in the reference posture;

coordinate-converting the measured positions into positions in the reference coordinate;

defining a measured point of the two-axis orthogonal intersection in the reference coordinate, the measured point being an end point of the vector produced in the reference coordinate such that the vector is made to have the angle at the measured point;

obtaining a segment produced by connecting plotted points in the X-Y plane of the reference coordinate, wherein X and Y coordinate values of the measured position of the two-axis orthogonal intersection are plotted in the X-Y plane of the reference coordinate for each of the target positions of movement;

obtaining, as an amount of deviation, a length of a normal line drawn from the origin of the reference coordinate to a line extended from the segment; and determining the obtained amount of deviation as a sum of inter-axis offsets of the second, third, and fifth rotation joints.

* * * * *